(12) United States Patent
Oh et al.

(10) Patent No.: US 9,971,712 B2
(45) Date of Patent: May 15, 2018

(54) ELECTRONIC DEVICE AND OPERATING METHOD THEREOF

(71) Applicant: Samsung Electronics Co., Ltd., Suwon-si, Gyeonggi-do (KR)

(72) Inventors: Hun Cheol Oh, Seoul (KR); Soo-Hyung Kim, Hwaseong-si (KR); Seok-Hyun Yoon, Yongin-si (KR); Jin-Woo Kim, Seoul (KR); Hyun-Jung Kim, Seoul (KR); Cheol-Ho Cheong, Seoul (KR); Myunggon Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 782 days.

(21) Appl. No.: 14/211,664

(22) Filed: Mar. 14, 2014

(65) Prior Publication Data

US 2014/0282059 A1    Sep. 18, 2014

Related U.S. Application Data

(60) Provisional application No. 61/782,821, filed on Mar. 14, 2013.

(30) Foreign Application Priority Data

Mar. 11, 2014    (KR) ......................... 10-2014-0028355

(51) Int. Cl.
| | | |
|---|---|---|
| *G06F 3/0487* | (2013.01) | |
| *G06F 13/20* | (2006.01) | |
| *G06F 1/16* | (2006.01) | |
| *G06F 3/0481* | (2013.01) | |
| *G06F 3/0482* | (2013.01) | |

(Continued)

(52) U.S. Cl.
CPC ............ *G06F 13/20* (2013.01); *G06F 1/1641* (2013.01); *G06F 3/0481* (2013.01); *G06F 3/0482* (2013.01); *G06F 3/0485* (2013.01); *G06F 3/0487* (2013.01); *G06F 3/04883* (2013.01); *G06F 3/04886* (2013.01);
(Continued)

(58) Field of Classification Search
CPC .... G06F 1/1632; G06F 1/1616; G06F 1/1628; G06F 1/1641; G06F 1/1643; G06F 1/1647; G06F 1/1654; G06F 1/1677; G06F 13/20; G06F 3/0481; G06F 3/0482; G06F 3/0485; G06F 3/0487; G06F 3/04883; G06F 3/04886; H04M 1/0214; A45C 13/002
USPC ........................... 345/173, 1.3; 715/810, 835
See application file for complete search history.

(56) References Cited

U.S. PATENT DOCUMENTS

| | | | | |
|---|---|---|---|---|
| 5,572,573 A | * | 11/1996 | Sylvan ................ | H04M 1/0266 341/23 |
| 6,118,907 A | | 9/2000 | Matama | |

(Continued)

FOREIGN PATENT DOCUMENTS

| | | |
|---|---|---|
| KR | 10-2006-0071915 A | 6/2006 |
| KR | 10-0821092 B1 | 4/2008 |

(Continued)

*Primary Examiner* — Andrew Tank
(74) *Attorney, Agent, or Firm* — Jefferson IP Law, LLP

(57) ABSTRACT

A method for operating an electronic device is provided. In the method, an electronic cover is connected. Configuration information of the electronic cover is obtained. A User Interface (UI) corresponding to the configuration information is set. Various other embodiments are also possible.

53 Claims, 100 Drawing Sheets

(51) Int. Cl.
 *G06F 3/0485* (2013.01)
 *G06F 3/0488* (2013.01)
 *G06F 21/10* (2013.01)

(52) U.S. Cl.
 CPC ...... *G06F 21/10* (2013.01); *G06F 2200/1634* (2013.01); *G06F 2203/04803* (2013.01)

(56) References Cited

U.S. PATENT DOCUMENTS

| | | | | |
|---|---|---|---|---|
| 7,755,905 | B2* | 7/2010 | Kohnke | H04B 1/3833 361/730 |
| 8,786,517 | B2* | 7/2014 | Lewin | G06F 3/1446 345/1.3 |
| 8,823,640 | B1* | 9/2014 | Harris | G06F 3/1438 345/156 |
| 2004/0057577 | A1 | 3/2004 | Tutikawa | |
| 2006/0212234 | A1 | 9/2006 | Egli et al. | |
| 2006/0244728 | A1* | 11/2006 | Finke-Anlauff | G06F 1/1628 345/168 |
| 2008/0117572 | A1 | 5/2008 | Maatta | |
| 2008/0247128 | A1* | 10/2008 | Khoo | G06F 1/1616 361/679.04 |
| 2010/0045628 | A1* | 2/2010 | Gettemy | G06F 1/1622 345/173 |
| 2010/0060664 | A1* | 3/2010 | Kilpatrick, II | G06F 1/1616 345/650 |
| 2010/0078343 | A1* | 4/2010 | Hoellwarth | B29C 45/14639 206/320 |
| 2010/0302179 | A1* | 12/2010 | Ahn | G06F 1/1618 345/173 |
| 2011/0065474 | A1* | 3/2011 | Won | H02J 7/355 455/556.1 |
| 2011/0143769 | A1 | 6/2011 | Jones et al. | |
| 2011/0188176 | A1* | 8/2011 | Kim | H05K 7/00 361/679.01 |
| 2011/0199727 | A1* | 8/2011 | Probst | G06F 1/1628 361/679.09 |
| 2012/0194448 | A1* | 8/2012 | Rothkopf | A45C 13/002 345/173 |
| 2013/0019207 | A1* | 1/2013 | Rothkopf | G06F 1/1632 715/835 |
| 2014/0159867 | A1* | 6/2014 | Sartee | G06F 1/1632 340/6.1 |

FOREIGN PATENT DOCUMENTS

| | | |
|---|---|---|
| KR | 10-2011-0092865 A | 8/2011 |
| KR | 10-1188978 B1 | 10/2012 |

* cited by examiner

| type\position | 1310-1 | | |
|---|---|---|---|
| 1 | Electronic ink | Touch panel | - |
| 2 | Electronic ink | - | Digitizer |
| 2 | Electronic ink | Touch panel | Digitizer |

FIG.20A

| type\position | 1310-2 | | |
|---|---|---|---|
| 1 | Color display | Touch panel | - |
| 2 | Color display | - | Digitizer |
| 2 | Color display | Touch panel | Digitizer |

FIG.20B

| type\position | 1310-1 | | | 1310-2 | | |
|---|---|---|---|---|---|---|
| 1 | Electronic ink | Touch panel | - | Color display | Touch panel | - |
| 2 | Electronic ink | - | - | Color display | Touch panel | - |
| 3 | Electronic ink | - | Digitizer | Color display | Touch panel | Digitizer |
| 4 | Electronic ink | Touch panel | Digitizer | Color display | Touch panel | Digitizer |

FIG.20C

| TYPE | | | |
|---|---|---|---|
| 1 | – | Electronic ink | – |
| 2 | – | Electronic ink | Touch panel |
| 3 | Color display | – | Touch panel |

FIG.22

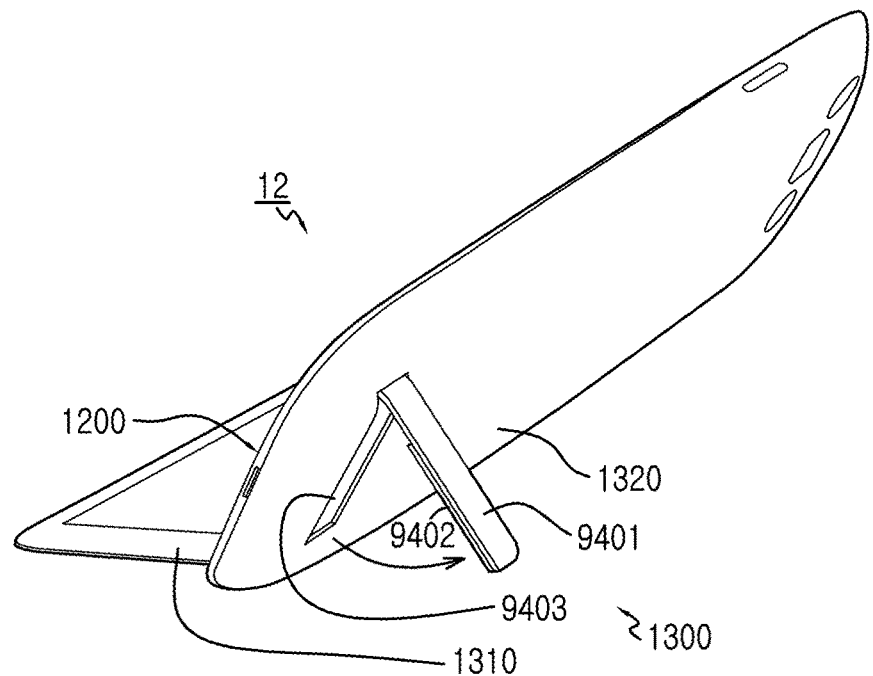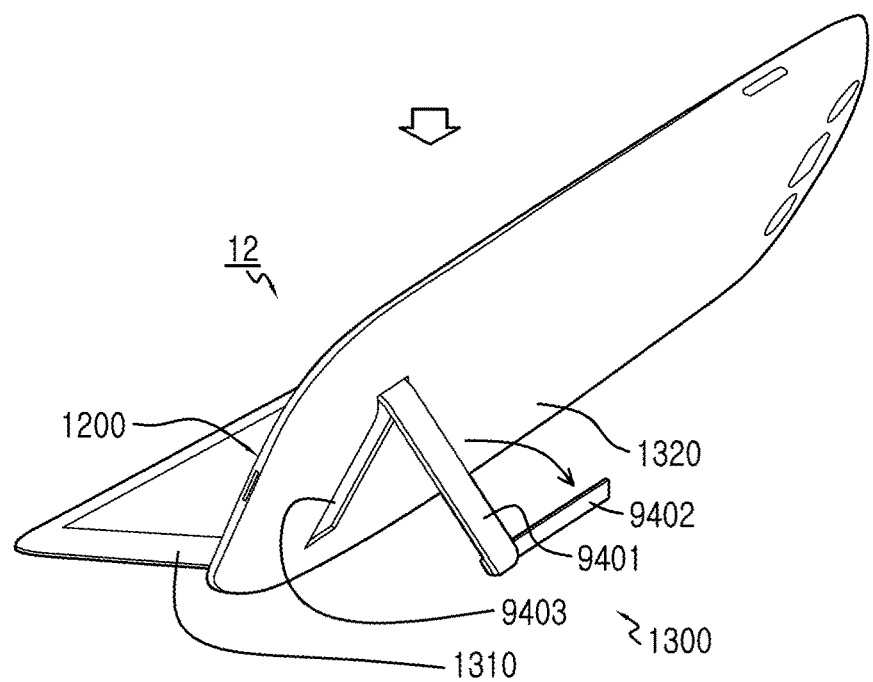
FIG.97

__ELECTRONIC DEVICE AND OPERATING METHOD THEREOF__

CROSS-REFERENCE TO RELATED APPLICATION(S)

This application claims the benefit under 35 U.S.C. § 119(e) of a U.S. Provisional application filed on Mar. 14, 2013 in the U.S. Patent and Trademark Office and assigned Ser. No. 61/782,821, and under 35 U.S.C. § 119(a) of a Korean patent application filed on Mar. 11, 2014 in the Korean Intellectual Property Office and assigned Serial No. 10-2014-0028355, the entire disclosure of each of which is hereby incorporated by reference.

TECHNICAL FIELD

The present disclosure relates to an electronic device for controlling an electronic cover mounting an input/output unit thereon and an operating method thereof.

BACKGROUND

Based on developments in the electronic communication industry, a User Equipment (UE), (e.g., an electronic device such as a cellular phone, an electronic scheduler, a Personal Digital Assistant (PDA), a laptop computer, etc.) has become a necessity of a modern society and serves as an important means for quickly transferring information. For added user convenience, the UE includes a Graphic User Interface (GUI) environment using a touchscreen, and provides various multimedia based on a web environment.

To provide various functions, the UE may include various electronic parts. For example, the UE may include a stylus to provide a writing function or a drawing function. Alternatively, the UE may include a stereo speaker module to listen to music. Alternatively, the UE may include a camera module to provide a photo shooting function, or a communication module to provide a communication function with another electronic device via a network. However, the UE is not currently provided with a UI that corresponds to the type of electronic part, thus creating a need for such a UI.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to set a User Interface (UI) depending on a type (or specification) of an electronic cover.

Another aspect of the present disclosure is to extend the display of contents using an output unit (e.g., a display) mounted on an electronic cover.

Still another aspect of the present disclosure is to enable an input for a specific operation using an input unit mounted on an electronic cover.

In accordance with an aspect of the present disclosure, a method for operating an electronic device is provided. The method includes connecting with an electronic cover, obtaining configuration information of the electronic cover, and setting a UI corresponding to the configuration information.

In accordance with another aspect of the present disclosure, a method for operating an electronic device including a primary device mounting a first screen and an electronic cover mounting a second screen electrically or functionally connected with the primary device is provided. The method includes receiving at least one input, and controlling the first screen or the second screen.

In accordance with yet another aspect of the present disclosure, an electronic device is provided. The electronic device includes a primary device including a first Input/Output (I/O) unit, an electronic cover electrically or functionally connected with the primary device, covering at least a portion of the primary device, and including a second I/O unit, and a processor configured to control the first I/O unit or the second I/O unit.

In accordance with further another aspect of the present disclosure, an electronic cover is provided. The electronic cover includes a first cover portion serving as a cover for a first side of an electronic device and including at least one input unit or output unit on a front side or a backside, and a second cover portion serving as a cover for a second side of the electronic device and detachable and set to communicate with the first cover portion.

The electronic cover not only protects an electronic device but also mounts a display that may display contents together with a display of the electronic device or instead of the display of the electronic device to improve a display method. Also, the electronic cover mounts a touch input unit that may perform an input to the electronic device to improve a display method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 20A, 20B, and 20C are views illustrating tables regarding a type of an electronic cover according to an embodiment of the present disclosure;

FIG. 22 is a view illustrating a table regarding a type of an electronic cover according to an embodiment of the present disclosure;

FIGS. 94, 95, 96, 97, and 98 are views illustrating an electronic device according to an embodiment of the present disclosure;

Throughout the drawings, like reference numerals will be understood to refer to like parts, components and structures.

DETAILED DESCRIPTION

Figure 1:
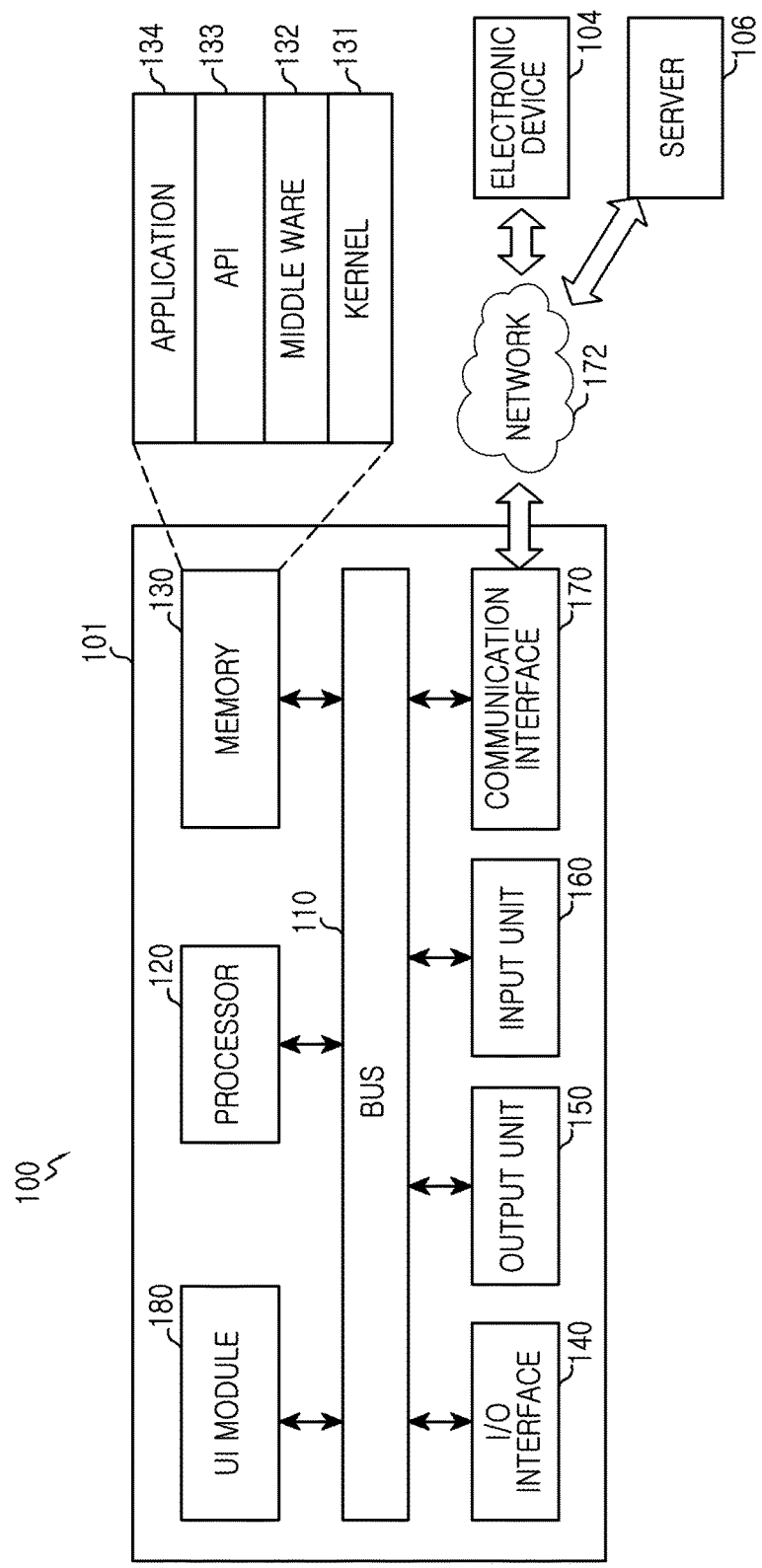
FIG. 1 is a view illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Expressions of "include" or "may include", etc. that may be used for various embodiments of the present disclosure indicate existence of a relevant function, operation, or element, etc. according to various embodiments of the present disclosure, and do not limit an additional one or more functions, operations, or elements from inclusion. Also, in various embodiments of the present disclosure, terminologies of "include" or "have", etc. are intended for designating the existence of a characteristic, a number, a step, an operation, an element, a component or a combination thereof described on the specification, and should be understood that they do not exclude the possibility of existence or addition of one or more other characteristics, numbers, steps, operations, elements, components, or a combination thereof.

Expressions of "or", etc. in various embodiments of the present disclosure include a certain and all combinations of words listed together. For example, "A or B" may include A, may include B, or may include both A and B.

Expressions of "1st", "2nd", "first" or "second" in various embodiments of the present disclosure may modify various elements in various embodiments of the present disclosure, but do not limit relevant elements. For example, the expressions do not limit the sequence and/or importance, etc. of the relevant elements. The expressions may be used for discriminating one element from other elements. For example, both first user equipment and second user equipment are user equipments, and represent different user equipments. For example, a first element may be designated as a second element, and similarly the second element may be designated as the first element without departing from the scope of various embodiments of the present disclosure.

When it is referred that a certain element is "connected to" or "accesses" another element, the element may be directly connected or access another element. However, it should be understood that still another element may exist in the interim. In contrast, when it is referred that a certain element is "directly connected to" or "directly accesses" another element, it should be understood that still another element does not exist in the interim.

In various embodiments of the present disclosure, a terminology of "activation" may include the meaning of "use", and a terminology of "inactivation" may include the meaning of "non-use". Also, the terminology of "activation" may include the meaning of "driving", and the terminology of "inactivation" may include the meaning of "not driving". Also, the terminology of "activation" may include the meaning of "input/output (e.g., display or input) is possible", and the terminology of "inactivation" may include the meaning of "input/output is impossible". For example, an activated screen is a state that may display contents or a state that is displaying contents, and is being driven by being supplied with power. An inactivated screen is a state that cannot display contents, and is not being driven by not being supplied with power.

In various embodiments of the present disclosure, it may be understood that a terminology of "input/output unit" includes at least one of an input unit and an output unit.

Terminologies used by various embodiments of the present disclosure are used for describing a specific embodiment and not for the purpose of limiting the present disclosure. A singular expression includes a plural expression unless it is clearly different contextually.

Unless defined differently, all terminologies used herein including a technological or scientific terminology have the same meaning that is generally understood by a person of ordinary skill in the art to which the present disclosure belongs. It should be construed that terminologies generally used such as terminologies defined in a dictionary have a meaning coinciding with the meaning in the context of the related art, and the terminologies are not construed as an ideal or excessively formal meaning unless clearly defined in various embodiments of the present disclosure.

An electronic device according to various embodiments of the present disclosure may be a device including a communication function. For example, the electronic device may include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a Head-Mounted-Device (HMD) such as electronic glasses), an electronic clothes, an electronic bracelet, an electronic necklace, an electronic appcessory, or a smart watch.

According to various embodiments, an electronic device may be a smart home appliance having a communication function. For example, the smart home appliance may include at least one of a television, a Digital Versatile Disk (DVD) player, an audio, a refrigerator, an air conditioner, a cleaner, an oven, an electronic range, a washing machine, an air purifier, a set-top box, a TV box (for example, a Sam Sung HomeSync™, an Apple TV™, or a Google TV™), game consoles, an electronic dictionary, an electronic key, a camcorder, and an electronic frame.

According to various embodiments, the electronic device may include at least one of various medical devices (e.g., Magnetic Resonance Angiography (MRA), Magnetic Resonance Imaging (MRI), Computed Tomography (CT), a shooting unit, an ultrasonic unit, etc.), a navigation unit, a Global Positioning System (GPS) receiver, an Event Data Recorder (EDR), a Flight Data Recorder (FDR), an automobile infotainment unit, an electronic equipment for a ship (e.g., a navigation equipment for a ship and a gyro compass, etc.), an avionics, a security device, a head unit for an automobile, a robot for an industry or home use, an Automatic Teller's Machine (ATM) of a financial organization, and a Point of Sales (POS) of a store.

According to various embodiments, an electronic device may include at least one of a furniture including a communication function or a portion of a building/structure, an electronic board, an electronic signature receiving device, a projector, and various measurement devices (e.g., water supply, electricity, gas, or radio waves, etc.). An electronic device according to various embodiments of the present disclosure may be a combination of one or more of the above various devices. Also, an electronic device according to various embodiments of the present disclosure may be a flexible device. Also, it is obvious to a person of ordinary skill in the art that an electronic device according to various embodiments of the present disclosure is not limited to the above-described devices.

Hereinafter, an electronic device according to various embodiments of the present disclosure is described with reference to the accompanying drawings. A terminology used for various embodiments may denote a person who uses the electronic device or a device (ex: an artificial intelligence electronic device) that uses the electronic device.

FIG. 1 is a view illustrating a network environment including an electronic device according to an embodiment of the present disclosure.

Referring to FIG. 1, the electronic device 101 may include a bus 110, a processor 120, a memory 130, an Input/Output (I/O) interface 140, an output unit 150, an input unit 160, a communication interface 170, and a User Interface (UI) module 180.

The bus 110 may be a circuit for connecting the above-described elements, and transferring communication (e.g., a control message) between the above-described elements.

The processor 120 may receive an instruction from the above-described other elements (e.g., the memory 130, the I/O interface 140, the output unit 150, the input unit 160, the communication interface 170, or the UI module 180, etc.) via the bus 110, for example, decipher the received instruction, and execute an operation or a data processing corresponding to the deciphered instruction.

The memory 130 may store an instruction or data received from the processor 120 or other elements (ex: the I/O interface 140, the output unit 150, the input unit 160, the communication interface 170, or the UI module 180, etc.) or generated by the processor 120 or the other elements. The memory 130 may include, for example, programming modules such as a kernel 131, a middle ware 132, an Application Programming Interface (API) 133 or an application 134. Each of the above programming modules may include software, firmware, hardware, or a combination of at least two or more of these.

The kernel 131 may control or manage system resources (e.g., the bus 110, the processor 120, or the memory 130, etc.) used for executing an operation or a function implemented in the other program modules, for example, the middle ware 132, the API 133, or the application 134. The kernel 131 may provide an interface via which the middle ware 132, the API 133, or the application 134 may access an individual element of the electronic device 101 and control or manage the same.

The middle ware 132 may perform a mediation role so that the API 133 or the application 134 may communication with the kernel 131 to give and take data. Also, with regard to task requests received from applications 134, the middle ware 132 may perform a control (e.g., scheduling or load balancing) for a task request using a method of assigning an order or priority that may use a system resource (e.g., the bus 110, the processor 120, or the memory 130, etc.) of the electronic device 101 to at least one application among applications 134, for example.

The API 133 is an interface via which the application 134 may control a function provided by the kernel 131 or the middle ware 132, and may include, for example, at least one interface or a function (e.g., an instruction) for a file control, a window control, image processing, or a character control, etc.

According to various embodiments, the application 134 may include a Short Messaging Service/Multimedia Messaging Service (SMS/MMS) application, an e-mail application, a calendar application, an alarm application, a health care application (e.g., an application for measuring an exercise amount or a blood sugar), or an environment information application (e.g., an application for providing air pressure, humidity, or temperature information, etc.), etc. Additionally or generally, the application 134 may be an application related to information exchange between the electronic device 101 and an external electronic device 104. The application related to information exchange may include, for example, a notification relay application for transferring specific information to an external electronic device, or a device management application for managing an external electronic device.

For example, the notification relay application may include a function for transferring notification information occurring from another application (e.g., an SMS/MMS application, an e-mail application, a health care application, or an environment information application, etc.) of the electronic device 101 to an external electronic device (e.g., the electronic device 104). Additionally or generally, the notification relay application, for example, may receive notification information from an external electronic device (e.g., the electronic device 104) to provide the same to a user. The device management application, for example, may manage (e.g., install, delete, or update) a function (e.g., turn on/turn off of an external electronic device itself (or a portion of a constituent part) or control of brightness (or resolution) of a display, a service provided by an application operating in an external electronic device or provided by the external electronic device (e.g., a communication service or a message service) of at least a portion of an external electronic device (e.g., the electronic device 104) communicating with the electronic device 101.

According to various embodiments, the application 134 may include an application designated depending on an attribute (e.g., the kind of an electronic device) of an external electronic device (e.g., the electronic device 104). For example, in the case where an external electronic device is an MP3 player, the application 134 may include an application related to music reproduction. Similarly, in the case where an external electronic device is a mobile medical device, the application 134 may include an application related to a health care. According to an embodiment, the application 134 may include at least one of an application designated to the electronic device 101 or an application received from an external electronic device (e.g., a server 106 or the electronic device 104).

The I/O interface 140 may transfer an instruction or data input from a user via the I/O unit (e.g., a sensor, a keyboard, a touchscreen, a speaker, or a microphone, etc.) to the processor 120, the memory 130, the communication interface 170, or the UI module 180, for example, via the bus 110. For example, the I/O interface 140 allows a user to provide touch data input via a touchscreen to the processor 120. Also, the I/O interface 140 may output an instruction or data received from the processor 120, the memory 130, the communication interface 170, or the UI module 180 via the bus 110, via the I/O unit (e.g., a speaker or a display, etc.). For example, the I/O interface 140 may output voice data processed via the processor 120 to a user via a speaker.

The output unit 150 (e.g., a display or a speaker) may display various information (e.g., multimedia data or text data, etc.) to a user or output sounds to the user.

The input unit 160 (e.g., a sensor, a keyboard, a touch panel, a digitizer, or a microphone, etc.) may receive an instruction or data from a user.

The communication interface 170 may establish communication between the electronic device 101 and an external electronic device (e.g., the electronic device 104 or the server 106, etc.). For example, the communication interface 170 may be connected to a network 172 via wireless communication or wired communication to communicate with an external electronic device. The wireless communication, for example, may include at least one of Wi-Fi, Bluetooth (BT), Near Field Communication (NFC), Global Positioning System (GPS), and cellular communication (e.g., LTE, LTE-A, CDMA, WCDMA, UMTs, WiBro, or GSM, etc.). The wired communication, for example, may include at least one of a Universal Serial Bus (USB), a High Definition Multimedia Interface (HDMI), a Recommended Standard-232 (RS-232), and Plain Old Telephone Service (POTS).

According to an embodiment, the network 172 may be a telecommunications network. The telecommunications network may include at least one of a computer network, the Internet, an Internet of things, and a telephone network. According to an embodiment, a protocol (e.g., a transport layer protocol, a data link layer protocol, or a physical layer protocol) for communication between the electronic device 101 and an external electronic device may be supported by at least one of the application 134, the application programming interface 133, the middle ware 132, the kernel 131, and the communication interface 170.

The UI module 180 may control the output unit 150 or the input unit 160. For example, the UI module 180 may set the UI depending on a type of an I/O unit or a disposed position (e.g., the front side or backside of the cover) of the I/O unit included in the electronic device 104 (e.g., the electronic cover) electrically or functionally connected to the electronic device 101. The UI may include I/O control regarding opening/closing of the electronic cover. Also, the UI may include an I/O control regarding a type (e.g., a moving picture, a photo, text, etc.) of contents. Also, the UI may include an I/O control regarding an application. The UI module 180 may process at least a portion of information obtained from other elements (e.g., the processor 120, the memory 130, the I/O interface 140, the communication interface 170, etc.), and provide the same to a user in various methods. For example, the UI module 180 may control at least a portion of functions of the electronic device 101 so that the electronic device 101 cooperates (i.e., functional connection) with another electronic device (e.g., the electronic device 104 or the server 106) using the processor 120 or independently. Additional information regarding the UI module 180 is provided via FIGS. 2 to 98.

Figure 2:
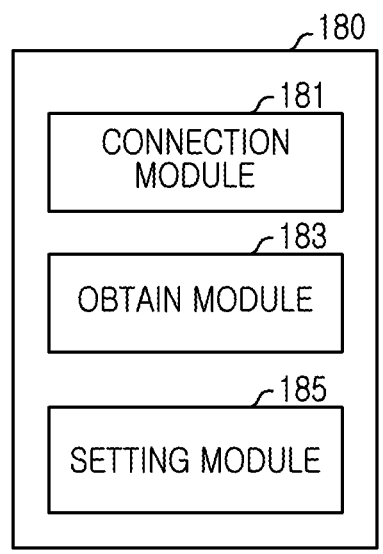
FIG. 2 is a block diagram illustrating a User Interface (UI) module according to an embodiment of the present disclosure.

FIG. 2 is a block diagram a UI module according to an embodiment of the present disclosure.

Referring to FIG. 2, the UI module 180 may include a connection module 181, an obtain module 183, and a setting module 185. For example, the UI module 180 may be implemented as a portion of the processor 120 of the electronic device 101 illustrated in FIG. 1.

The connection module 181, for example, may connect an electronic device (e.g., the electronic device 101) with an external electronic device or an auxiliary electronic device 104 (e.g., the electronic cover) electrically or functionally. Here, the connection module 181 may generate authentication data for cooperation (i.e., functional connection) with the electronic cover, and authenticate the electronic cover that has cooperated with the electronic device (e.g., the electronic device 101) based on the generated authentication data. For example, the connection module 181 may display authentication data to a user via a display connected with the electronic device (e.g., the electronic device 101) functionally. Also, the connection module 181 may present a request for inputting authentication data via the electronic cover to a user using a visual or auditory effect.

In the case where the generated authentication data and authentication data input via the electronic cover match each other as a result of comparison of the two data, for example, the connection module 181 may authenticate the electronic device. Here, the operation of comparing the authentication data generated by the connection module 181 with the authentication data input via the electronic cover may be performed by the connection module 181 or another module (e.g., a setting module 187) functionally connected with the connection module 181.

The obtain module 183, for example, may obtain information related to a type of an electrically or functionally connected external electronic device 104 (e.g., the electronic cover). The type of the external electronic device 104 (e.g., the electronic cover), for example, may include configuration information of the external electronic device 104 (e.g., the electronic cover). For example, the configuration information may include various information (e.g., a type of an input unit, a type of an output unit, a disposed position of an input unit or a disposed position of an output unit, an open/close direction of a cover, etc.) regarding various elements (e.g., an input unit, an output unit, an antenna, a charger (e.g., a solar battery), etc.) mounted on the external electronic device 104. Alternatively, the configuration information may include device identity or other identifying information regarding the external electronic device 104.

The setting module 185, for example, may set a UI corresponding to configuration information of the external electronic device 104 (e.g., the electronic cover). The UI may include device configuration or software that assists interaction between a user and the electronic devices 101 and 104 to be swiftly performed. The UI may be at least a portion of a program where the user and the program interact in order to exchange information between the user and the electronic devices 101 and 104. Configuration information of the external electronic device 104 may be provided from the external electronic device 104.

According to an embodiment, the setting module 185 may determine the type of the external electronic device 104 from configuration information of the external electronic device 104 (e.g., the electronic cover), and set (e.g., load) the UI corresponding to the type of the determined external electronic device 104.

Alternatively, the setting module 185 may set the UI corresponding to device identity information included in the configuration information of the external electronic device 104 (e.g., the electronic cover).

Figure 3:
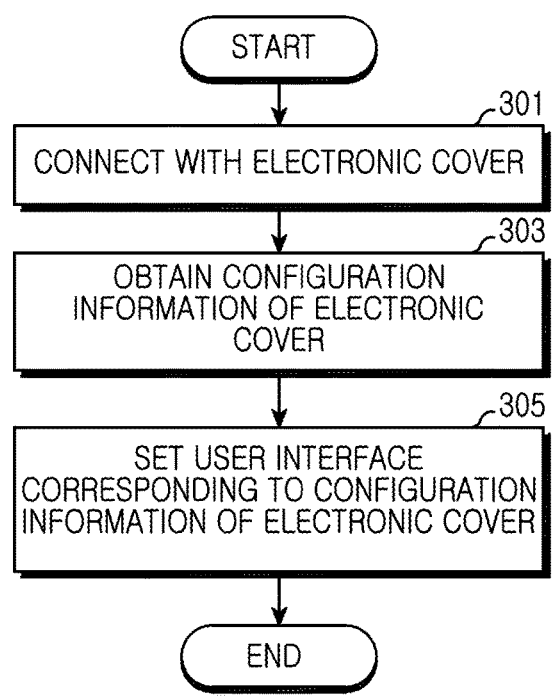
FIGS. 3, 4, 5, 6, 7, 8, 9, 10, and 11 are flowcharts illustrating a UI operation according to an embodiment of the present disclosure.

FIG. 3 is a flowchart illustrating a UI operation according to an embodiment of the present disclosure.

Referring to FIG. 3, in operation 301, the UI module 180 (e.g., the processor 120) may be electrically or functionally connected with the electronic cover using wireless communication (e.g., short distance communication) or wired communication. In operation 303, the UI module 180 may obtain information (e.g., configuration information) related to the type of the electronic cover. In operation 305, the UI module 180 may set the UI corresponding to the configuration information of the electronic cover.

Figure 4:
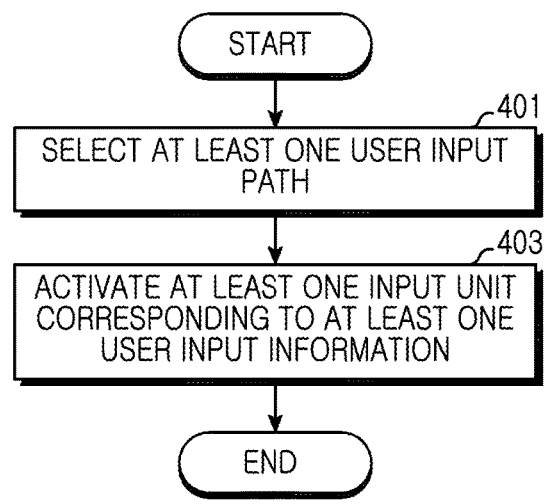

FIG. 4 is a flowchart illustrating a UI operation according to an embodiment of the present disclosure.

Referring to FIG. 4, in operation 401, the UI module 180 (e.g., the processor 120) may select at least one user input path. For example, the UI module 180 may select a user input path suitable for contents (e.g., an application). In operation 403, the UI module 180 may activate at least one input unit (e.g., an input unit of the electronic device 101 or an input unit of the electronic cover) corresponding to selected at least one user input path. For example, at least one of the electronic device 101 and the external electronic device 104 may include one or more input units. When determining the electronic device 101 is coupled with the external electronic device 104, for example, the electronic device 101 may determine to activate or inactivate one or more input units. For example, activation or inactivation of one or more input units may be determined depending on contents, an application, or a state (e.g., an open/close state of a cover, a power save mode, etc.) of the electronic device provided (e.g., executed) by the electronic device 101 or the external electronic device 104. Though not shown, the UI module 180, for example, may inactivate at least one input unit corresponding to at least one unselected user input path.

Figure 5:
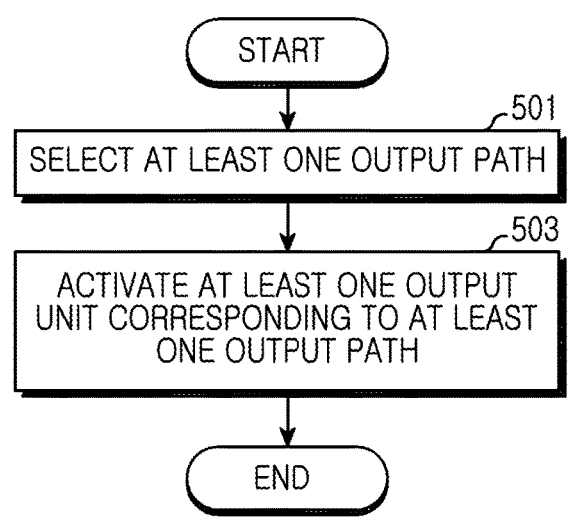

FIG. 5 is a flowchart illustrating a UI operation according to an embodiment of the present disclosure.

Referring to FIG. 5, in operation 501, the UI module 180 (e.g., the processor 120) may select at least one output path. For example, the UI module 180 may select at least one output path suitable for contents (e.g., an application). In operation 503, the UI module 180 may activate at least one output unit (e.g., an output unit of the electronic device 101 or an output unit of the electronic cover) corresponding to selected at least one output path. For example, at least one of the electronic device 101 and the external electronic device 104 may include one or more output units. When determining that the electronic device 101 is coupled with the external electronic device 104, the electronic device 101 may determine to activate or inactivate one or more output units. For example, activation or inactivation of one or more output units may be determined depending on contents, an application, or a state (e.g., an open/close state of a cover, a power save mode, etc.) of the electronic device provided (e.g., executed) by the electronic device 101 or the external electronic device 104. Though not shown, the UI module 180, for example, may inactivate at least one output unit corresponding to at least one unselected output path.

Figure 6:
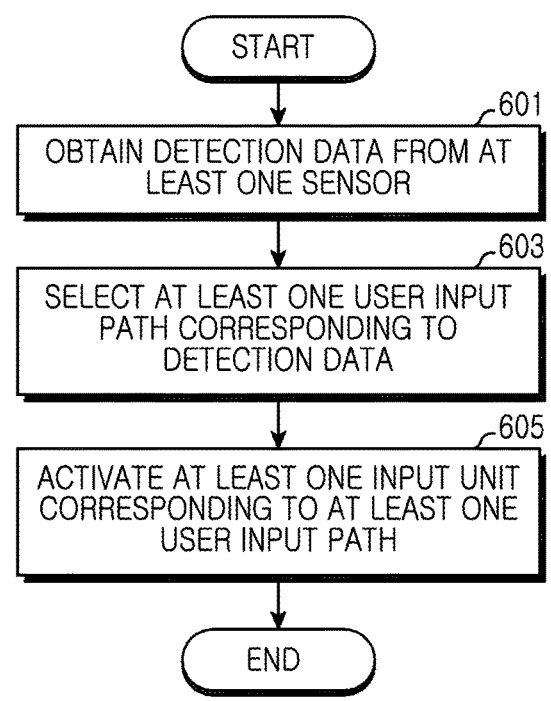

FIG. 6 is a flowchart illustrating a UI operation according to an embodiment of the present disclosure.

Referring to FIG. 6, in operation 601, the UI module 180 (e.g., the processor 120) may obtain data detected by at least one sensor (e.g., a gesture sensor, a gyro sensor, an air pressure sensor, a magnetic sensor, an acceleration sensor, a grip sensor, a proximity sensor, a color sensor (e.g., Red, Green, Blue (RGB) sensor), a living body sensor, a temperature/humidity sensor, an illuminance sensor, an Ultra Violet (UV) sensor, etc.). At least one sensor, for example, may be a sensor included in at least one of the electronic device 101 and the external electronic device 104. In operation 603, the UI module 180 may select at least one user input path corresponding to the obtained data. In operation 605, the user interface module 180 may activate at least one input unit (e.g., an input unit of the electronic device 101 or an input unit of the electronic cover) corresponding to at least one selected user input path. Though not shown, the UI module 180 may inactivate at least one input unit corresponding to at least one unselected user input path.

Figure 7:
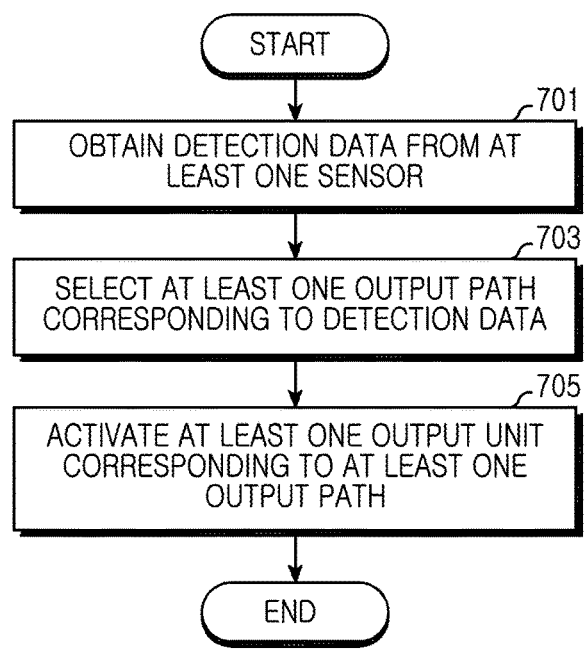

FIG. 7 is a flowchart illustrating a UI operation according to an embodiment of the present disclosure.

Referring to FIG. 7, in operation 701, the UI module 180 (e.g., the processor 120) may obtain data detected by at least one sensor (e.g., a gesture sensor, a gyro sensor, an air pressure sensor, a magnetic sensor, an acceleration sensor, a grip sensor, a proximity sensor, a color sensor (e.g., RGB sensor), a living body sensor, a temperature/humidity sensor, an illuminance sensor or a UV sensor, etc.). In operation 703, the UI module 180 may select at least one output path corresponding to the obtained detection data. In operation 705, the UI module 180 may activate at least one output unit (e.g., an output unit of the electronic device 101 or an output unit of the electronic cover) corresponding to at least one selected output path. Though not shown, the UI module 180 may inactivate at least one output unit corresponding to at least one unselected output path.

Figure 8:
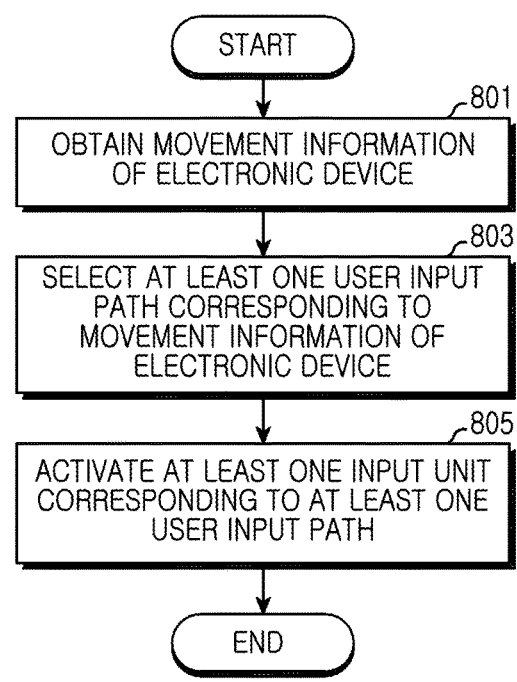

FIG. 8 is a flowchart illustrating a UI operation according to an embodiment of the present disclosure.

Referring to FIG. 8, in operation 801, the UI module 801 (e.g., the processor 120) may obtain information regarding movement (e.g., rotation, etc.) of the electronic device 101. The information regarding movement, for example, may include at least one of a direction (e.g., a horizontal direction or a vertical direction) of a display, a position of an electronic device, a position of a user, and movement of the electronic device. The UI module 180 may obtain information regarding movement of the electronic device 101 using at least one sensor (e.g., a gesture sensor, a gyro sensor, an air pressure sensor, a magnetic sensor, an acceleration sensor, a grip sensor, a proximity sensor, a color sensor (e.g., RGB sensor), a living body sensor, a temperature/humidity sensor, an illuminance sensor or a UV sensor, etc.). In operation 803, the UI module 180 may select at least one user input path corresponding to movement information of the electronic device 101. In operation 805, the UI module 180 may activate at least one input unit (e.g., an input unit of the electronic device 101 or an input unit of the electronic cover) corresponding to at least one selected user input path. Though not shown, the UI module 180 may inactivate at least one input unit corresponding to at least one unselected user input path.

Figure 9:
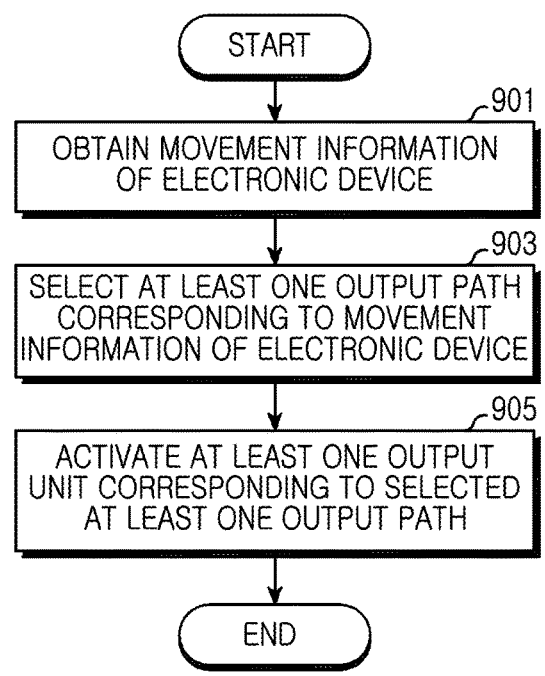

FIG. 9 is a flowchart illustrating a UI operation according to an embodiment of the present disclosure.

Referring to FIG. 9, in operation 901, the UI module 180 (e.g., the processor 120) may obtain information regarding movement of the electronic device 101. The information regarding movement, for example, may include at least one of a direction (e.g., a horizontal direction or a vertical direction) of a display, a position of an electronic device, a position of a user, and movement of the electronic device. In operation 903, the UI module 180 may select at least one output path corresponding to movement information of the electronic device 101. In operation 905, the UI module 180 may activate at least one output unit (e.g., an output unit of the electronic device 101 or an output unit of the electronic cover) corresponding to the at least one selected output path. Though not shown, the UI module 180 may inactivate at least one output unit corresponding to at least one unselected output path.

Figure 10:
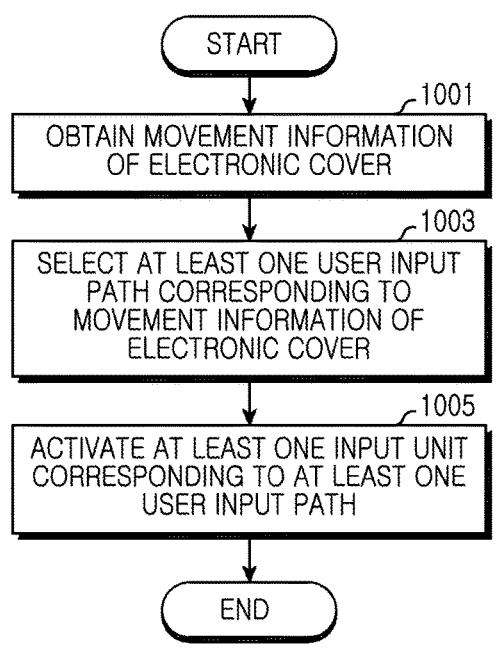

FIG. 10 is a flowchart illustrating a UI operation according to an embodiment of the present disclosure.

Referring to FIG. 10, in operation 1001, the UI module 180 (e.g., the processor 120) may obtain information regarding movement (e.g., opened or closed state) of the electronic cover. The information regarding movement, for example, may include at least one of a direction (e.g., a horizontal direction or a vertical direction) of a display included in the electronic device, a position of the electronic cover, and a position of a user. The UI module 180 may obtain information regarding movement of the electronic cover using at least one sensor (e.g., a gesture sensor, a gyro sensor, an air pressure sensor, a magnetic sensor, an acceleration sensor, a grip sensor, a proximity sensor, a color sensor, a living body sensor, a temperature/humidity sensor, an illuminance sensor or a UV sensor, etc.). In operation 1003, the UI module 180 may select at least one user input path corresponding to movement information of the electronic cover. In operation 1005, the UI module 180 may activate at least one input unit (e.g., an input unit of the electronic device 101 or an input unit of the electronic cover) corresponding to the selected at least one user input path. Though not shown, the UI module 180 may inactivate at least one input unit corresponding to at least one unselected user input path. For example, in the case where the electronic cover is in an open position, the UI module 180 may activate the input unit 160 (e.g., a touch panel or a digitizer) of the electronic device 101 or an input unit (e.g., a touch panel, a digitizer, or a microphone) of the electronic cover. Also, in the case where the electronic device is in a closed position, the UI module 180 may inactivate the input unit 160 (e.g., a touch panel or a digitizer) of the electronic device 101. Alternatively, in the case where the electronic cover is in the closed position, the UI module 180 may activate an input unit disposed on an exterior of the electronic cover.

Figure 11:
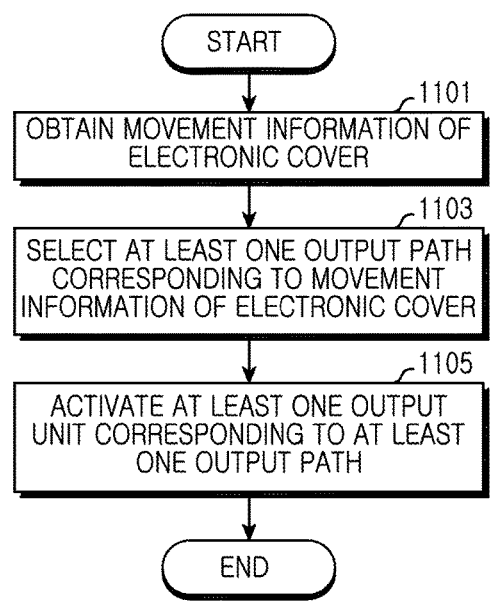

FIG. 11 is a flowchart illustrating a UI operation according to an embodiment of the present disclosure.

Referring to FIG. 11, in operation 1101, the UI module 180 (e.g., the processor 120) may obtain information regarding movement of the electronic cover. The information regarding movement, for example, may include at least one of a direction (e.g., a horizontal direction or a vertical direction) of a display included in the electronic device, a position of the electronic cover, and a position of a user. In operation 1103, the UI module 180 may select at least one output path corresponding to movement information of the electronic cover. In operation 1105, the UI module 180 may activate at least one output unit (e.g., an output unit of the electronic device 101 or an output unit of the electronic cover) corresponding to the selected at least one output path. Though not shown, the UI module 180 may inactivate at least one output unit corresponding to at least one unselected output path. For example, in the case where the electronic cover is in an open position, the UI module 180 may activate a screen of the electronic device 101. Alternatively, in the case where the electronic cover is in a closed position, the UI module 180 may activate a screen disposed on an exterior of the electronic cover, and inactivate a screen of the electronic device 101.

According to an embodiment, when it is recognized that the electronic cover is a type including a transparent (i.e., not optically opaque) display, in the case where the electronic cover is in a closed position, the electronic device 101 may maintain an active state of a screen of the electronic device 101. According to an embodiment, in the case where the electronic cover is in a closed position, the electronic device 101 may control transparency of the transparent display included in the electronic cover.

Figure 12:
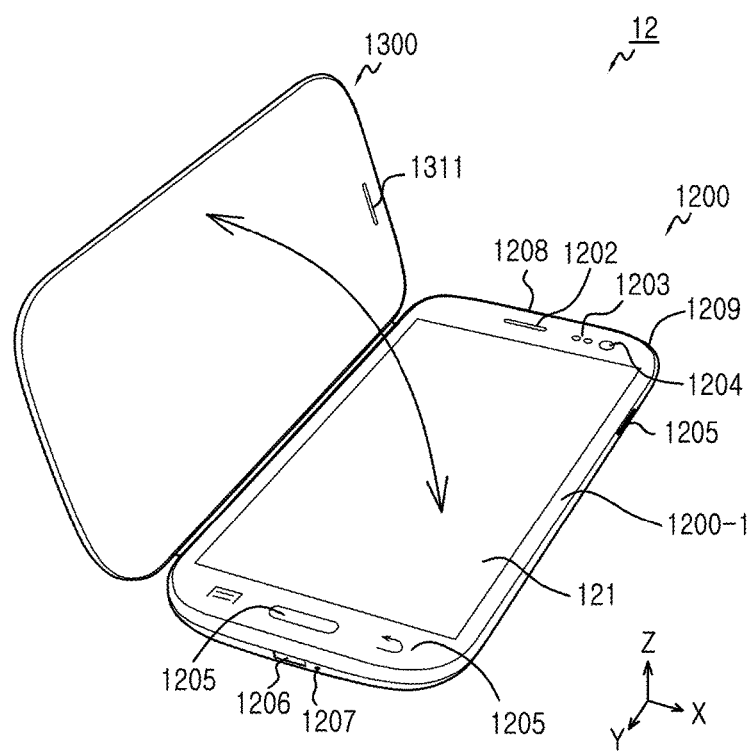
FIG. 12 is a view illustrating an electronic device according to an embodiment of the present disclosure.

FIG. 12 is a view illustrating an electronic device according to an embodiment of the present disclosure.

Referring to FIG. 12, the electronic device 12 may include a primary device 1200 and an electronic cover 1300.

The primary device 1200, for example, may be an electronic device, such as the electronic device 101 illustrated in FIG. 1. The primary device 1200 may include a touchscreen (or a display) 121, a speaker 1202, at least one sensor 1203, a camera 1204, at least one button 1205, an external port 1206, a microphone 1207, a jack 1208, or an antenna 1209.

The touchscreen 121 may include a display module (not shown) and a touch detect module (e.g., a touch panel or a digitizer). The speaker 1202 may output an electric signal in the form of sounds. The at least one sensor 1203 may measure a physical quantity or detect an operation state of the electronic device 12 to convert measured or detected information to an electric signal. The at least one sensor 1203 may be mounted on a specific position. The at least one sensor 1203 may include at least one of a gesture sensor, a proximity sensor, a grip sensor, a gyro sensor, an acceleration sensor, a geomagnetic sensor, an air pressure sensor, a temperature/humidity sensor, a Hall sensor, an RBG sensor, an illuminance sensor, a living body sensor, or a UV sensor, and a stylus detector. The camera 1204 is a device that may shoot a picture or a moving picture, and may include one or more image sensors (e.g., a front sensor or a rear sensor), an Image Signal Processor (ISP) (not shown), or a flash (not shown) (e.g., an LED or a xenon lamp). The at least one button 1205 may include a press key or a touch key. The external port 1206 may be used as an HDMI, a USB, an optical interface, a projector, a port for being connected with a D-subminiature (D-sub) cable, or a port for charging. The microphone 1207 may convert a sound to an electric signal. The jack 1208 may electrically connect a plug such as an earphone, a headset, etc. to the electronic device. The antenna 1209 (e.g., a Digital Multimedia Broadcasting (DMB) antenna) may be taken out and extended to the outside of the electronic device 12.

The electronic cover 1300 may be installed to the primary device 1200 so that it may cover at least a portion of a front side 1200-1 (e.g., a surface where a primary screen exists) of the primary device 1200. The electronic cover 1300, for example, may be an external electronic device 104 including at least a portion of elements of the primary device 1200. For example, the electronic cover 1300 may provide at least one function by coupling with the primary device 1200 or independently. According to an embodiment, the electronic cover 1300 may rotate around one side of the horizontal direction (a direction where a horizontal length is shorter than a vertical length) of the primary device 1200 (open/close horizontally). In the case where the electronic cover 1300 is closed, elements (e.g., the touchscreen 121, the at least one sensor 1203, the camera 1204, or the at least one button 1205, etc.) disposed on one side of the primary device 1200 may be hidden. The electronic cover 1300, for example, may include a through hole 1311 corresponding to the speaker 1202 of the primary device 1200.

According to an embodiment, a first cover portion of an electronic cover 1300 may include a plurality of segments. For example, the segments may include different elements. Also, for example, a foldable structure is included between the segments, so that the first cover portion may be transformed in a predetermined shape.

Figure 13:
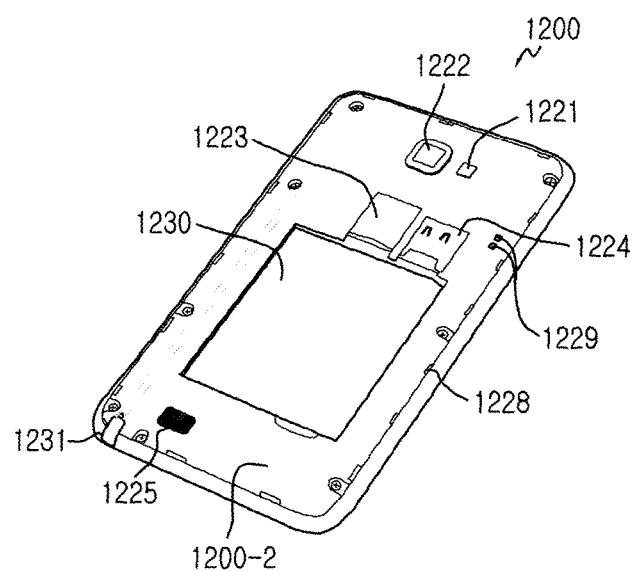
FIG. 13 is a view illustrating a primary device of an electronic device according to an embodiment of the present disclosure.

FIG. 13 is a view illustrating a primary device of an electronic device according to an embodiment of the present disclosure.

Referring to FIG. 13, the primary device 1200 may include a flash 1221 disposed on a backside 1200-2, a camera 1222, a plurality of memory sockets 1223 and 1224 (e.g., a socket for a Secure Digital (SD) card, a socket for a Subscriber Identification Module (SIM) card, etc.), a speaker 1225, a plurality of hook fastener recesses 1228, a living body sensor (not shown) (e.g., a fingerprint sensor or a hear rate sensor), and at least one terminal 1229, a battery 1230, and a stylus 1231.

The plurality of hook fastener recesses 1228 may be used for coupling the electronic cover 1300 with the primary device 1200. The at least one terminal may be used for electrically connecting the electronic cover 1300 with the primary device 1200. According to an embodiment, the electronic cover 1300 may be coupled to the primary device 1200 in various methods. For example, the primary device 1200 may be coupled to the electronic cover 1300 via a recess of a sliding manner. For example, the primary device 1200 and the electronic cover 1300 may be coupled to each other using magnetic force.

Figure 14:
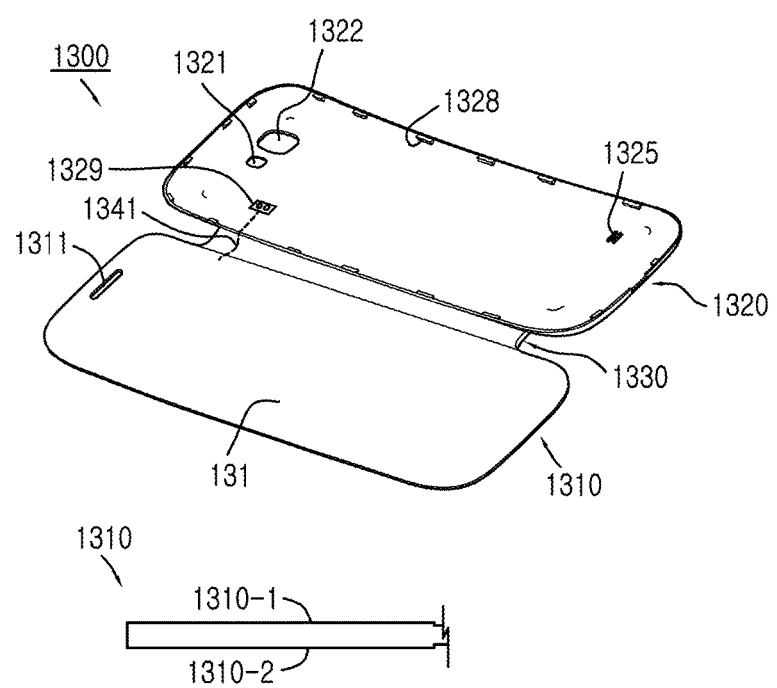
FIG. 14 is a view illustrating an electronic cover according to an embodiment of the present disclosure.

FIG. 14 is a view illustrating an electronic cover according to an embodiment of the present disclosure.

Referring to FIG. 14, the electronic cover 1300 may include a first cover portion 1310, a second cover portion 1320, a connection portion 1330, and an electric connection member 1341.

The first cover portion 1310 is a cover for the front side 1200-1 of the primary device 1200, and is opened/closed in a rotation manner to hide or expose a screen of the primary device 1200. The first cover portion 1310 may include at least one input unit (e.g., a touch panel, a digitizer, a microphone, etc.) or output unit (e.g., a display, a speaker, etc.) 131, and a through hole 1311. The at least one input unit or output unit 131 may be mounted on at least one of two surfaces 1310-1 and 1310-2 facing each other. In the case where the first cover portion 1310 is in a closed position, the first cover portion 1310 may be disposed to overlap at least a portion of the screen of the primary device 1200 (not shown). A screen of the display 131 of the electronic cover 1300 may have an area which is the same as or different from the screen of the display 121 of the primary device 1200 (not shown). The through hole 1311 may output a sound from the speaker 1202 (of FIG. 12) of the primary device 1200 to the outside with the first cover portion 1310 closed. According to an embodiment, an input unit or output unit may not be mounted as separate elements on the first cover portion 1310 but the first cover portion 1310 may correspond to the input unit or the output unit. For example, the first cover portion 1310 may be implemented in the form of a flexible display.

According to an embodiment, the second cover portion 1320 serves as a cover for the backside (1200-2 of FIG. 5) of the primary device 1200, and may be mounted on the backside 1200-2 of the primary device 1200 or separated from the backside 1200-2 of the primary device 1200. For example, the second cover portion 1320 may be formed in a curved shape and form an appearance of the electronic device 12. According to an embodiment, the second cover portion 1320 may be implemented in a form including a flexible display. The second cover portion 1320 may hide elements (e.g., a plurality of memory sockets 1223 and 1224, a speaker 1225, or a battery 1230, etc.) disposed on the backside 1200-2 of the primary device 1200.

According to an embodiment, the second cover portion 1320 may include at least one of a flash hole 1321, a camera hole 1322, a speaker hole 1325, and a plurality of hooks 1328. Alternatively, the second cover portion 1320 may include at least one terminal 1329. The flash hole 1321 may expose the flash 1221 of the primary device 1200. The camera hole 1322 may expose the camera 1222 of the primary device 1200. The speaker hole 1325 may output a sound from the speaker 1225 of the primary device 1200 to the outside. The plurality of hooks 1328 may be disposed on an inner surface of a periphery of the second cover portion 1320. The plurality of hooks 1328 may be fastened to the plurality of hook fastener recesses 1228 of the primary device 1200 in a snap-fit coupling manner. The at least one terminal 1329 may electrically contact the at least one terminal 1229 of the primary device 1200. Here, the at least one terminal 1329 may include a structure elastically pressurizing the at least one terminal 1229 of the primary device 1200. The at least one terminal 1329 may be electrically connected to at least one input unit or output unit 131 of the first cover portion 1310.

According to an embodiment, the at least one terminal 1329 of the electronic cover 1300 may include a power terminal (not shown), a ground terminal, an interrupt terminal, a terminal for a control signal, a display terminal, a touch panel terminal, a digitizer terminal, etc. The power terminal, for example, may receive driving power from the primary device 1200. The power terminal, for example, may be used when the electronic cover 1300 supplies power to the primary device 1200. The grounding terminal may be electrically connected to a ground disposed to at least one of the first cover portion 1310, the second cover portion 1320, and the connection portion 1330. The electronic cover 1300 may be electrically connected to a ground of the primary device 1200 via the grounding terminal. The interrupt terminal may provide an interrupt signal from the electronic cover 1300 to the primary device 1200. The terminal for a control signal may allow a control signal to communicate between the electronic cover 1300 and the primary device 1200. For example, the primary device 1200 may obtain information regarding specification (e.g., a kind, the number of input (output) units, a position, etc.) of an input unit or output unit from the electronic cover 1300 via the terminal for the control signal. The display terminal, for example, may provide a video signal from the primary device 1200 to the electronic cover 1300. The touch panel terminal, for example, may provide a touch input generated from a touch panel of the electronic cover 1300 to the primary device 1200. The touch panel terminal, for example, may provide a touch input generated from a touch panel of the primary device 1200 to the electronic cover 1300. The digitizer terminal, for example, may provide a touch input generated from the electronic cover 1300 to the primary device 1200. The digitizer terminal, for example, may provide a touch input generated from the primary device 1200 to the electronic cover 1300.

According to an embodiment, it is also possible that the above-described various terminals are not discriminated and the above-described various signals may be given and taken (i.e., exchanged) via at least one terminal. For example, at least one signal may be given and taken via wireless communication. For example, an output signal may be given and taken via at least one terminal, and an input signal may be given and taken via wireless communication. According to an embodiment, it is also possible that the primary device 1200 and the electronic cover 1300 give and take power wirelessly using a wireless power transmission technology.

Also, the at least one terminal 1329 of the electronic cover 1300 may include a charging terminal (not shown) or an antenna terminal. The charging terminal may supply power generated from a solar battery of the electronic cover 1300 to the primary device 1200. The antenna terminal may electrically connect an antenna of the electronic cover 1300 to the primary device 1200. In the above various embodiments, regarding communication of a signal or power, it is obvious that the electronic cover 1300 or the primary device 1200 switches a transmission role or a reception role and operates.

The connection portion 1330, for example, may connect the first cover portion 1310 with the second cover portion 1320, and enable the first cover portion 1310 to rotate. The connection portion 1330 may cover a lateral side (e.g., a surface connecting the upper side and the lower side) of the primary device 1200. The connection portion 1330 may include a material which is flexible and is not easily broken by frequent bending. According to an embodiment, the connection portion 1330 may include at least one input unit, output unit, an antenna, etc.

The electrical connection member 1341 may electrically connect at least one input unit or output unit 131 of the first cover portion 1310 with at least one terminal 1329 of the second cover portion 1320. The electrical connection member 1341 may be installed such that it is interposed between stacked elements of the electronic cover 1300, and so may not be exposed to the outside. The electrical connection member 1341 may be flexible. In an embodiment, the electrical connection member 1341 may include a Flexible Printed Circuit Board (FPCB).

Also, the electronic cover 1300 may further include an antenna (e.g., an NFC antenna) (not shown). The primary device 1200 may transmit or receive a signal related to various networks using the antenna of the electronic cover 1300.

Also, the electronic cover 1300 may include a solar battery (not shown). The primary device 1200 may charge a battery (not shown) using the solar battery.

In the case where the second cover portion 1320 is coupled to the backside 1200-2 of the primary device 1200, at least one input unit or output unit 131 of the first cover portion 1210 is connected to the primary device 1200 electrically or functionally, and the primary device 1200 may recognize the at least one input unit or output unit 131 of the electronic cover 1300 and control the same.

According to an embodiment, in the case where the second cover portion 1320 is coupled to the backside 1200-2 of the primary device 1200, the electronic cover 1300 is supplied with power from the primary device 1200, and initialized, and may transmit an interrupt signal to the primary device 1200. The primary device 1200 may receive an interrupt signal from the electronic cover 1300, and recognize the electronic cover 1300. For example, the electronic cover 1300 may actively (without being supplied with power from the primary device 1200) transmit an interrupt signal to the primary device 1200, and the primary device 1200 may establish communication with the electronic cover 1300 via a method of receiving an interrupt signal from the electronic cover 1200.

Through various methods, the primary device 1200 may recognize the electronic cover 1300. In an embodiment, the primary device 1200 may recognize the electronic cover 1300 via a polling method of periodic scanning. For example, the primary device 1200 may periodically check a state of a signal. When the electronic cover 1300 is mounted, the state of this signal changes, and the primary device 1200 may recognize the electronic cover 1300 from this change. In another embodiment, the primary device 1200 may have a physical switch that operates in the case where the electronic cover 1300 is mounted, and when a signal is changed by an operation of this switch, the primary device 1200 may recognize the electronic cover 1300. In still another embodiment, the primary device 1200 may recognize the electronic cover 1300 using a Hall sensor, a proximity sensor, etc.

Figure 15:
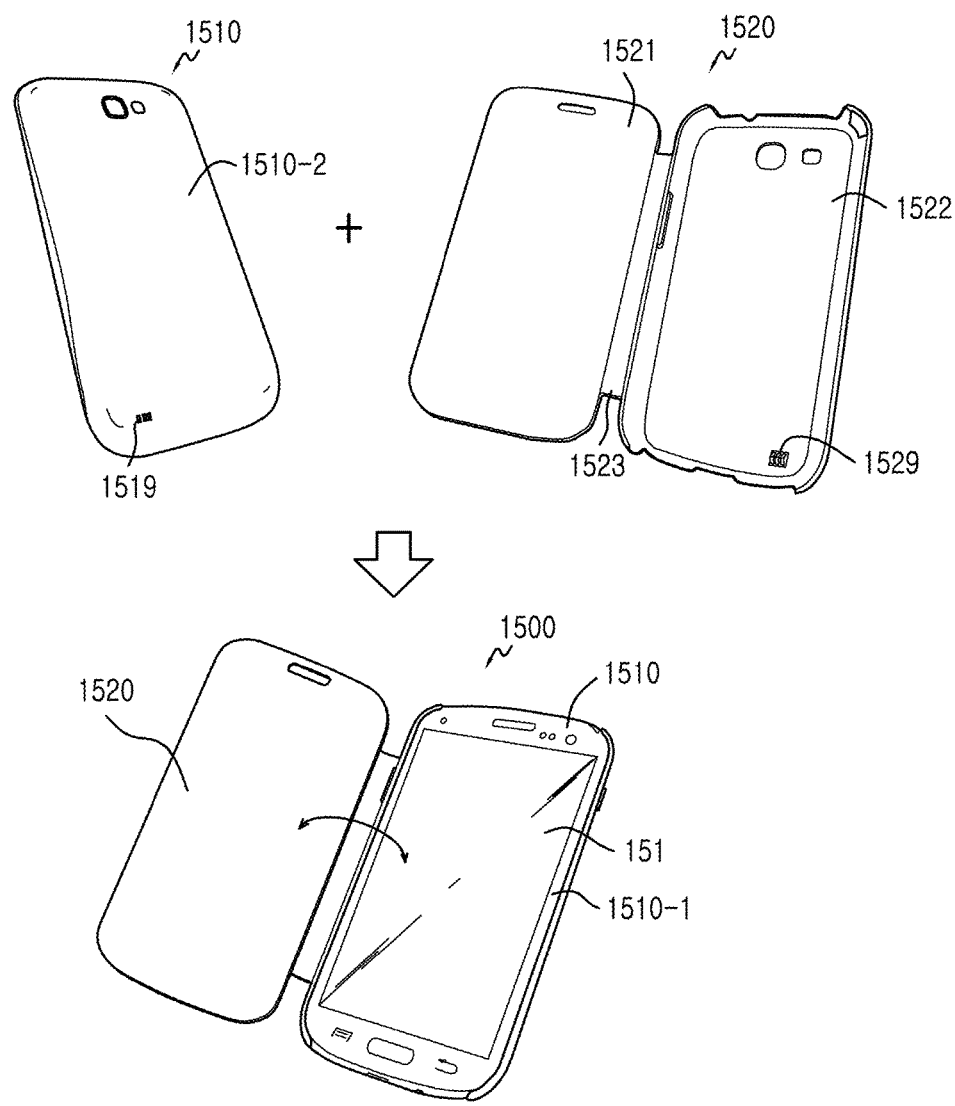
FIGS. 15, 16, 17, 18, and 19 are views illustrating an electronic device according to an embodiment of the present disclosure.

FIG. 15 is a view illustrating an electronic device according to an embodiment of the present disclosure.

Referring to FIG. 15, the electronic device 1500 may include a primary device 1510 (e.g., the electronic device of FIG. 1) and an electronic cover 1520 (e.g., the electronic device 104 of FIG. 1).

The primary device 1510, for example, may include all or at least a portion of elements of the primary device 1200 illustrated in FIGS. 12 and 13. According to an embodiment, the primary device 1510 may further include a backside cover (e.g., a battery cover) (not shown) disposed on a backside 1510-2. Also, the primary device 1510 may include at least one terminal 1519 disposed on the surface of the backside cover. For example, the primary device 1510 may be a device having a built-in battery, not a structure where the backside cover (e.g., a battery cover) is detached.

The electronic cover 1520 may include a first cover portion 1521, a second cover portion 1522, a connection portion 1523, and at least one terminal 1529. The first cover portion 1521 is a cover for a front side 1510-1 of the primary device 1510, and is opened/closed in a rotation method to hide or expose a screen 151 of the primary device 1510. The first cover portion 1521 may include at least one input unit or output unit disposed on the front side or backside. The second cover portion 1522 is a cover for a backside 1510-2 of the primary device 1510, and may be mounted on the backside 1510-2 of the primary device 1510 or separated from the backside 1510-2 of the primary device 1510. The connection portion 1523 may connect the first cover portion 1521 with the second cover portion 1522. The at least one terminal 1529 may be disposed on the inner surface of the second cover portion 1522, and may be electrically connected with at least one terminal 1519 of the primary device 1510. The at least one terminal 1529 may be electrically connected with at least one input unit or output unit of the first cover portion 1521.

Figure 16:
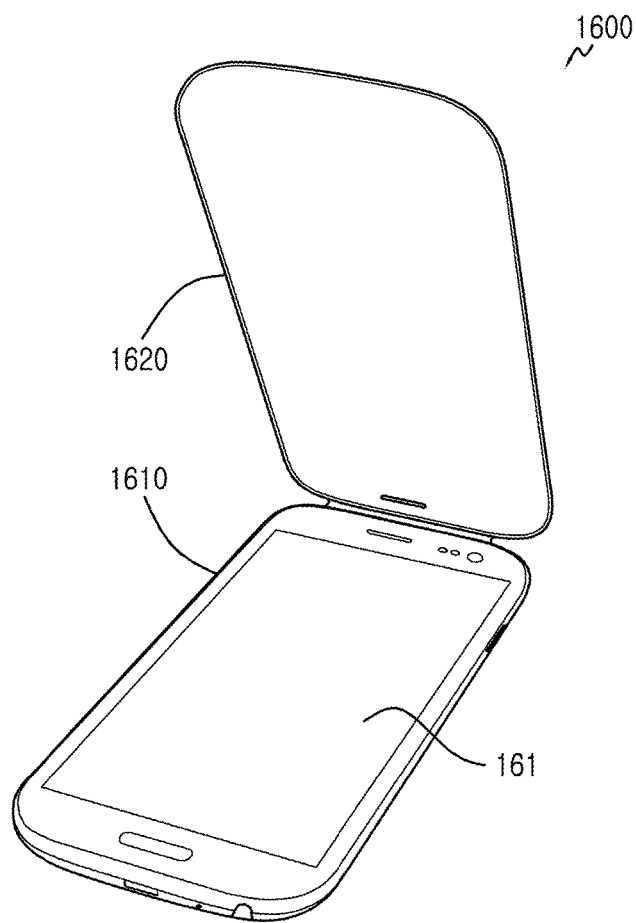

FIG. 16 is a view illustrating an electronic device according to an embodiment of the present disclosure.

Referring to FIG. 16, the electronic device 1600 may include a primary device 1610 (e.g., the electronic device 101 of FIG. 1) and an electronic cover 1620 (e.g., the electronic device 104 of FIG. 1).

The primary device 1610 may be the primary device 1200 illustrated in FIG. 12.

The electronic cover 1620 may cover a screen 161 of the primary device 1610 in a rotation manner. The electronic cover 1620, for example, may rotate around one side of the vertical direction (a direction where a vertical length is longer than a horizontal length) of the primary device 1610 (open/close vertically).

The electronic cover 1620 may include at least one input unit or output unit (not shown). The at least one input unit or output unit of the electronic cover 1620 is connected to the primary device 1610 electrically or functionally, and may be controlled by the primary device 1610.

Figure 17:
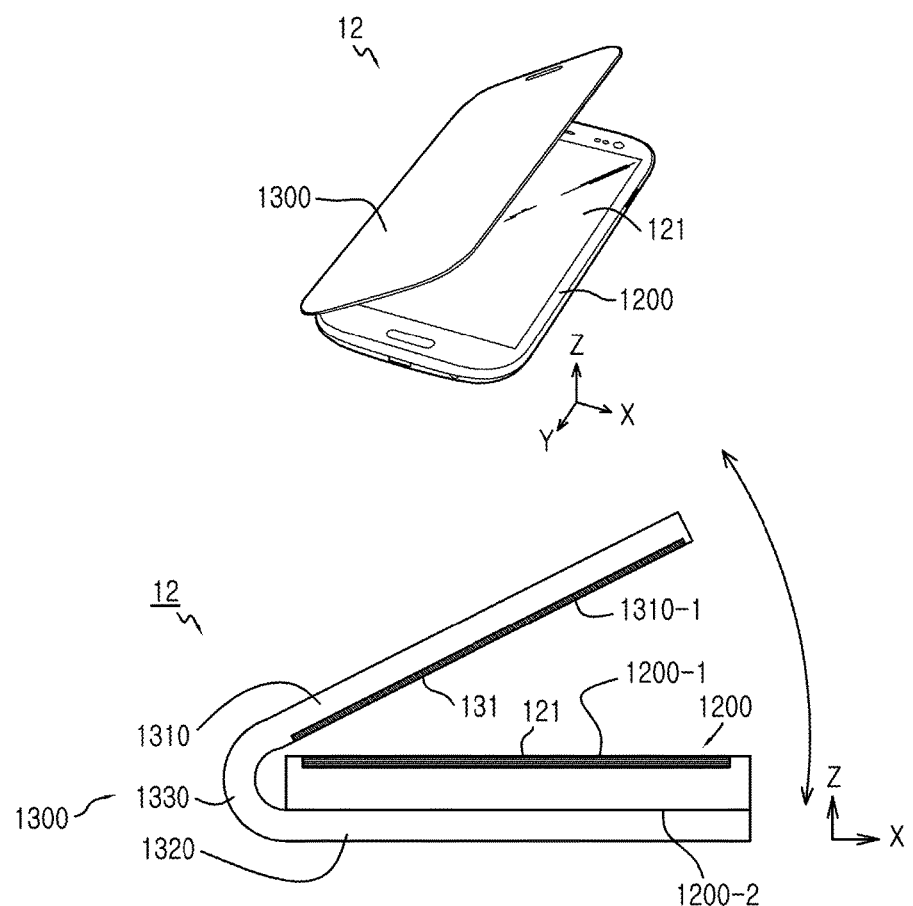
Figure 18:
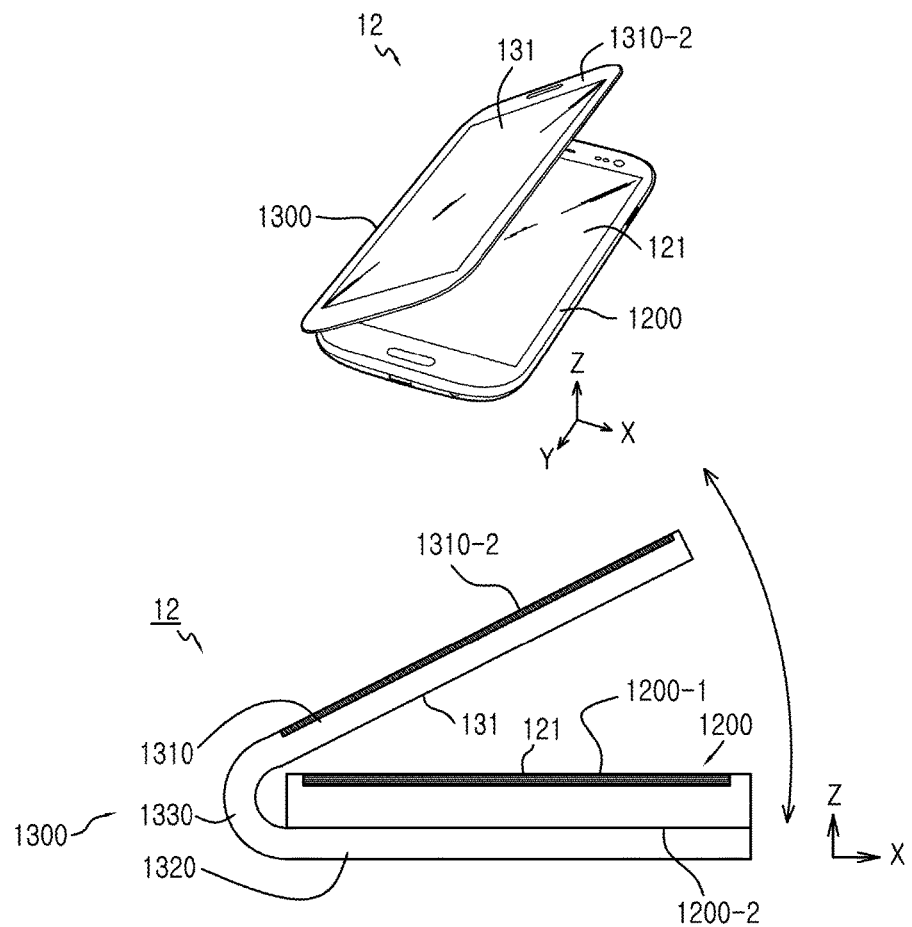
Figure 19:
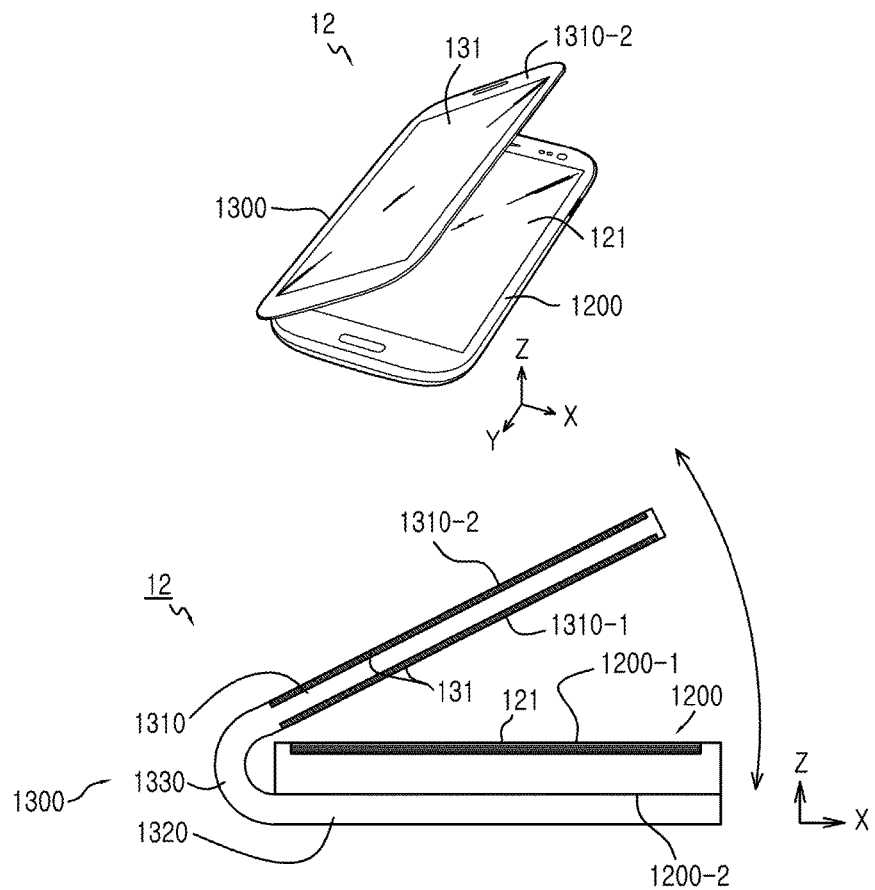

FIGS. 17 to 19 are views illustrating an electronic device according to an embodiment of the present disclosure. The electronic device 12 may include a primary device 1200 and an electronic cover 1300. The primary device 1200 may include a display (or a touchscreen) 121 disposed on a front side 1200-1. The electronic cover 1300 may include a first cover portion 1310 that may be opened/closed in a rotation manner. In the case where the first cover portion 1310 is in a closed position, the first cover portion 1310 may hide at least a portion of the front side 1200-1 of the primary device 1200. The first cover portion 1310 may include surfaces 1310-1 and 1310-2 facing each other.

Referring to FIG. 17, the input unit or output unit 131 may be disposed on the first surface 1310-1 (e.g., a surface that may contact the front side 1200-1 of the primary device 1200) of the first cover portion 1310. Referring to FIG. 18, the input unit or output unit 131 may be disposed on the second surface 1310-2 (e.g., a surface opposite to the first surface 1310-1) of the first cover portion 1310. Referring to FIG. 19, the input unit or output unit 131 may be disposed on the first surface 1310-1 and the second surface 1310-2 of the first cover portion 1310. An input unit of the electronic cover 1300 may include a touch panel (e.g., a touch panel of a capacitive overlay, a resistance overlay or a surface acoustic wave, and an infrared beam) or a digitizer (or a pen sensor), etc. An output unit of the electronic cover 1300 may include an Electro Wetting Display (EWD), Electrophoretic Ink (E-ink), a Plasma Display Panel (PDP), a Liquid Crystal Display (LCD), an Organic Light Emitting Diode (OLED), or an Active Matrix Organic Light Emitting Diodes (AMO-LED), etc. The output unit of the electronic cover 1300 may include a speaker.

FIGS. 20A to 20C are views illustrating tables regarding a type of an electronic cover according to an embodiment of the present disclosure.

The Table of FIG. 20A illustrates types of the electronic cover 1300 that disposes an input unit or output unit 131 on the first surface 1310-1 of the first cover portion 1310 (i.e., referring to FIG. 17). For example, the electronic cover 1300 may apply E-ink as an output unit, and apply at least one of a touch panel and a digitizer as an input unit.

The Table of FIG. 20B illustrates types of the electronic cover 1300 that disposes an input unit or output unit 131 on the second surface 1310-2 of the first cover portion 1310 (i.e., referring to FIG. 18). For example, the electronic cover 1300 may apply a color display (e.g., a PDP, an LCD, an OLED, or an AMOLED, etc.) as an output unit, and apply at least one of a touch panel and a digitizer as an input unit.

The Table of FIG. 20C illustrates types of the electronic cover 1300 that disposes an input unit or output unit 131 on the first surface 1310-1 and the second surface 1310-2 of the first cover portion 1310 (refer to FIG. 19). For example, the electronic cover 1300 may apply E-ink or a color display as an output unit, and apply at least one of a touch panel and a digitizer as an input unit.

According to an embodiment, the electronic cover 1300 may include a 3-Dimensional (3-D) display or a hologram display device. For example, an electronic device 12 may control a 3-D display or a hologram display device depending on an open/close state of the first cover portion 1310. For example, the electronic device 12 may adjust 3-D information for an object displayed on the 3-D display or the hologram display device depending on an angle (e.g., an open/close degree) between the first cover portion 1310 and the primary device 1200.

Figure 21:
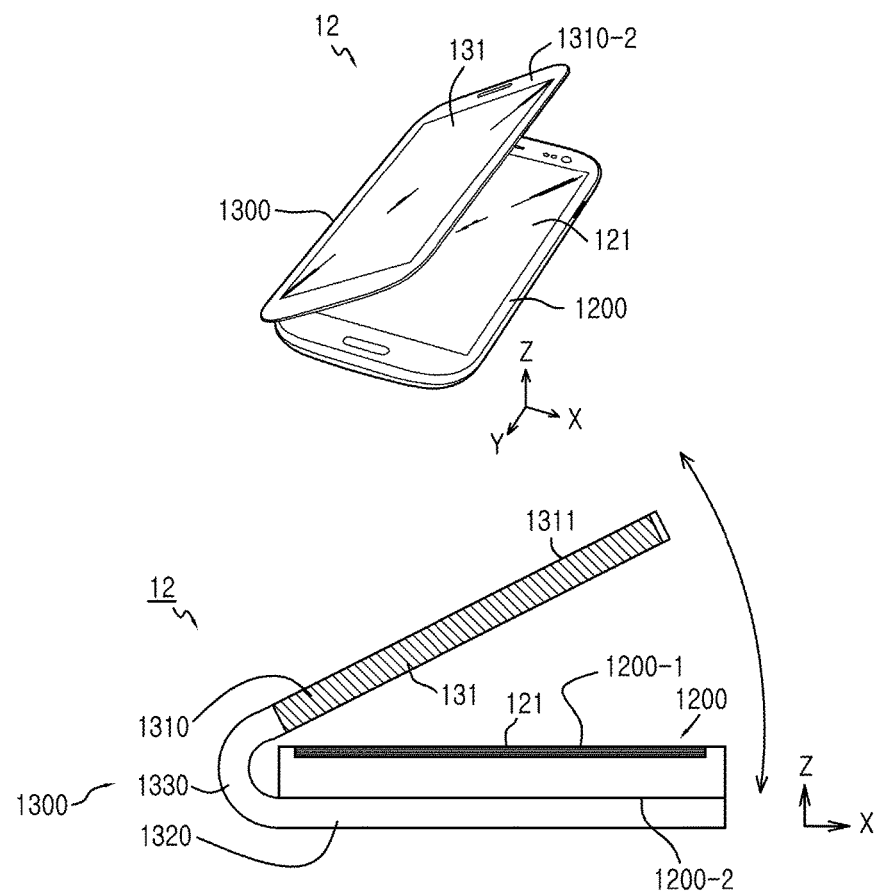
FIG. 21 is a view illustrating an electronic device according to an embodiment of the present disclosure.

FIG. 21 is a view illustrating an electronic device according to an embodiment of the present disclosure.

Referring to FIG. 21, the first cover portion 1310 of the electronic cover 1300 may include at least partial transparent region 1311. The at least partial transparent region 1311 may include a transparent input unit or a transparent output unit. Even when the first cover portion 1310 is in a closed position, a screen of the touchscreen 121 of the primary device 1200 is visible to the outside via the at least partial transparent region 1311 of the first cover portion 1310. For example, in the case where the first cover portion 1310 is in the closed position, an image via the touchscreen 121 of the primary device and an image via a transparent input unit of the first cover portion 1310 may overlap and be provided to a user.

FIG. 22 is a view illustrating a table regarding a type of an electronic cover according to an embodiment of the present disclosure.

The Table of FIG. 22 illustrates types of the electronic cover 1300 that disposes the input unit or output unit 131 on the transparent region 1311 of the electronic cover 1300 (refer to FIG. 21). For example, the electronic cover 1300 may apply E-ink as a transparent output unit, and apply a touch panel as an input unit.

Figure 23:
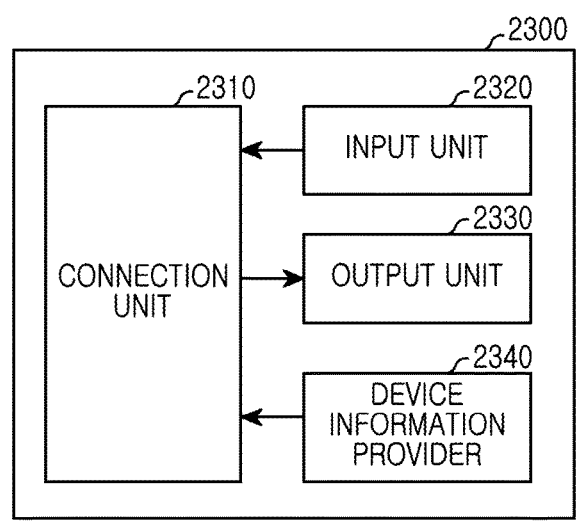
FIG. 23 is a block diagram illustrating an electronic cover according to an embodiment of the present disclosure.

FIG. 23 is a block diagram illustrating an electronic cover according to an embodiment of the present disclosure.

Referring to FIG. 23, the electronic cover 2300 may include a connection unit 2310, an input unit 2320, an output unit 2330, or a device information provider 2340.

The connection unit 2310 may establish communication between the electronic cover 2300 and a primary device 1200 (not shown) via wired communication and wireless communication. The wireless communication, for example, may include at least one of Wi-Fi, BT, and NFC. The wired communication, for example, may include at least one of USB, HDMI, RS-232, and POTS.

The connection unit 2310 may transmit an instruction or data input by a user to the primary device 1200 via an input unit 2320 (e.g., a sensor, a touch panel, a digitizer, etc.). Also, the connection unit 2310 may output an instruction or data received from the primary device 1200 to the user via the output unit 2330 (e.g., a display or a speaker, etc.).

The input unit 2320 (e.g., a touch panel, a digitizer, a sensor, a keyboard, a microphone, etc.) may receive an input by the user. For example, the input unit 2320 (e.g., a touch panel) may receive an input corresponding to a user touch. Also, the input unit 2320 (e.g., a digitizer) may receive an input corresponding to a touch of a stylus. Also, the input unit 2320 (e.g., a gesture sensor, a gyro sensor, an air pressure sensor, a magnetic sensor, an acceleration sensor, a grip sensor, a proximity sensor, a color sensor, a living body sensor, a temperature/humidity sensor, an illumination sensor, a UV sensor, etc.) may measure a physical quantity or detect an operation state of the electronic cover 2300 to generate an input corresponding to the measured or detected information. Also, the input unit 2320 may include an image sensor for image pick-up.

The output unit 2330 (e.g., a display) may display various information (e.g., multimedia data or text data, etc.) to the user. The output unit 2330 (e.g., a speaker) may output various information to the user in the form of sounds.

Though not shown, the electronic cover 2300 may further include various other peripheral devices (e.g., an antenna, a solar battery a memory, etc.). For example, an antenna (e.g., an NFC antenna) of the electronic cover 2300 may be connected to a specific communication module of the primary device 1200 electrically or functionally via the connection unit 2310. For example, the electronic cover 2300 may include an antenna for broadcasting or a diversity antenna. Also, a solar battery of the electronic cover 2300 may be connected to a battery charge module of the primary device 1200 electrically or functionally via the connection unit 2310. Also, a memory of the electronic cover 1300 may store various data exchanged during a communication process with the primary device 1200.

The device information provider 2340 may store configuration information of the electronic cover 2300 (e.g., a type (e.g., specification) or a disposed position of the input unit 2320, the output unit 2330, the antenna, the solar battery or the memory, etc., a shape of the electronic cover 2300, a size, etc.), and provide these configuration information to the primary device 1200 via the connection unit 2310. Alternatively, the device information provider 2340 may store device identify information indicating the electronic cover 2300, and provide the device identify information to the primary device 1200. Here, the primary device 1200 may omit a procedure for determining the type of the electronic cover 1300. According to an embodiment, the type or configuration information of the electronic cover 1300 may be input or corrected by a user.

Though not shown, the electronic cover 2300 may further include a processor for controlling an overall operation of the electronic cover 1300. The processor of the electronic cover 2300 may receive an input from the input unit 2320, and transmit an output to the output unit 2330 by the medium of an I/O interface (not shown). The processor of the electronic device 2300 may exchange data regarding a cooperation operation with the processor (e.g., the processor 120 of FIG. 1) of the primary device 1200. The processor of the electronic cover 2300 may include the device information provider 2340. The processor of the electronic cover 2300 may execute a software module (i.e., an instruction set) stored in a memory (not shown) to perform various functions corresponding to the module. The processor, the I/O interface, and the memory of the electronic cover 2300 may be configured as an integrated circuit.

Figure 24:
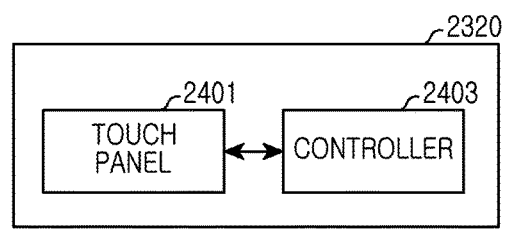
FIGS. 24 and 25 are block diagrams illustrating an input unit of an electronic cover according to an embodiment of the present disclosure.

FIG. 24 is a block diagram illustrating an input unit of an electronic cover according to an embodiment of the present disclosure.

Referring to FIG. 24, the input unit 2320 may include a touch panel 2401 or a controller 2403. The controller 2403 may control a touch panel 2401 (e.g., a touch panel of a capacitive overlay, a resistance overlay, a surface acoustic wave, an infrared beam, etc.), and detect a position of a user touch on the touch panel 2401. The controller 2403 may be one of a plurality of processors, and may control an input that uses the touch panel 2401 via data exchange with the processor (e.g., the processor 120 of FIG. 1) of the primary device 1200. In the case where the controller 2403 is mounted on the primary device 1200, the controller 2403 may be omitted from the electronic cover 2300.

Figure 25:
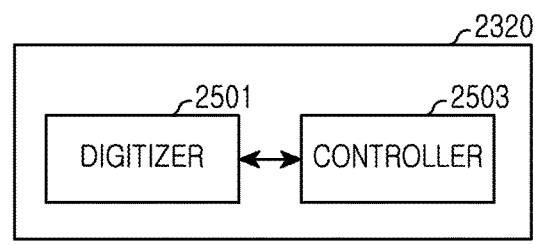

FIG. 25 is a block diagram illustrating an input unit of an electronic cover according to an embodiment of the present disclosure.

Referring to FIG. 25, the input unit 2320 may include a digitizer 2501 or a controller 2503. The controller 2503 may control the digitizer 2501 (e.g., a digitizer of an electromagnetic induction type), and detect a position of a touch by a stylus on the digitizer 2501. The controller 2503 may be one of a plurality of processors, and may control an input that uses the digitizer 2501 via data exchange with the processor (e.g., the processor 120 of FIG. 1) of the primary device 1200. In the case where the controller 2503 is mounted on the primary device 1200, the controller 2503 may be omitted from the electronic cover 2300.

Figure 26:
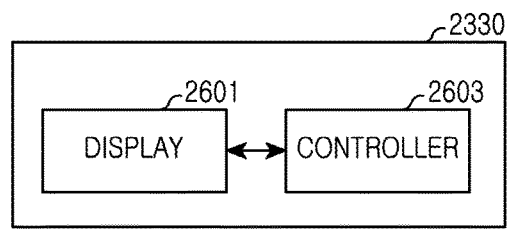
FIG. 26 is a block diagram illustrating an output unit of an electronic cover according to an embodiment of the present disclosure.

FIG. 26 is a block diagram illustrating an output unit of an electronic cover according to an embodiment of the present disclosure.

Referring to FIG. 26, the output unit 2330 may include a display 2601 and a controller 2603. The display 2601 (e.g., an EWD, an E-Paper, a PDP, an LCD, an OLED, an AMOLED, etc.) may output image information provided from the primary device 1200 under control of the controller 2603. The controller 2603 may be one of a plurality of processors, and may control an output of the display 2601 via data exchange with the processor (e.g., the processor 120 of FIG. 1) of the primary device 1200. In the case where the controller 2603 is mounted on the primary device 1200, the controller 2603 may be omitted from the electronic cover 2300.

According to an embodiment of the present disclosure, the electronic device (e.g., the electronic device 12) may include the primary device 1200 including a first I/O unit. Also, the electronic device 12 may be connected with the primary device 1200 electrically or functionally, cover at least a portion of the primary device 1200, and include the electronic cover 1300 including a second I/O unit and a processor (e.g., the processor 120) for controlling the first I/O unit and the second I/O unit.

According to an embodiment of the present disclosure, the processor 120 may activate or inactivate the first I/O unit of the primary device 1200 or the second I/O unit of the electronic cover 1300 depending on whether contents are suitable.

According to an embodiment of the present disclosure, the processor 120 may activate or inactivate the first I/O unit of the primary device 1200 or the second I/O unit of the electronic cover 1300 in response to data obtained from at least one sensor (e.g., a sensor module 9940 of FIG. 99, described below).

According to an embodiment of the present disclosure, the processor 120 may activate or inactivate the first I/O unit of the primary device 1200 or the second I/O unit of the electronic cover 1300 in response to movement of the primary device 1200 or the electronic cover 1300.

According to an embodiment of the present disclosure, the electronic cover 1300 is a cover for a first surface (e.g., the front side 1200-1) of the electronic device (e.g., the device 1200), and may include a first cover portion 1310 including at least one input unit or output unit on the front side or backside. Also, the electronic cover 1300 is a cover for a second surface (e.g., the backside 1200-2) of the electronic device 1200, and may include a second cover portion 1320 which is detachable and set to communicate with the first cover portion 1310.

According to an embodiment of the present disclosure, the second cover portion 1320 of the electronic cover 1300 may be set to communicate with the electronic device 1200.

According to an embodiment of the present disclosure, in the case where the second cover portion 1320 of the electronic cover 1300 is coupled to the electronic device 1200, the second cover portion 1320 may be set to transmit a signal informing coupling to the electronic device 1200.

According to an embodiment of the present disclosure, at least one of the first cover portion 1310 and the second cover portion 1320 of the electronic cover 1300 may be set to transmit information (e.g., at least one of a type and a disposed position of the input unit or the output unit is included) regarding at least one input unit or output unit to the electronic device 1200.

According to an embodiment of the present disclosure, the input unit of at least one of the first cover portion 1310 and the second cover portion 1320 of the electronic cover 1300 may include at least one of a touch panel and a digitizer.

According to an embodiment of the present disclosure, the input unit of at least one of the first cover portion 1310 and the second cover portion 1320 of the electronic cover 1300 may include a sensor that may detect opening/closing of the first cover portion 1310.

According to an embodiment of the present disclosure, the output unit of at least one of the first cover portion 1310 and the second cover portion 1320 of the electronic cover 1300 may include at least one of an EWD, an E-Paper, a PDP, an LCD, an OLED, an AMOLED, etc.

According to an embodiment of the present disclosure, at least one input unit or output unit of the electronic cover 1300 may be disposed on a transparent region formed on the transparent first cover portion 1310.

According to an embodiment of the present disclosure, the disposed position of at least one input unit or output unit of the electronic cover 1300 may include at least one of the front side or the backside of the first cover portion 1310.

According to an embodiment of the present disclosure, the at least one input unit or output unit of the electronic cover 1300 may be activated or inactivated under control of the electronic device 1200.

According to an embodiment of the present disclosure, the first cover portion 1310 of the electronic cover 1300 may be set to control a portion of the at least one input unit or output unit.

According to an embodiment of the present disclosure, at least one of the first cover portion and the second cover portion of the electronic cover may further include at least one of a memory, an antenna, a solar battery, etc.

According to an embodiment of the present disclosure, when the electronic cover 1300 is connected with the primary device 1200 functionally, the electronic device 12 may identify the type of the electronic cover 1300, and may perform a function related to an application, contents, a service, etc. which may be provided via the electronic device 12 in response to the identified type. For example, the electronic device 12 may perform various functions depending on a type where a display exists on a surface corresponding to the primary device 1200 in the electronic cover 1300, a type where a display exists on a side opposite to a surface corresponding to the primary device 1200 in the electronic cover 1300, a position and an operation state of the cover, specification of the display, setting, etc.

Figure 27:
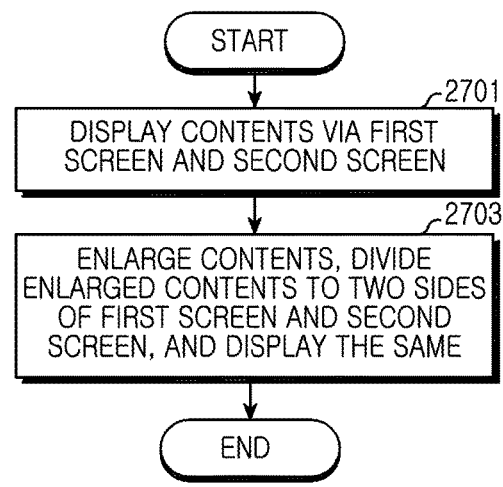
FIG. 27 is a flowchart illustrating a UI operation according to an embodiment of the present disclosure.

FIG. 27 is a flowchart illustrating a UI operation according to an embodiment of the present disclosure.

Referring to FIG. 27, in operation 2701, the UI module 180 may display contents via a first screen (e.g., the screen of the primary device 1200) or a second screen (e.g., the screen of the electronic cover 1310). In operation 2703, for example, the UI module 180 may enlarge contents in response to a zoom-in event, and divide the enlarged contents to at least two sides of the first screen (e.g., the screen of the primary device 1200) and the second screen (e.g., the screen of the electronic cover 1310) and display the same. For example, in the case where the electronic cover 1310 is identified as a type not including a display, the electronic device 12 may display the enlarged contents via only the first screen in response to the same input.

Figure 28:
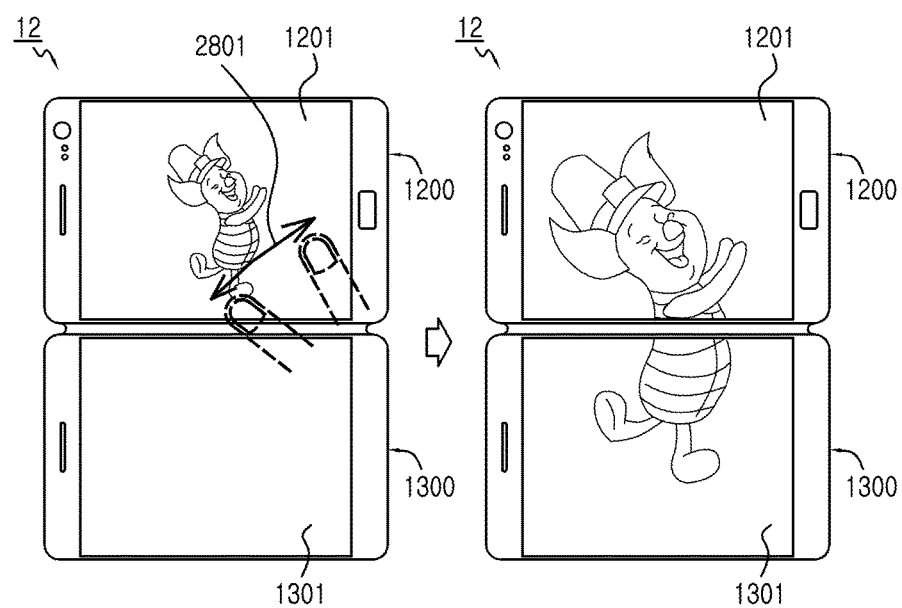
FIGS. 28 and 29 are views illustrating a screen of an electronic device according to an embodiment of the present disclosure.
Figure 29:
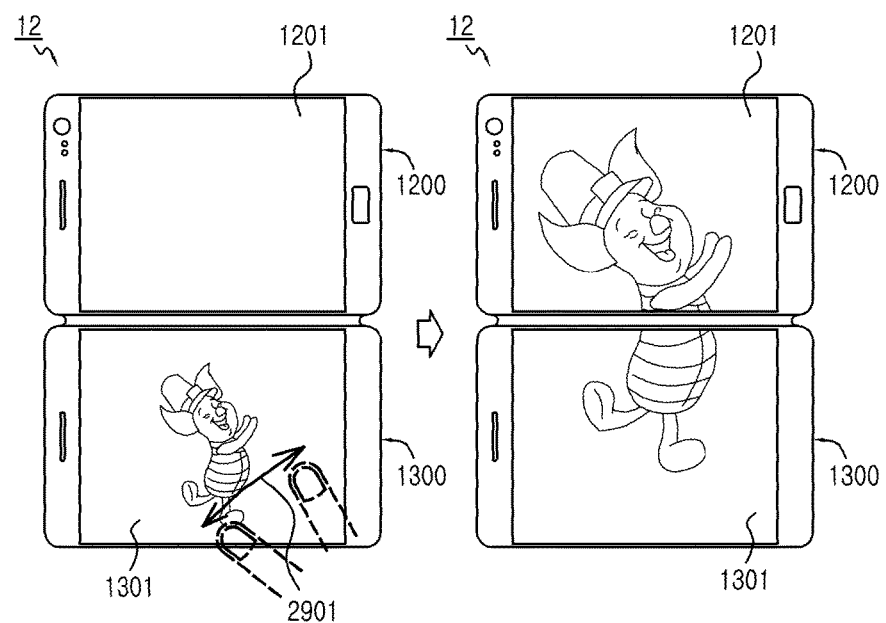

FIGS. 28 and 29 are views illustrating a screen of an electronic device according to an embodiment of the present disclosure.

Referring to FIG. 28, for example, the electronic cover (e.g., the first cover portion 1310) is in an open position (e.g., open by an angle of 180 degree), and the electronic device 12 may display an image via a screen 1201 of the primary device 1200. In the case where a user performs a multi-touch gesture 2801 of touching a screen 1201 of the primary device 1200 with two fingers and spreading the fingers, a zoom-in event may occur. The electronic device 12 may enlarge an image according to a pinch-to-zoom function corresponding to the zoom-in event, and divide the enlarged image to two sides of the screen 1201 of the primary device 1200 and a screen 1301 of the electronic cover 1300, and display the same. For example, in the case where all of the enlarged image is displayable within the screen 1201 of the primary device 1200, the electronic device 12 may display the enlarged image via the primary device 1200. In contrast, in the case where all of the enlarged image is not displayable within the screen 1201 of the primary device 1200, the electronic device 12 may display at least a portion of the enlarged image via the electronic cover 1300. For example, a displaying operation depending on image enlargement may operate depending on an enlarge ratio of an image.

Referring to FIG. 29, for example, the electronic cover (e.g., the first cover portion 1310) is in the open position (e.g., open by an angle of 180 degree), and the electronic device 12 may display an image via the screen 1301 of the electronic cover 1300. In the case where the user performs a multi-touch gesture 2901 of touching the screen 1301 of the electronic cover 1300 with two fingers and spreading the fingers, the electronic device 12 may enlarge an image according to a pinch-to-zoom function, and divide the enlarged image to two sides of the screen 1201 of the primary device 1200 and the screen 1301 of the electronic cover 1300, and display the same. For example, in the case where all of the enlarged image is displayable within the screen 1301 of the electronic cover 1300, the electronic device 12 may display the enlarged image via the electronic cover 1300. In contrast, in the case where all of the enlarged image is not displayable within the screen 1301 of the electronic cover 1300, the electronic device 12 may display at least a portion of the enlarged image via the primary device 1200.

Figure 30:
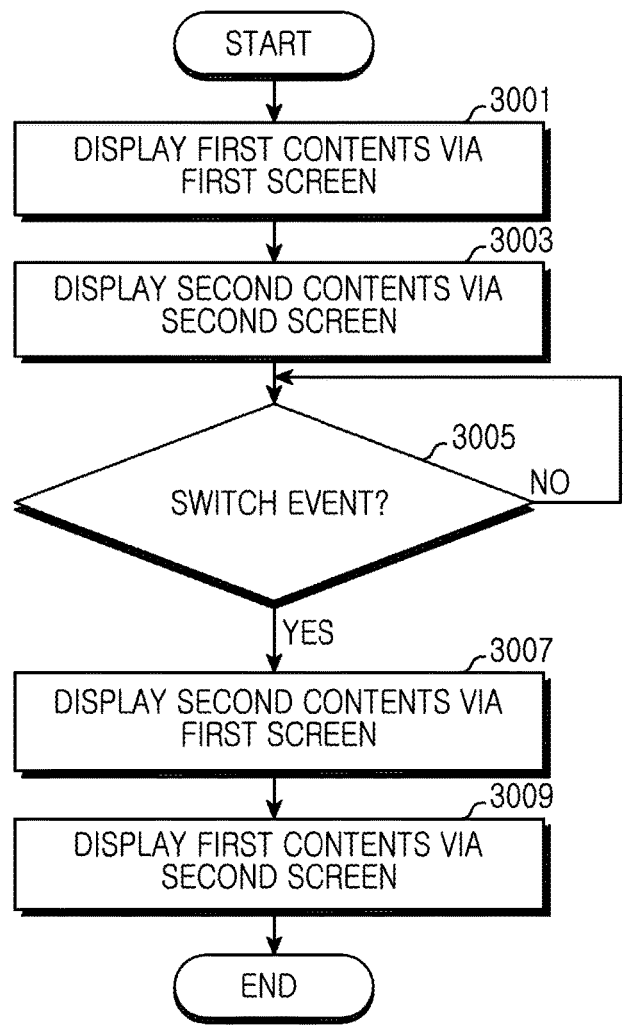
FIG. 30 is a flowchart regarding a UI operation according to an embodiment of the present disclosure.

FIG. 30 is a flowchart regarding a UI operation according to an embodiment of the present disclosure.

Referring to FIG. 30, in operation 3001, the UI module 180 (e.g., the processor 120) may display first contents (e.g., a moving picture, a photo, text, etc.) via a first screen (e.g., the screen of the primary device 1200). In operation 3003, the UI module 180 may display second contents (e.g., a moving picture, a photo, text, etc.) via a second screen (e.g., the screen of the electronic cover 1300). In operation 3005, the UI module 180 may determine whether a switch event occurs. In the case where the switch event occurs, in operation 3007, the UI module 180 may display the second contents via the first screen (e.g., the screen of the primary device 1200). In operation 3009, the UI module 180 may display the first contents via the second screen (e.g., the screen of the electronic cover 1300).

Figure 31:
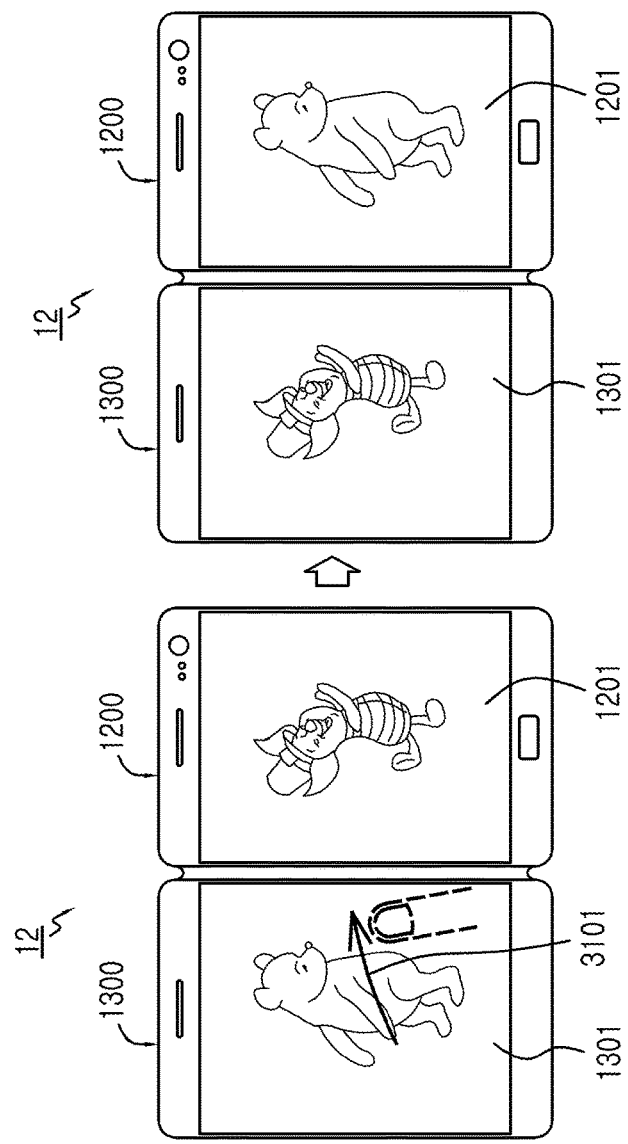
FIG. 31 is a view illustrating a screen of an electronic device according to an embodiment of the present disclosure.

FIG. 31 is a view illustrating a screen of an electronic device according to an embodiment of the present disclosure.

Referring to FIG. 31, for example, the electronic cover (e.g., the first cover portion 1310) is in the open position (e.g., open by an angle of 180 degree), and the electronic device 12 may display a first image via the screen 1201 of the primary device 1200, and display a second image via the screen 1301 of the electronic cover 1310. In the case where a user performs a touch gesture 3101 of touching the screen 1301 of the electronic cover 1300 or the screen 1201 of the primary device 1200 and moving his fingers to the left or the right, a screen change event (e.g., a switch event in operation 3005 of FIG. 30) may occur. The electronic device 12 may display a first image on the screen 1301 of the electronic cover 1300 and display a second image via the screen 1201 of the primary device 1200 depending on a screen change function corresponding to the screen change event.

Figure 32:
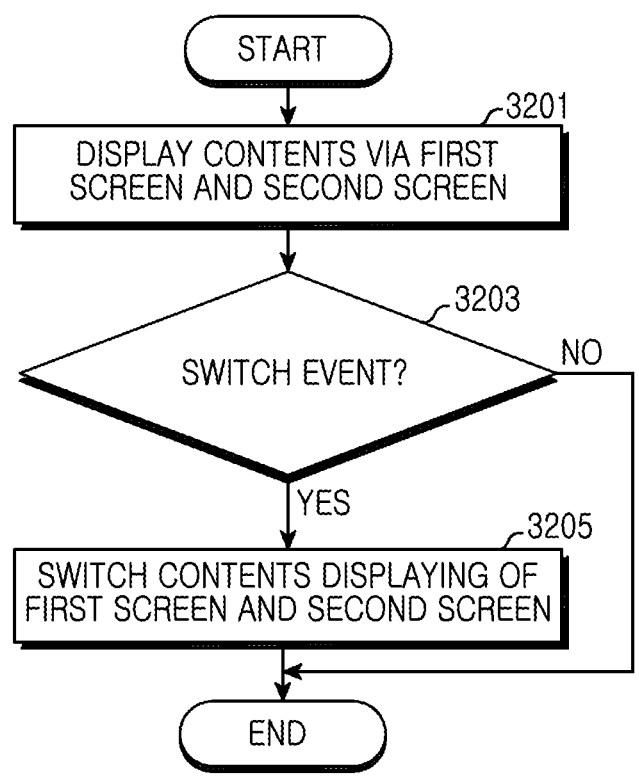
FIG. 32 is a flowchart regarding a UI operation according to an embodiment of the present disclosure.

FIG. 32 is a flowchart regarding a UI operation according to an embodiment of the present disclosure.

Referring to FIG. 32, in operation 3201, the UI module 180 (e.g., the processor 120) may display contents via at least one of a first screen (e.g., the screen of the primary device 1200) or a second screen (e.g., the screen of the electronic cover 1300). In operation 3203, the UI module 180 may determine whether a switch event (e.g., a scroll event, etc.) occurs. In the case where the switch event occurs, in operation 3205, the UI module 180 may switch (e.g., scroll) contents displayed on at least one of the first screen (e.g., the screen of the primary device 1200) and the second screen (e.g., the screen of the electronic cover 1310).

Figure 33:
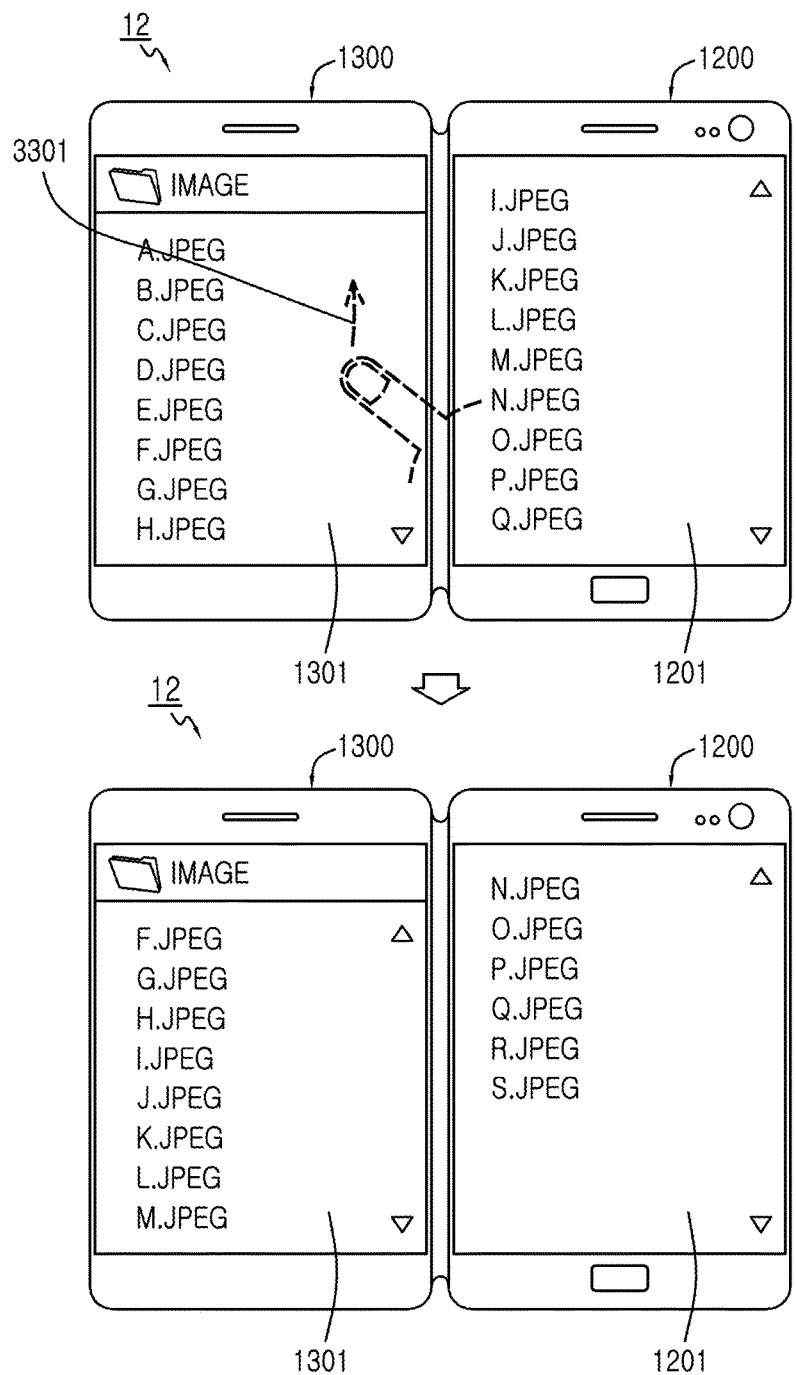
FIGS. 33, 34, 35, and 36 are views illustrating a screen of an electronic device according to an embodiment of the present disclosure.
Figure 34:
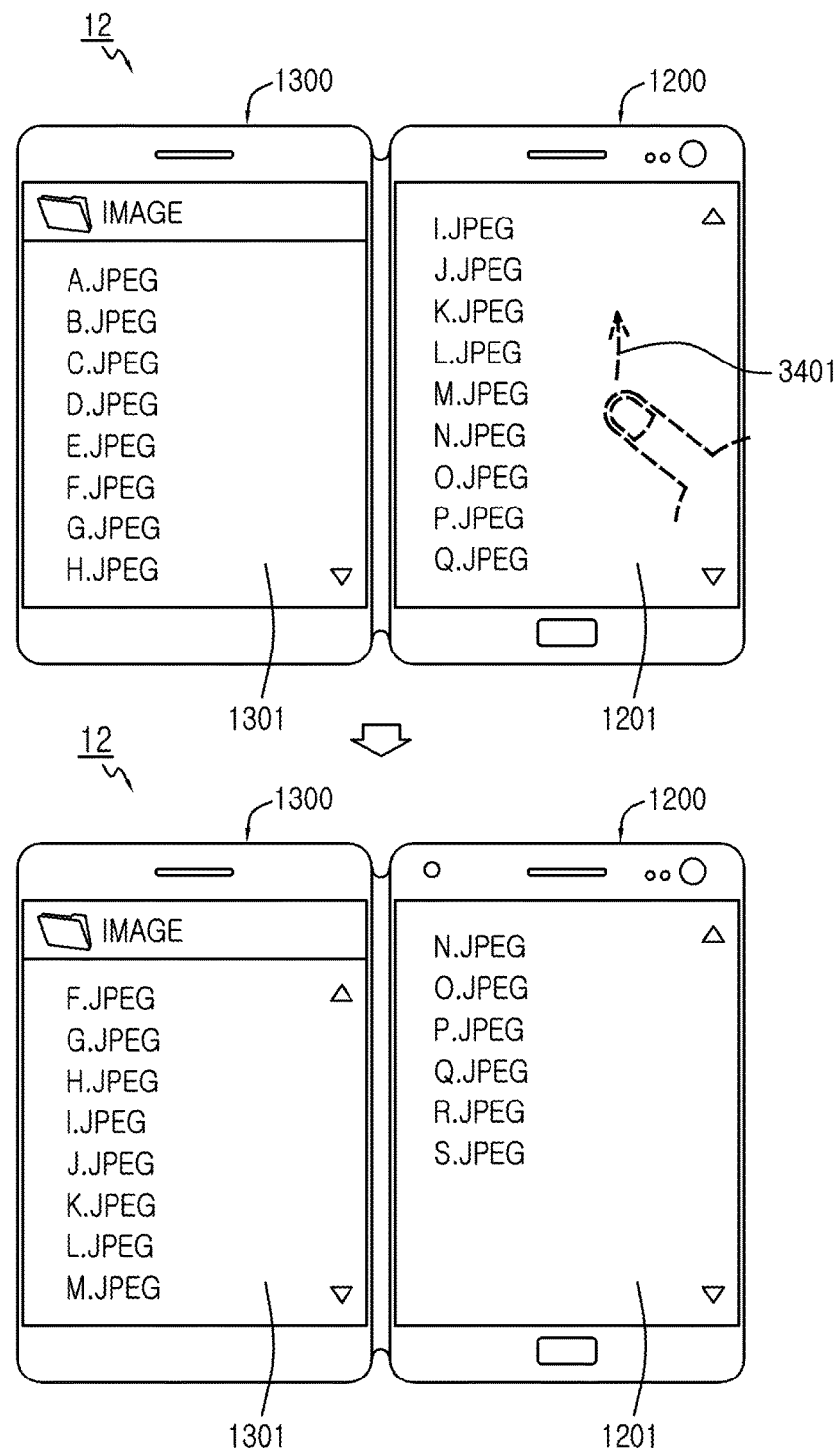

FIGS. 33 and 34 are views illustrating a screen of an electronic device according to an embodiment of the present disclosure.

Referring to FIGS. 33 and 34, for example, the electronic cover (e.g., the first cover portion 1310) is in the open position, the screen 1201 of the primary device 1200 and the screen 1301 of the electronic cover 1300 may be arranged left and right. For example, the electronic device 12 may display contents (e.g., a contents list) via the screen 1201 of the primary device 1200 and the screen 1301 of the electronic cover 1300. In the case where a gesture 3301 input by a user, related to the screen 1301 of the electronic cover 1300, or where a gesture 3401 input by a user, related to the screen 1201 of the primary device 1200 exists, the electronic device 12 may switch (e.g., scroll) contents displayed of the two screens 1201 and 1301. For example, as a contents list is scrolled on the screen 1201 of the primary device 1200, a contents list displayed on the screen 1301 of the electronic cover 1300 may be scrolled in response to the scrolling.

Figure 35:
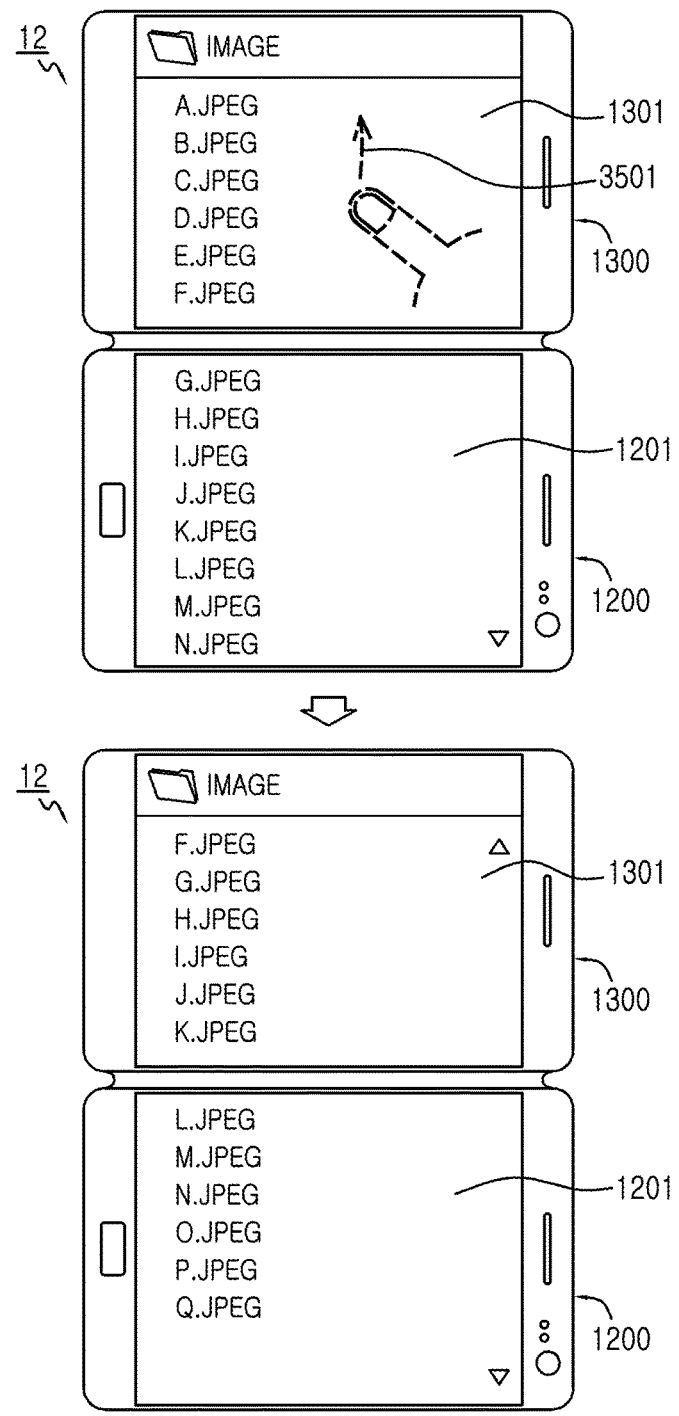

FIG. 35 is a view illustrating a screen of an electronic device according to an embodiment of the present disclosure.

Referring to FIG. 35, the electronic cover (e.g., the first cover portion 1310) is in the open position, the screen 1201 of the primary device 1200 and the screen 1301 of the electronic cover 1300 may be changed from left/right arrangement (refer to FIG. 33 or 34) to up/down arrangement. Here, the display of contents may also be changed from left/right arrangement to up/down arrangement. In the case where a gesture input (e.g., a flicking touch 3501) by a user exists (e.g., a switch event occurs in operation 3203 of FIG. 32) on the screen (e.g., the screen 1301 of the electronic cover 1300 or the screen 1201 of the primary device 1200), the electronic device 12 may switch (e.g., scroll) contents displayed of the two screens 1201 and 1301. For example, as a contents list is scrolled in the screen 1201 of the primary device 1200, a contents list displayed on the screen 1301 of the electronic cover 1300 may be scrolled in response to the scrolling.

Figure 36:
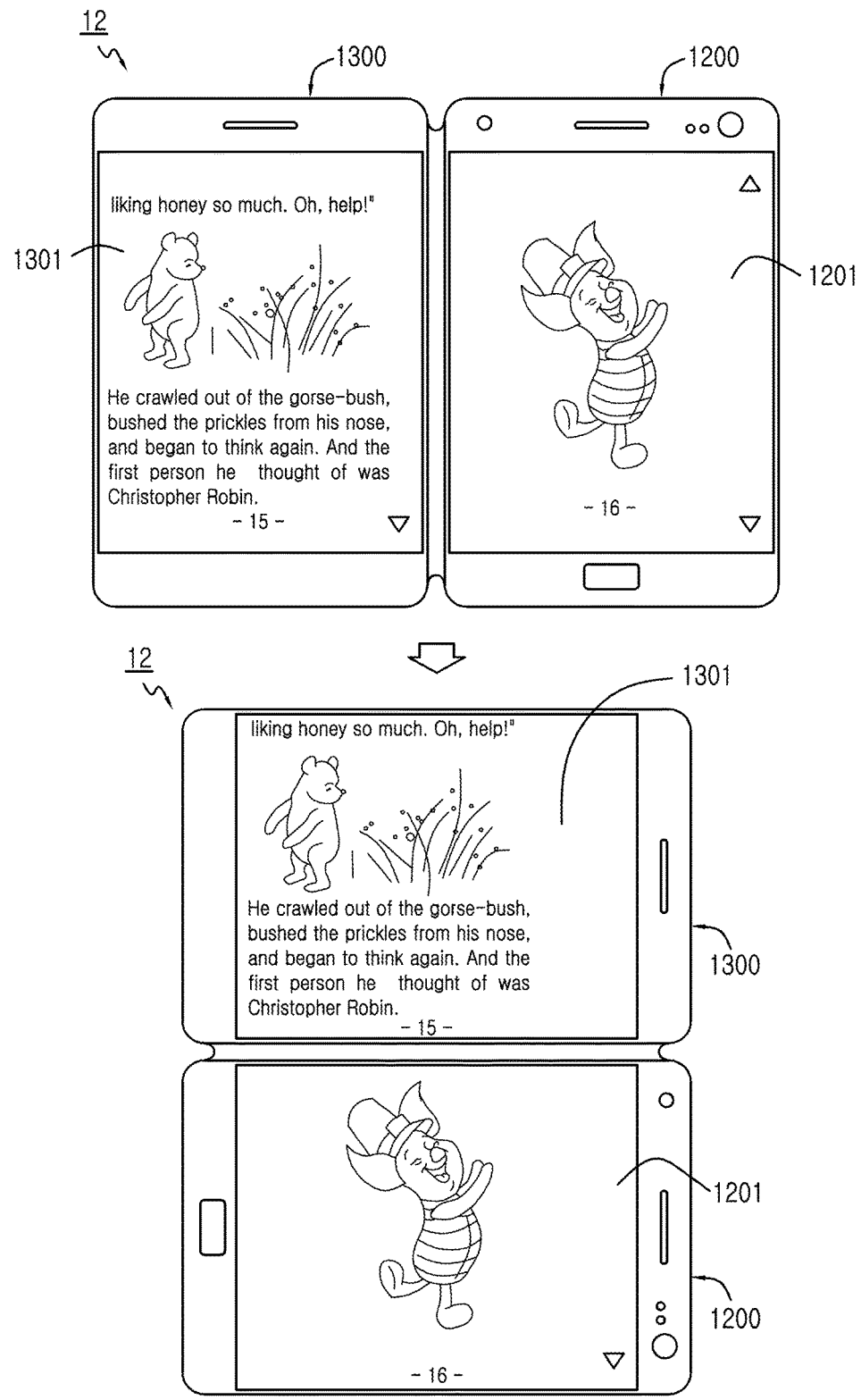

FIG. 36 is a view illustrating a screen of an electronic device according to an embodiment of the present disclosure.

Referring to FIG. 36, for example, the screen 1201 of the primary device 1200 and the screen 1301 of the electronic cover 1300 may be arranged left and right, and the electronic device 12 may display first contents (e.g., a first page of an electronic book) in a vertical view via the screen 1201 of the primary device 1200, and display second contents (e.g., a second page of the electronic book) in the vertical view via the screen 1301 of the electronic cover 1300. In the case where the electronic device 12 rotates (e.g., rotates by an angle of 90 degree) (e.g., a switch event occurs in operation 3203 of FIG. 32), the screen 1201 of the primary device 1200 and the screen 1301 of the electronic cover 1300 may be arranged up and down, and the electronic device 12 may switch display of first contents and second contents in a horizontal view.

According to an embodiment, in the case where the electronic device 12 rotates and the direction of display changes, the electronic device 12 may recognize the disposition of the screen 1201 of the primary device 1200 and the screen 1301 of the electronic cover 1300. For example, when it is recognized that the electronic device is disposed in the horizontal direction, the screen 1301 of the cover 1300 is disposed in the upper side, and the screen 2101 of the primary device 1200 is disposed in the lower side, the electronic device 12 may display first contents (e.g., a first page of an electronic book) on the screen 1301 of the cover 1300, and display second contents (e.g., a second page of the electronic book) on the screen 1201 of the primary device 1200. It is obvious that the above embodiment may operate in response to a disposed direction and rotation of the display.

Figure 37:
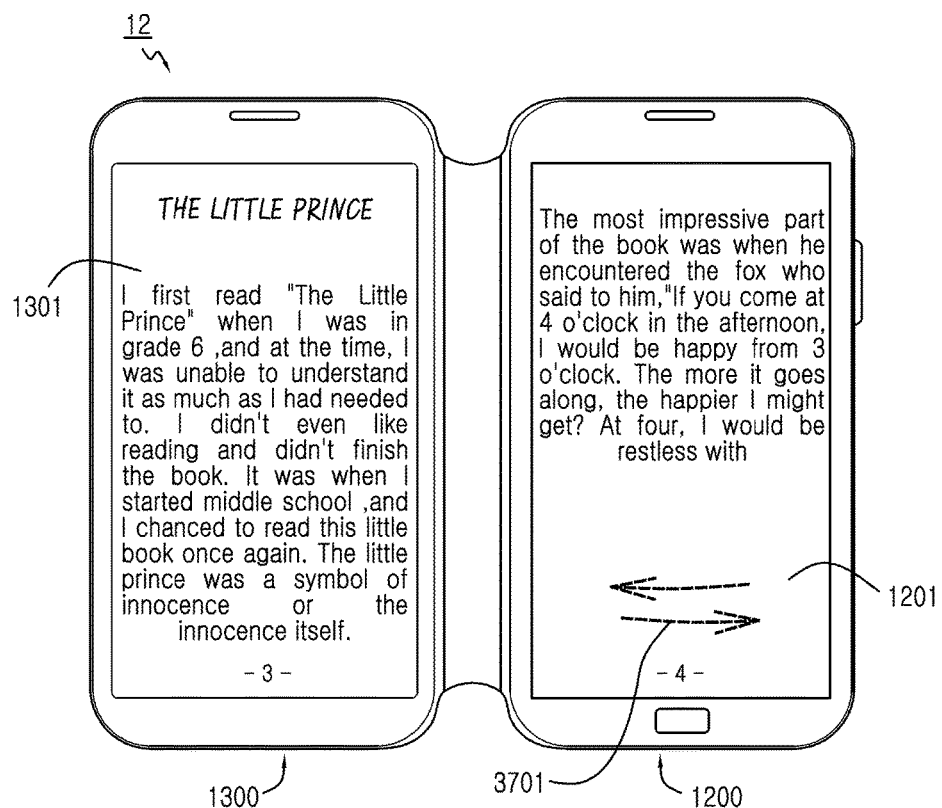
FIGS. 37, 38, and 39 are views illustrating a screen of an electronic device according to an embodiment of the present disclosure.
Figure 38:
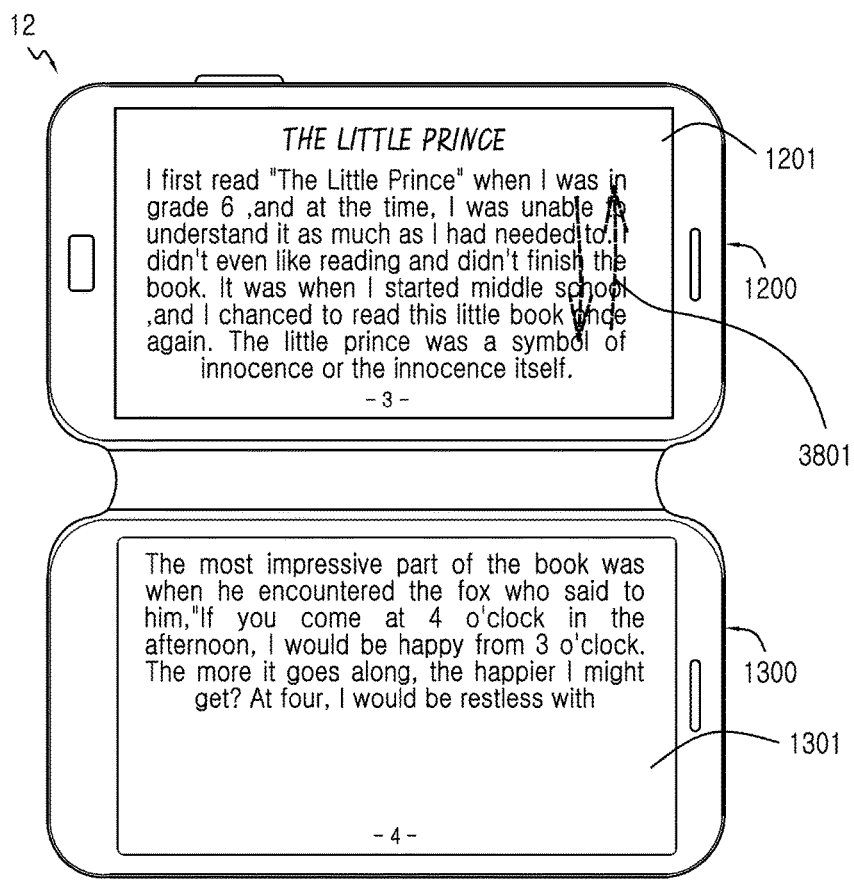

FIGS. 37 and 38 are views illustrating a screen of an electronic device according to an embodiment of the present disclosure.

Referring to FIG. 37, for example, the electronic cover (e.g., the first cover portion 1310) is in the open position, the screen 1201 of the primary device 1200 and the screen 1301 of the electronic cover 1300 may be disposed left and right. The electronic device 12 may display contents (e.g., an electronic book) via the screen 1201 of the primary device 1200 and the screen 1301 of the electronic cover 1300.

Referring to FIG. 38, the electronic cover (e.g., the first cover portion 1310) is in the open position, the screen 1201 of the primary device 1200 and the screen 1301 of the electronic cover 1300 may be changed from left/right arrangement (refer to FIG. 37) to up/down arrangement. Here, the display of contents may be also changed from left/right arrangement to up/down arrangement. In the case where a gesture input (e.g., flicking touches 3701 and 3801) by a user exists on the screen (e.g., the screen 1201 of the primary device 1200 or the screen 1301 of the electronic cover 1300), the electronic device 12 may switch (e.g., scroll) contents displayed of the two screens 1201 and 1301. For example, referring to FIG. 38, in response to a gesture input, the electronic device 12 may display contents (e.g., a fourth page of an electronic book) that have been displayed on the screen 1301 of the electronic cover 1300 on the screen 1201 of the primary device 1200, and display other contents (e.g., a fifth page of the electronic book) on the screen 1301 of the electronic cover 1300.

Figure 39:
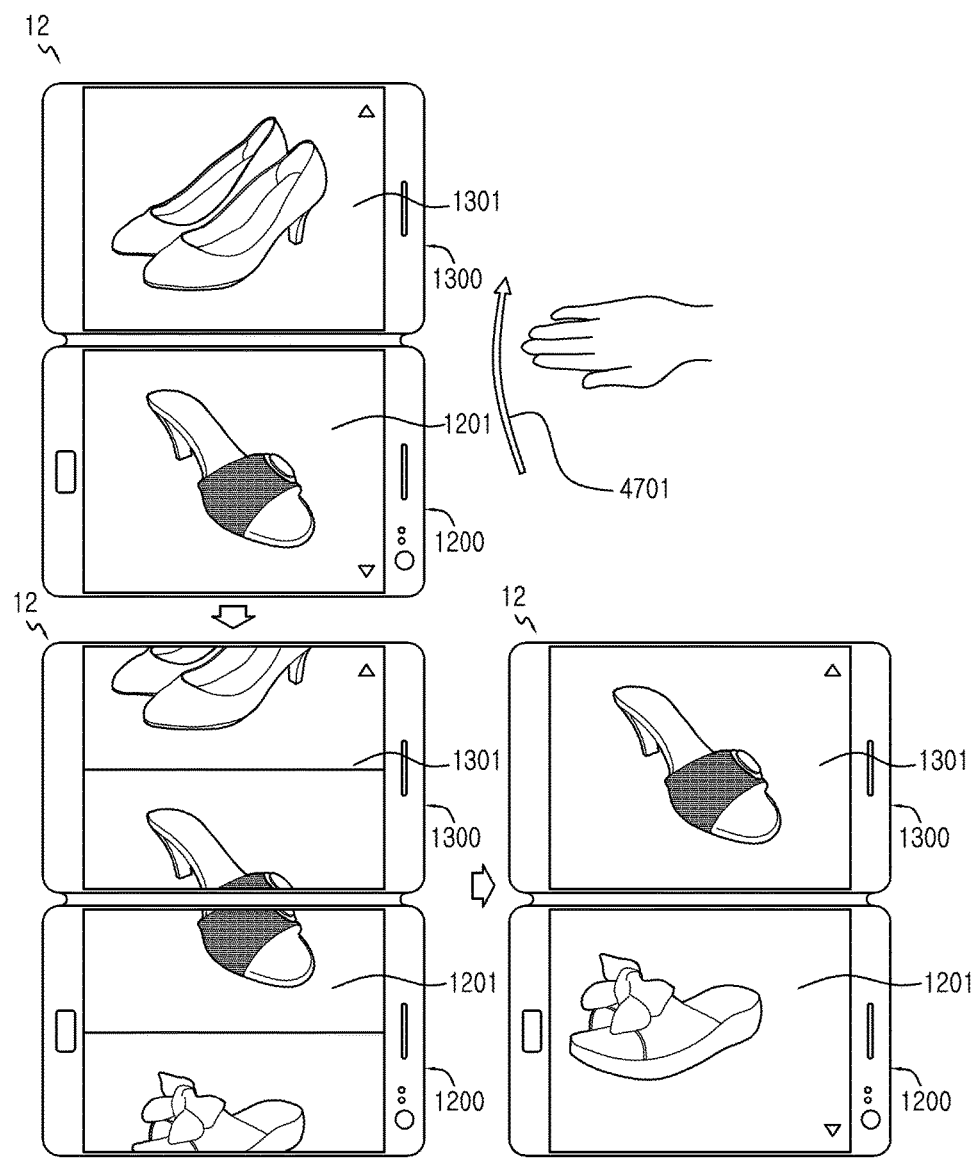

FIG. 39 is a view illustrating a screen of an electronic device according to an embodiment of the present disclosure.

Referring to FIG. 39, for example, the electronic cover (e.g., the first cover portion 1310) is in the open position, the screen 1201 of the primary device 1200 and the screen 1301 of the electronic cover 1300 may be disposed up and down. The electronic device 12 may display contents (e.g., an image, a web page, etc.) via both the screen 1201 of the primary device 1200 and the screen 1301 of the electronic cover 1300. In the case where a gesture 4701 (e.g., a switch event in operation 3203 of FIG. 32) of moving a hand is generated by a user, the electronic device 12 may switch (e.g., scroll) contents displayed of the two screens 1201 and 1301. For example, in response to the gesture 4701, the electronic device 12 may display one or more contents such that the contents slide through the screen 1201 of the primary device 1200 and the screen 1301 of the electronic cover 1300. For example, referring to FIG. 39, contents that have been displayed on the screen 1201 of the primary device 1200 pass through a process where the contents are displayed via both the screen 1201 of the primary device 1200 and the screen 1301 of the electronic cover 1300 in response to a user input, and then the contents may move to the screen of the electronic cover 1300.

Figure 40:
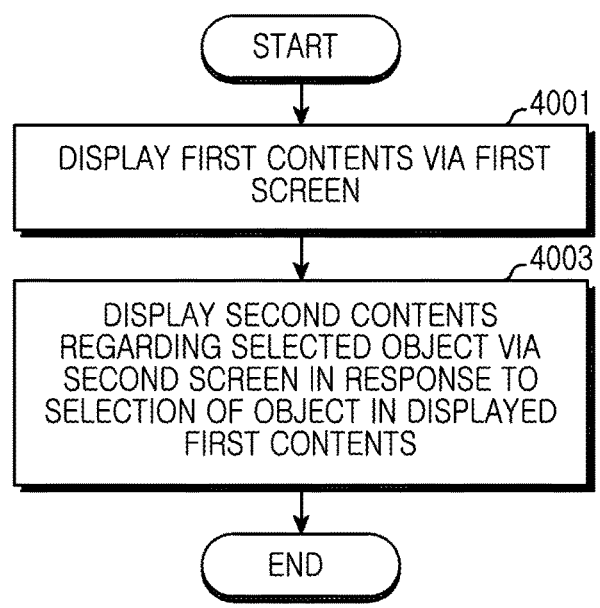
FIG. 40 is a flowchart regarding a UI operation according to an embodiment of the present disclosure.

FIG. 40 is a flowchart regarding a UI operation according to an embodiment of the present disclosure.

Referring to FIG. 40, in operation 4001, the UI module 180 (e.g., the processor 120) may display first contents via a first screen (e.g., the screen of the primary device 1200 or the screen of the electronic cover 1300). In operation 4003, in response to selection of an object in the first contents, the UI module 180 may display second contents regarding the selected object via a second screen (e.g., the screen of the primary device 1200 or the screen of the electronic cover 1300).

Figure 41:
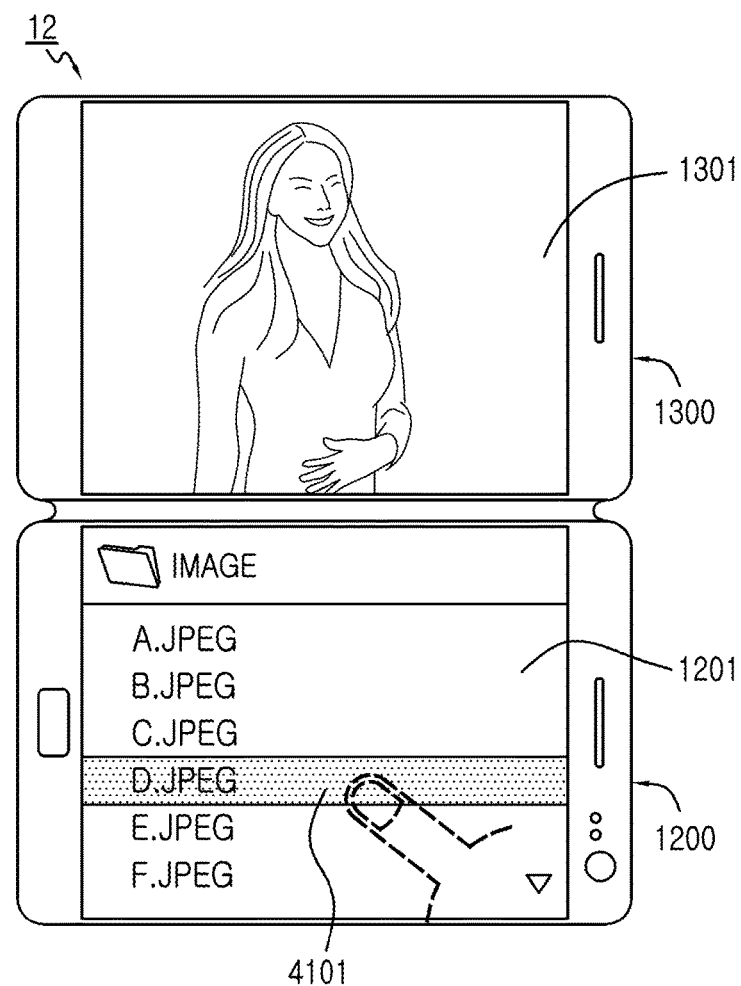
FIGS. 41, 42, 43, 44, and 45 are views illustrating a screen of an electronic device according to an embodiment of the present disclosure.

FIG. 41 is a view illustrating a screen of an electronic device according to an embodiment of the present disclosure.

Referring to FIG. 41, the electronic cover (e.g., the first cover portion 1310) is in an open position, and the screen 1201 of the primary device 1200 and the screen 1301 of the electronic cover 1300 may be arranged in two sides (e.g., up and down arrangement or left and right arrangement). The electronic device 12 may display a contents list (e.g., an image list) via a first screen (e.g., the screen 1201 of the primary device 1200). In the case where selection 4101 of an icon by a user touch exists in the contents list, the electronic device 12 may display contents regarding the selected icon via a second screen (e.g., the screen 1301 of the electronic cover 1300). For example, the electronic device 12 may select one of the first screen and the second screen depending on the kind of contents and the type of the electronic cover 1310 to display the contents regarding the selected icon. For example, in the case where the screen of 1301 of the electronic cover 1300 is an electronic ink display and the kind of the selected contents is electronic book contents, the electronic device 12 may display the selected contents on the screen 1301 of the electronic cover 1300. Also, for example, in the case where the screen of 1301 of the electronic cover 1300 is an electronic ink display and the screen 1201 of the primary device 1200 is an LCD (or an AMOLED) display, when moving picture contents are selected, the electronic device 12 may display the selected contents on the screen 1201 of the primary device 1200.

Figure 42:
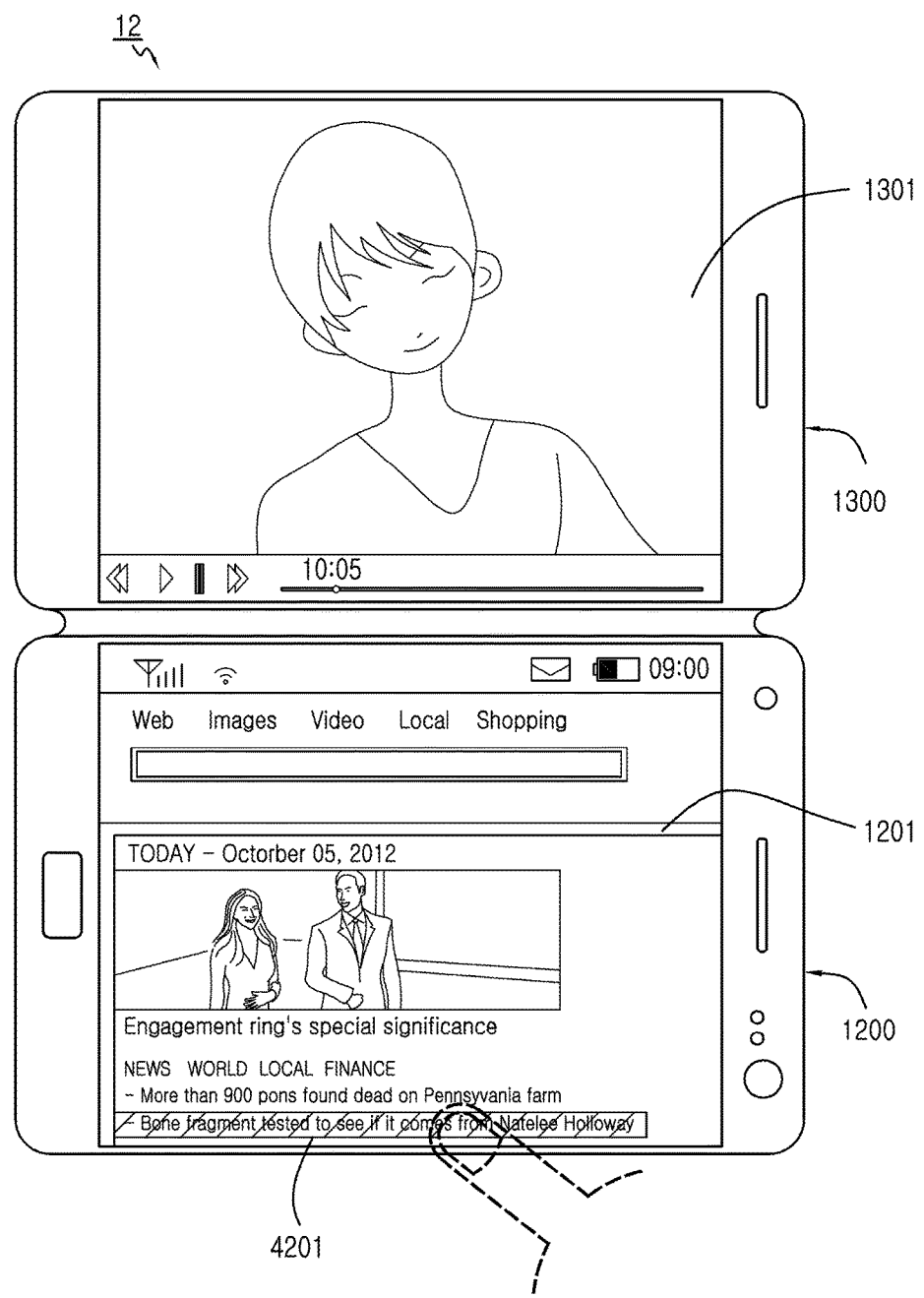

FIG. 42 is a view illustrating a screen of an electronic device according to an embodiment of the present disclosure.

Referring to FIG. 42, for example, the electronic cover (e.g., the first cover portion 1310) is in an open position, and the screen 1201 of the primary device 1200 and the screen 1301 of the electronic cover 1300 may be arranged in two sides (e.g., up and down arrangement or left and right arrangement). The electronic device 12 may display a web page via a first screen (e.g., the screen 1201 of the primary device 1200). In the case where selection 4201 of an object (e.g., a link) by a user touch exists on a web page, the electronic device 12 may display contents (e.g., a moving picture) regarding the selected object via the second screen (e.g., the screen 1301 of the electronic cover 1300). For example, the electronic device 12 may display additional information accessible via a web page using a second screen. Also, for example, the above operation may operate suitable for the type of the first screen or the second screen.

Figure 43:
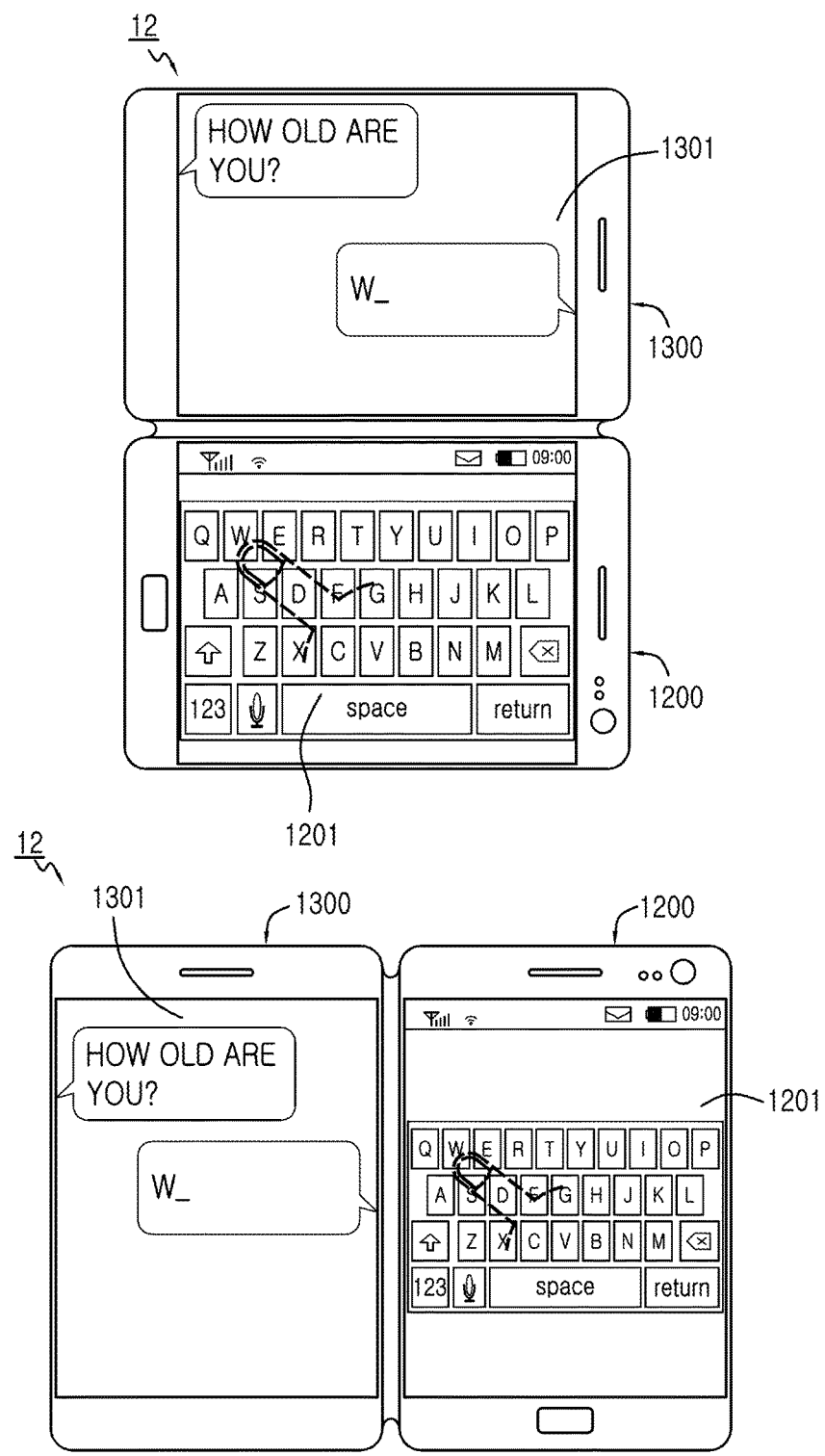

FIG. 43 is a view illustrating a screen of an electronic device according to an embodiment of the present disclosure.

Referring to FIG. 43, for example, the electronic cover (e.g., the first cover portion 1310) is in an open position, and the screen 1201 of the primary device 1200 and the screen 1301 of the electronic cover 1300 may be arranged in two sides (e.g., up and down arrangement or left and right arrangement). The electronic device 12 may display a keypad via a first screen (e.g., the screen 1201 of the primary device 1200). In the case where character selection by a user touch exists on the keypad, the electronic device 12 may display the selected character via a second screen (e.g., the screen 1301 of the electronic cover 1300). According to an embodiment, the electronic device 12 may select a screen to display the keypad depending on the kind of the keypad. According to an embodiment, when the user requests a keypad for symbols or numbers with a keypad for characters displayed on the first screen, the electronic device 12 may display at least a portion of the keypad for numbers on the second screen. According to an embodiment, the electronic device 12 may display the keypad on the first screen and the second screen depending on the kind of a language.

Figure 44:
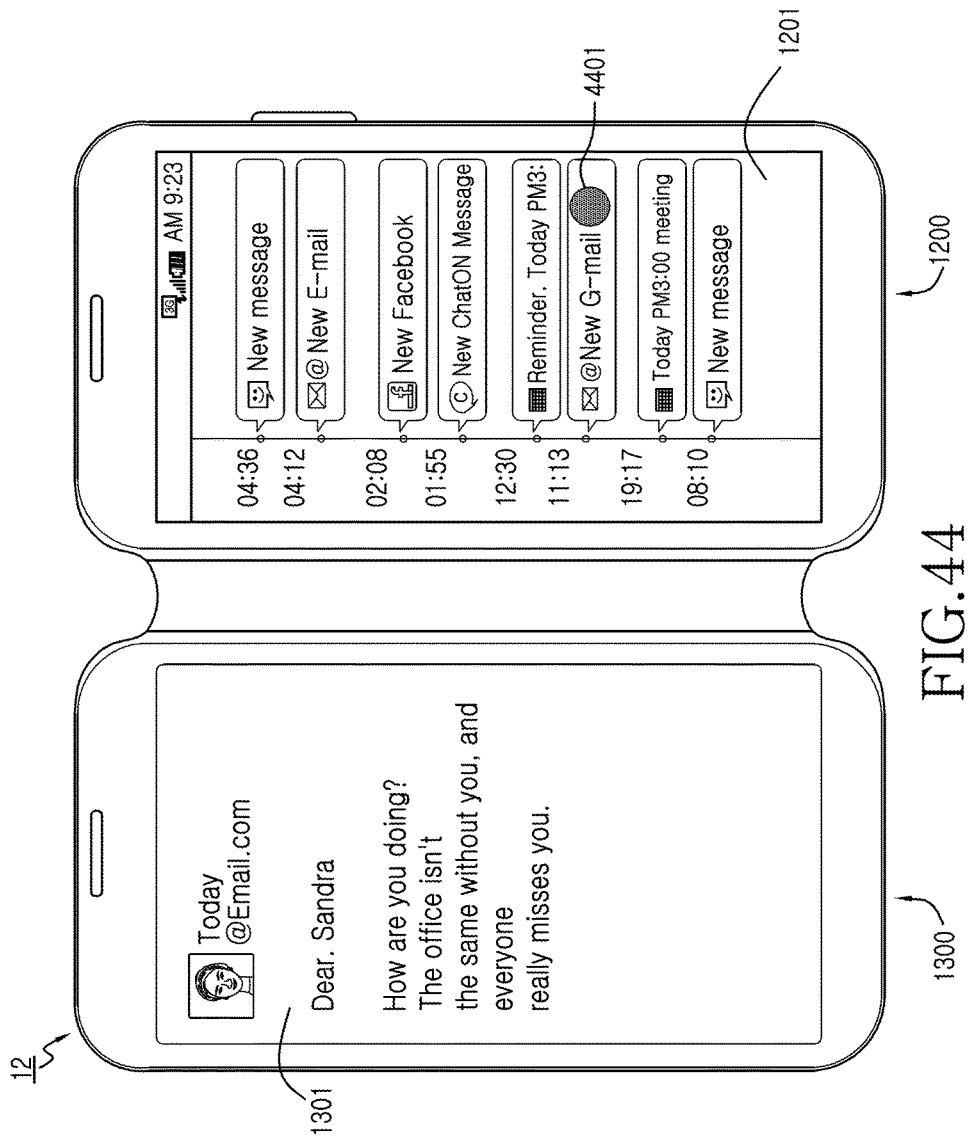

FIG. 44 is a view illustrating a screen of an electronic device according to an embodiment of the present disclosure.

Referring to FIG. 44, for example, the electronic cover (e.g., the first cover portion 1310) is in an open position, and the screen 1201 of the primary device 1200 and the screen 1301 of the electronic cover 1300 may be arranged in two sides. The electronic device 12 may display a notice (e.g., a message, a mail, etc.) list via a first screen (e.g., the screen 1201 of the primary device 1200). In the case where selection 4401 of an icon by a user touch exists on the notice list, the electronic device 12 may display notice contents corresponding to the selected icon via a second screen (e.g., the screen 1301 of the electronic cover 1300).

Figure 45:
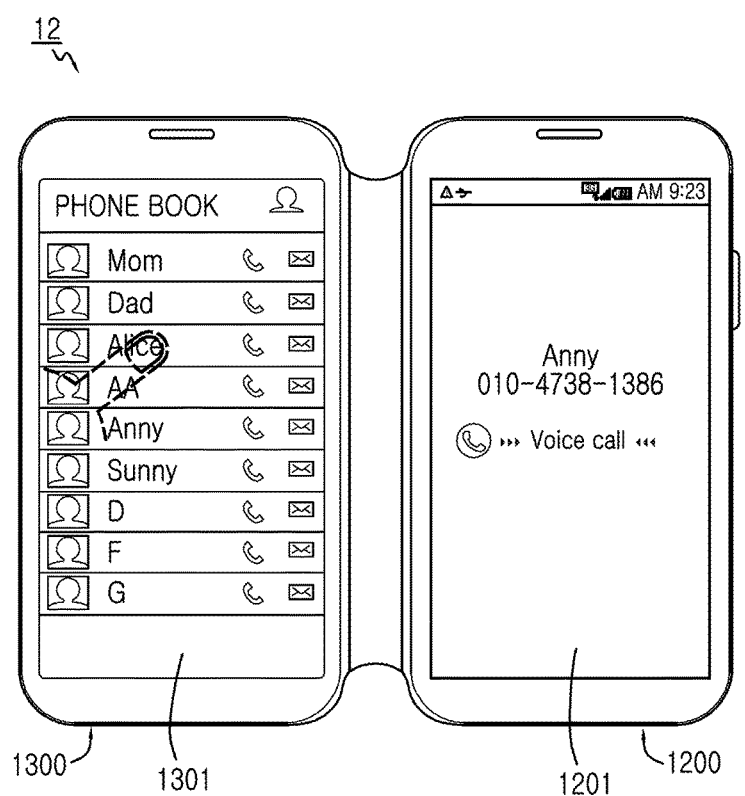

FIG. 45 is a view illustrating a screen of an electronic device according to an embodiment of the present disclosure.

Referring to FIG. 45, for example, the electronic cover (e.g., the first cover portion 1310) is in an open position, and the screen 1201 of the primary device 1200 and the screen 1301 of the electronic cover 1300 may be arranged in two sides (e.g., up and down arrangement or left and right arrangement). The electronic device 12 may display a phone book via a first screen (e.g., the screen 1301 of the electronic cover 1310). In the case where selection of a call for a relevant phone number by a user touch exists on the phone book, the electronic device may execute calling for the phone number, and display contents regarding this via a second screen (e.g., the screen 1201 of the primary device 1200).

Figure 46:
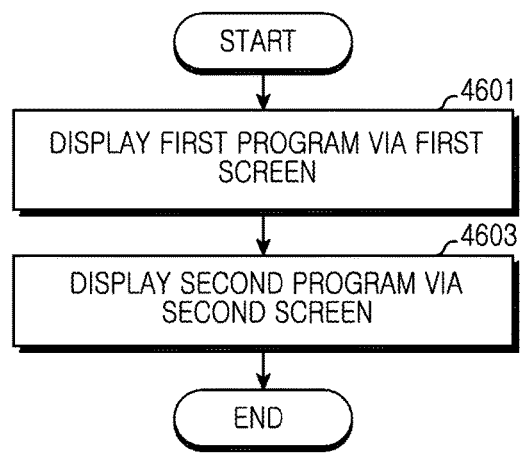
FIG. 46 is a flowchart regarding a UI operation according to an embodiment of the present disclosure.

FIG. 46 is a flowchart regarding a UI operation according to an embodiment of the present disclosure. In the case where multi-tasking (i.e., a plurality of programs are executed together) is performed, different programs may be provided via different screens according to a procedure of FIG. 46.

Referring to FIG. 46, in operation 4601, the UI module 180 (e.g., the processor 120) may display a first program via a first screen (e.g., the screen of the primary device 1200). In operation 4603, the UI module 180 may display a second program via the second screen (e.g., the screen of the electronic cover 1300). According to an embodiment, the electronic device 12 may automatically or manually designate one or more programs related to a first program. For example, in the case where the first program and the second program are designated as mutually related programs, when the first program is executed, the electronic device 12 may automatically execute the second program to display the same via a screen different from the screen of the first program.

Figure 47:
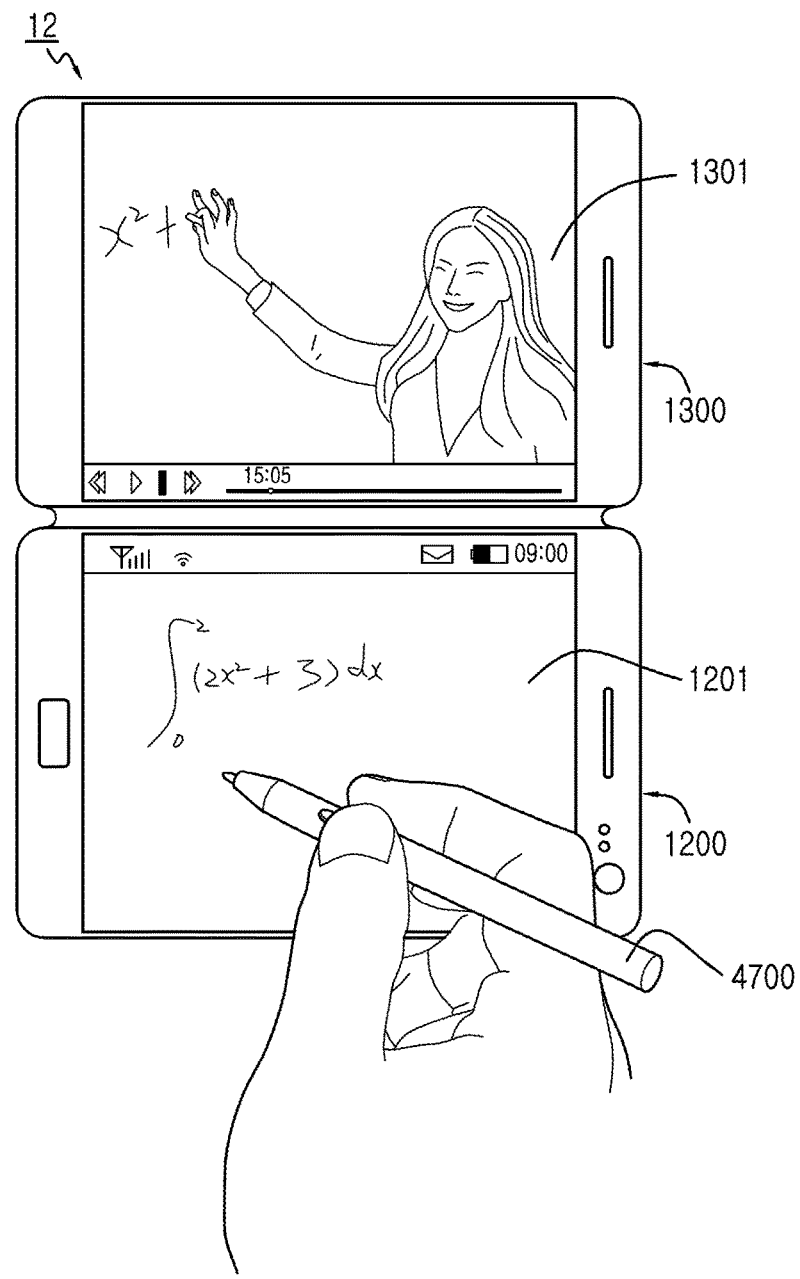
FIGS. 47 and 48 are views illustrating a screen of an electronic device according to an embodiment of the present disclosure.

FIG. 47 is a view illustrating a screen of an electronic device according to an embodiment of the present disclosure.

Referring to FIG. 47, for example, the electronic cover (e.g., the first cover portion 1310) is in an open position, and the screen 1201 of the primary device 1200 and the screen 1301 of the electronic cover 1300 may be arranged in two sides (e.g., up and down arrangement or left and right arrangement). The electronic device 12 may provide a first program (e.g., a moving picture reproducer) via a first screen (e.g., the screen 1301 of the electronic cover 1300), and provide a second program (e.g., a memo program) via a second screen (e.g., the screen 1201 of the primary device 1200). For example, while viewing a moving picture on the screen 1301 of the electronic cover 1300, a user may input a memo that uses a touch and drag on the screen 1201 of the primary device 1200. Here, for a memo input, a stylus 4700 may be applied. For example, when on-line lecture contents are displayed on the first screen, the electronic device 12 may execute a memo program to display the same via the second screen.

Figure 48:
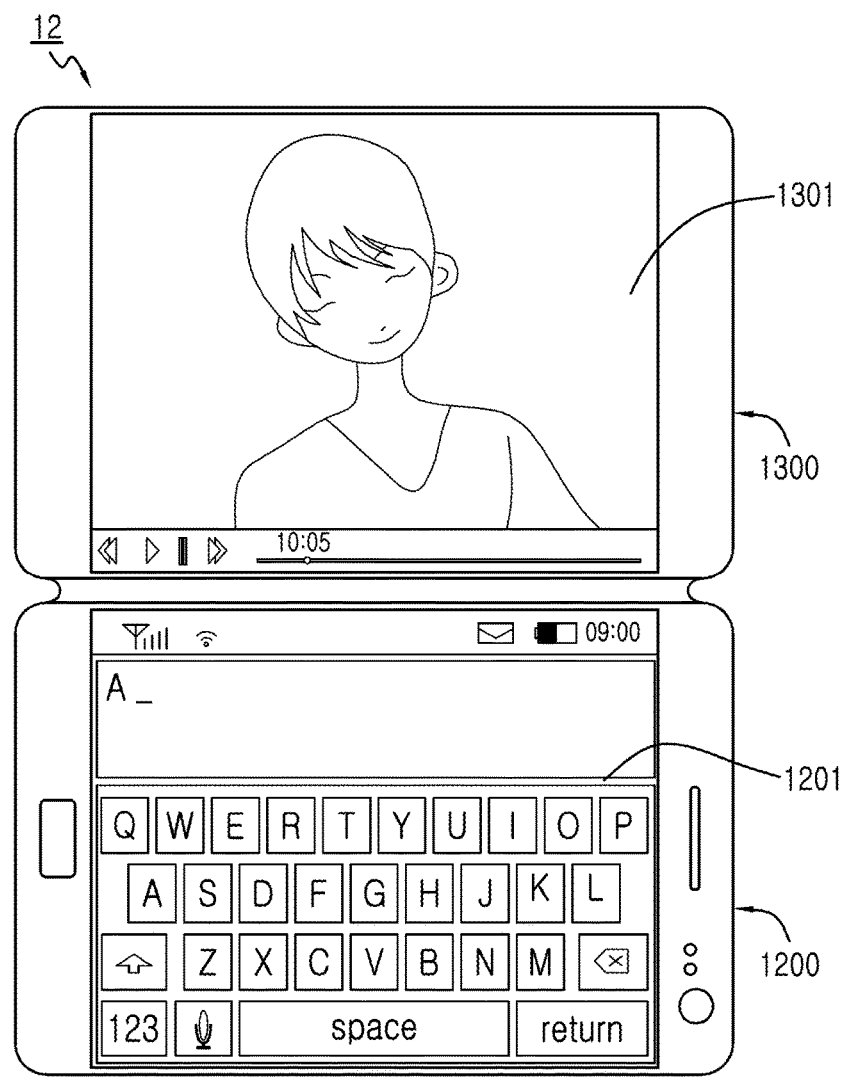

FIG. 48 is a view illustrating a screen of an electronic device according to an embodiment of the present disclosure.

Referring to FIG. 48, the electronic cover (e.g., the first cover portion 1310) is in an open position, and the screen 1201 of the primary device 1200 and the screen 1301 of the electronic cover 1300 may be arranged in two sides (e.g., up and down arrangement or left and right arrangement). The electronic device 12 may provide a first program (e.g., a moving picture reproducer) via a first screen (e.g., the screen 1301 of the electronic cover 1300), and provide a second program (e.g., a short message transmission program) via a second screen (e.g., the screen 1201 of the primary device 1200). For example, while viewing a moving picture on the screen 1301 of the electronic cover 1300, a user may perform a short message send related input that uses the screen 1201 of the primary device 1200. For example, when a phone call or a short message, etc. is received while moving picture contents are displayed via the first screen, the electronic device 12 may execute a related program to display the same on the second screen. Accordingly, a user may perform a phone call or short message related operation via the second screen while maintaining displaying of the moving picture.

Figure 49:
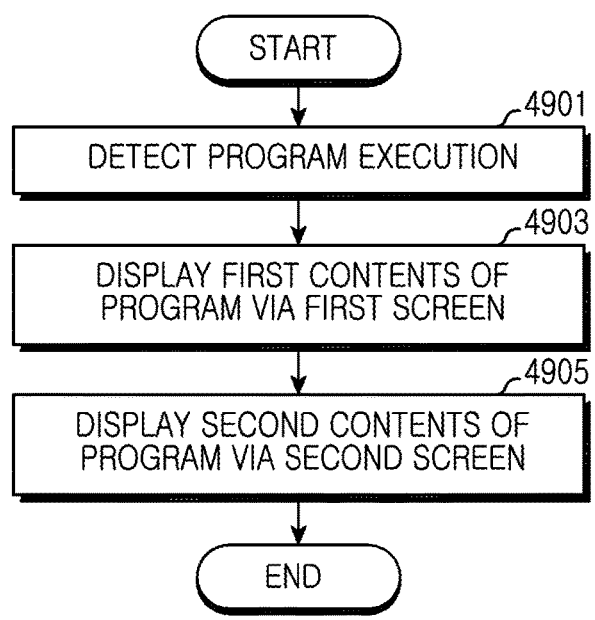
FIG. 49 is a flowchart regarding a UI operation according to an embodiment of the present disclosure.

FIG. 49 is a flowchart regarding a UI operation according to an embodiment of the present disclosure.

Referring to FIG. 49, in operation 4901, the UI module 180 (e.g., the processor 120) may detect execution of a program (e.g., moving picture reproduction). In operation 4903, the UI module 180 may display first contents of the program via a first screen (e.g., the screen of the primary device 1200). In operation 4905, the UI module 180 may display second contents of the executed program via a second screen (e.g., the screen of the electronic cover 1300).

Figure 50:
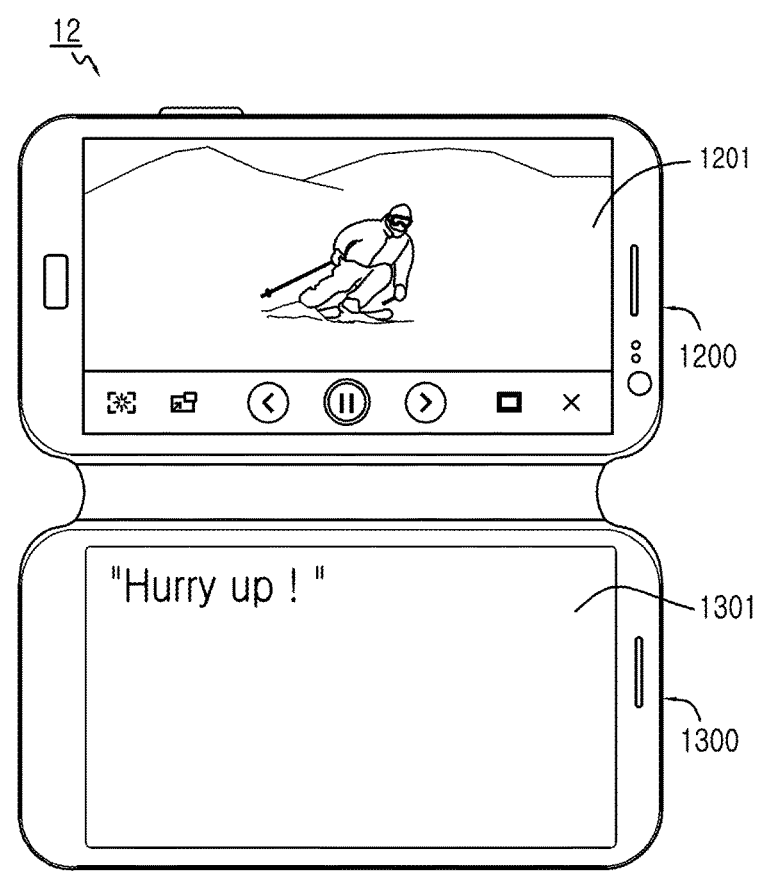
FIG. 50 is a view illustrating a screen of an electronic device according to an embodiment of the present disclosure.

FIG. 50 is a view illustrating a screen of an electronic device according to an embodiment of the present disclosure.

Referring to FIG. 50, for example, the electronic cover (e.g., the first cover portion 1310) is in an open position, and the screen 1201 of the primary device 1200 and the screen 1301 of the electronic cover 1300 may be arranged in two sides (e.g., up and down arrangement or left and right arrangement). In response to a reproduction instruction of a moving picture file, the electronic device 12 may display the moving picture via the screen 1201 of the primary device 1200, and display a subtitle via the screen 1301 of the electronic cover 1300. For example, the electronic device 12 may display moving picture contents via the screen 1201 of the primary device 1200, and provide various UIs that may control the moving picture via the screen of the electronic cover 1300.

Figure 51:
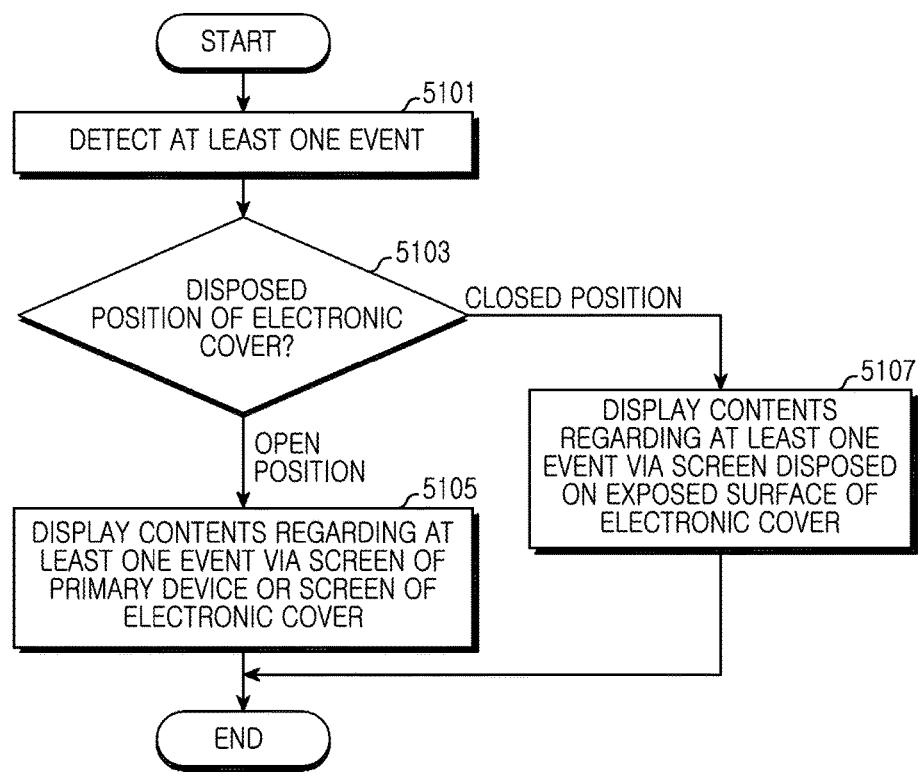
FIG. 51 is a flowchart regarding a UI operation according to an embodiment of the present disclosure.

FIG. 51 is a flowchart regarding a UI operation according to an embodiment of the present disclosure.

Referring to FIG. 51, in operation 5101, the UI module 180 (e.g., the processor 120) may detect at least one event (e.g., message reception, call reception, specific application execution, stylus separation, etc.). In operation 5103, the UI module 180 may determine a disposed position of the electronic cover (e.g., the first cover portion 1310). In the case where the electronic cover is in an open position, in operation 5105, the UI module 180 may display contents regarding at least one event via the screen of the electronic device (e.g., the primary device 1200) or the screen of the electronic cover 1300. In the case where the electronic cover is in a closed position, in operation 5107, the UI module 180 may display contents regarding at least one event via a screen disposed on an exposed surface of the electronic cover 1300.

Figure 52:
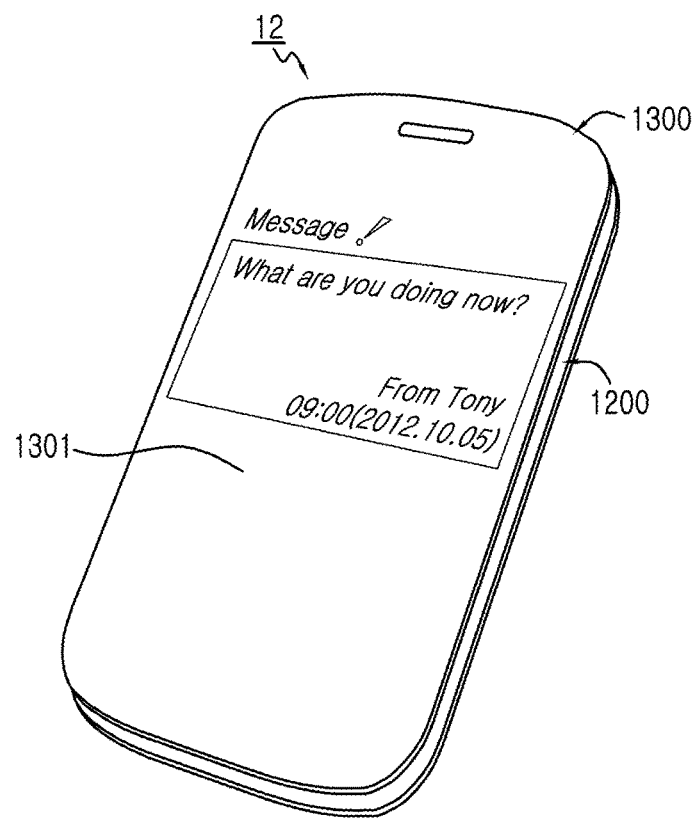
FIGS. 52, 53, 54, and 55 are views illustrating a screen of an electronic device according to an embodiment of the present disclosure.
Figure 53:
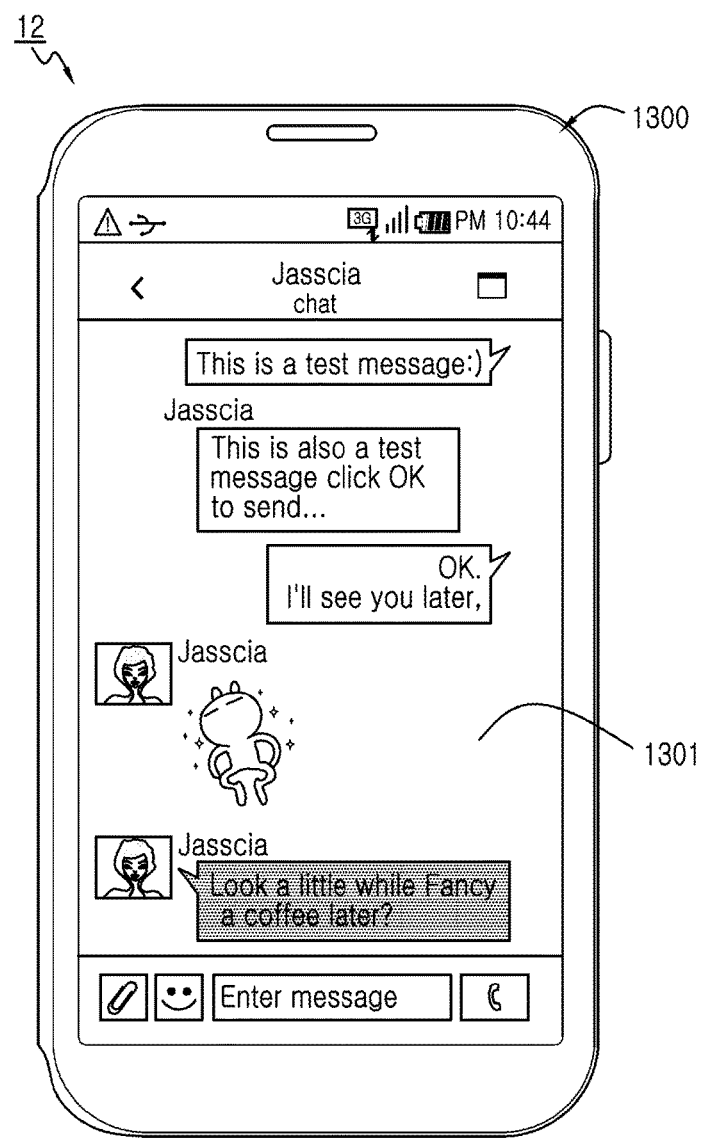
Figure 54:

FIGS. 52 to 54 are views illustrating a screen of an electronic device according to an embodiment of the present disclosure.

Referring to FIG. 52, the electronic cover (e.g., the first cover portion 1310) is in a closed position, and the electronic device 12 may receive a message (e.g., detect at least one event in operation 5101 of FIG. 51) and display received message related contents (e.g., calling information, etc.) via the screen 1301 disposed on the exterior of the electronic cover 1310.

Referring to FIG. 53, the electronic cover (e.g., the first cover portion 1310) is in a closed position, and the electronic device 12 may receive (e.g., detect at least one event in operation 5101 of FIG. 51) a notice and display received notice related contents (e.g., message reception/transmission history) via the screen 1301 disposed on the exterior of the electronic cover 1310. The above operation, for example, may operate depending on the type of the electronic cover 1300. For example, in the case where the screen 1301 of the electronic cover 1300 is an LCD or an AMOLED, when a message is received, the electronic device 12 may display a message program via the screen 1301 of the electronic cover 1300. For example, in the case where the screen 1301 of the electronic cover 1300 is an electronic ink display (e.g., a mono electronic ink display), when a message is received, the electronic device 12 may display at least a portion of the received message via the screen 1301 of the electronic cover 1300.

Referring to FIG. 54, the electronic cover (e.g., the first cover portion 1310) is in a closed position, and the electronic device 12 may receive (detect at least one event in operation 5101 of FIG. 51) a call and display call related contents (e.g., calling information, a call connect icon, a call block icon, etc.) via the screen 1301 disposed on the exterior of the electronic cover 1310. Here, the screen 1301 of the electronic cover 1300 may be relatively smaller than the screen 1201 of the primary device 1200 (not shown).

Figure 55:
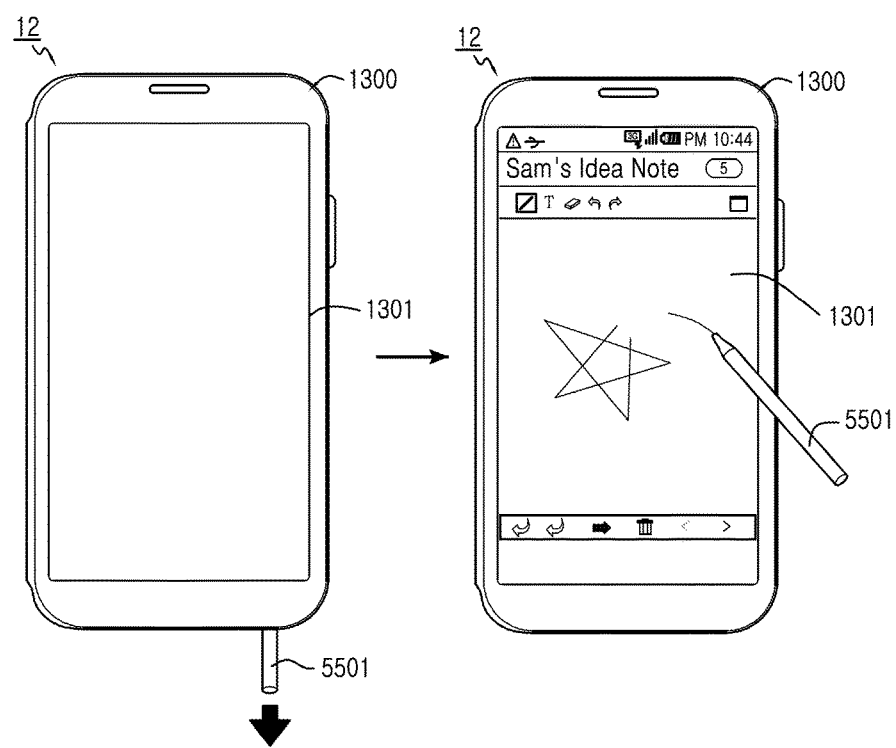

FIG. 55 is a view illustrating a screen of an electronic device according to an embodiment of the present disclosure.

Referring to FIG. 55, the electronic cover (e.g., the first cover portion 1310) is in a closed position, and the electronic device 12 may detect (e.g., detect at least one event in operation 5101 of FIG. 51) separation of a stylus 5501, execute a stylus related application (e.g., a note application), and display contents regarding the application via the screen 1301 disposed on the exterior of the electronic cover 1300. For example, the electronic device 12 may receive an input by the stylus 5501 via an input unit included in the electronic cover 1300.

Figure 56:
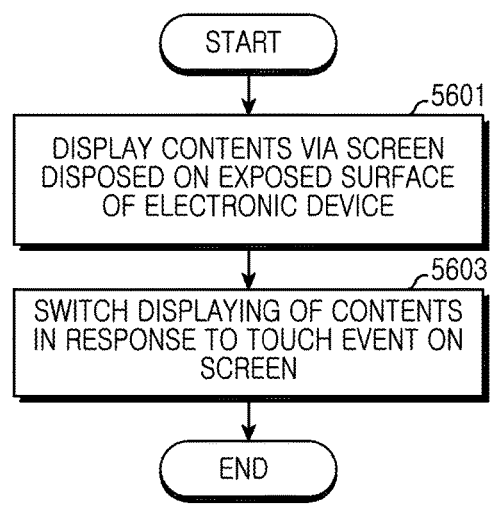
FIG. 56 is a flowchart regarding a UI operation according to an embodiment of the present disclosure.

FIG. 56 is a flowchart regarding a UI operation according to an embodiment of the present disclosure.

Referring to FIG. 56, in operation 5601, the UI module 180 (e.g., the processor 180) may display contents via a screen disposed on the exposed surface of the electronic device 12. For example, in the case where the electronic cover (e.g., the first cover portion 1310) is in a closed position, the UI module 180 may display contents via the screen disposed on the exposed surface of the first cover portion 1310. In operation 5603, the UI module 180 may switch displaying of contents in response to a touch event on the screen.

Figure 57:
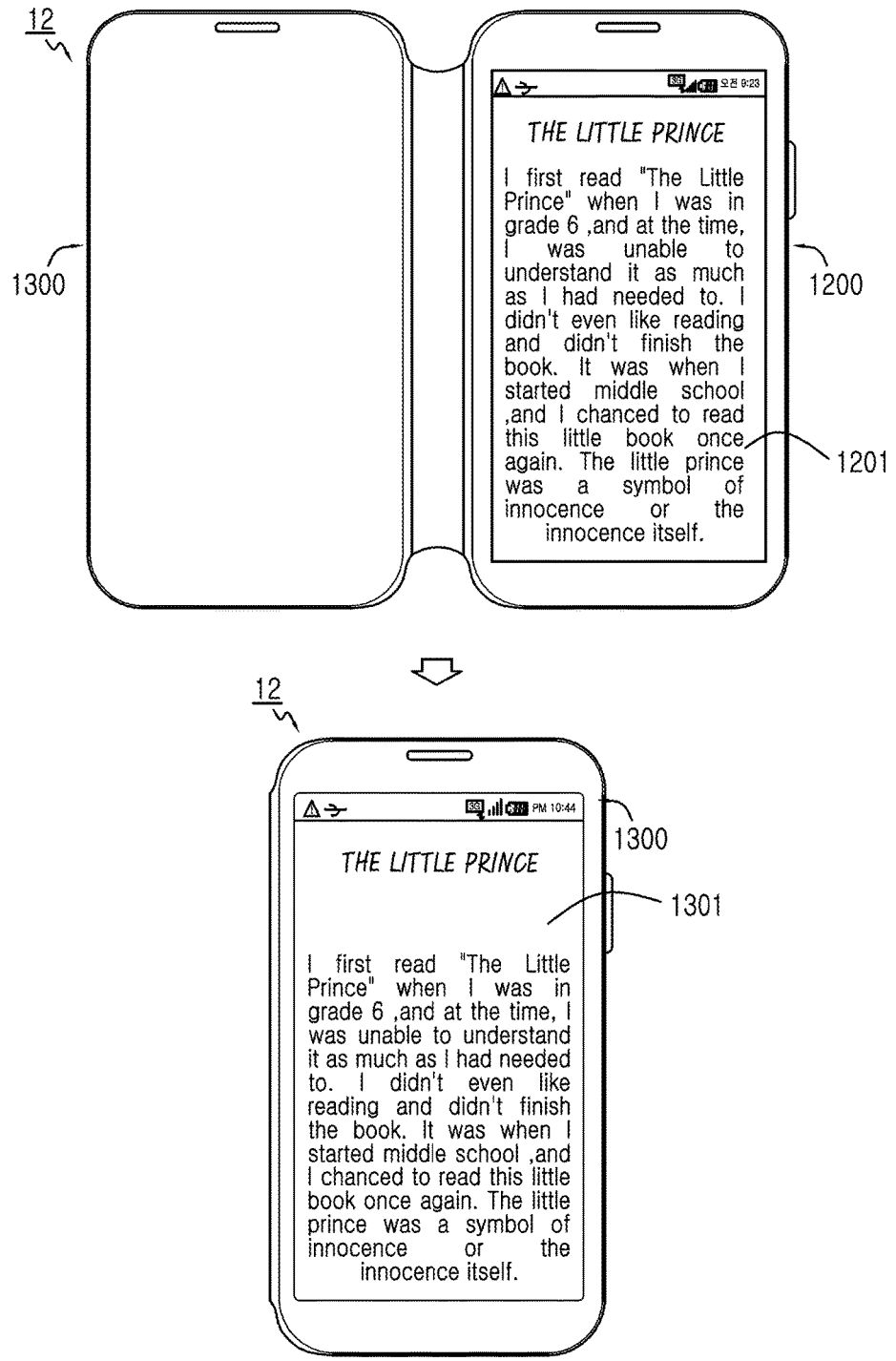
FIGS. 57, 58, 59A, 59B, 59C, and 60 are views illustrating a screen of an electronic device according to an embodiment of the present disclosure.

FIG. 57 is a view illustrating a screen of an electronic device according to an embodiment of the present disclosure.

Referring to FIG. 57, in the case where the electronic cover 1300 is in an open position, the electronic device 12 may display contents via the screen 1201 of the primary device 1200. In the case where the electronic cover 1300 is switched from an open position to a closed position, the electronic device 12 may switch displaying of contents from the screen 1201 of the primary device 1200 to the screen 1301 disposed on the exterior of the electronic cover 1300. The above embodiment may operate based on at least one of the type of the electronic cover 1300 and the type of contents. For example, in the case where electronic book contents are displayed via the screen 1201 of the primary device 1200, and the screen 1301 of the electronic cover 1300 is an electronic ink display, when the electronic cover 1300 is switched to the closed position, the electronic device 12 may perform displaying of the electronic book contents via the screen 1301 of the electronic cover 1300. For example, in the case where moving picture contents are displayed via the screen 1201 of the primary device 1200, and the screen 1301 of the electronic cover 1300 is an electronic ink display, when the electronic cover 1300 is switched to a closed position, the electronic device 12 may stop displaying the moving picture contents, and switch the electronic device 12 to a power save mode (e.g., a sleep mode).

Figure 58:
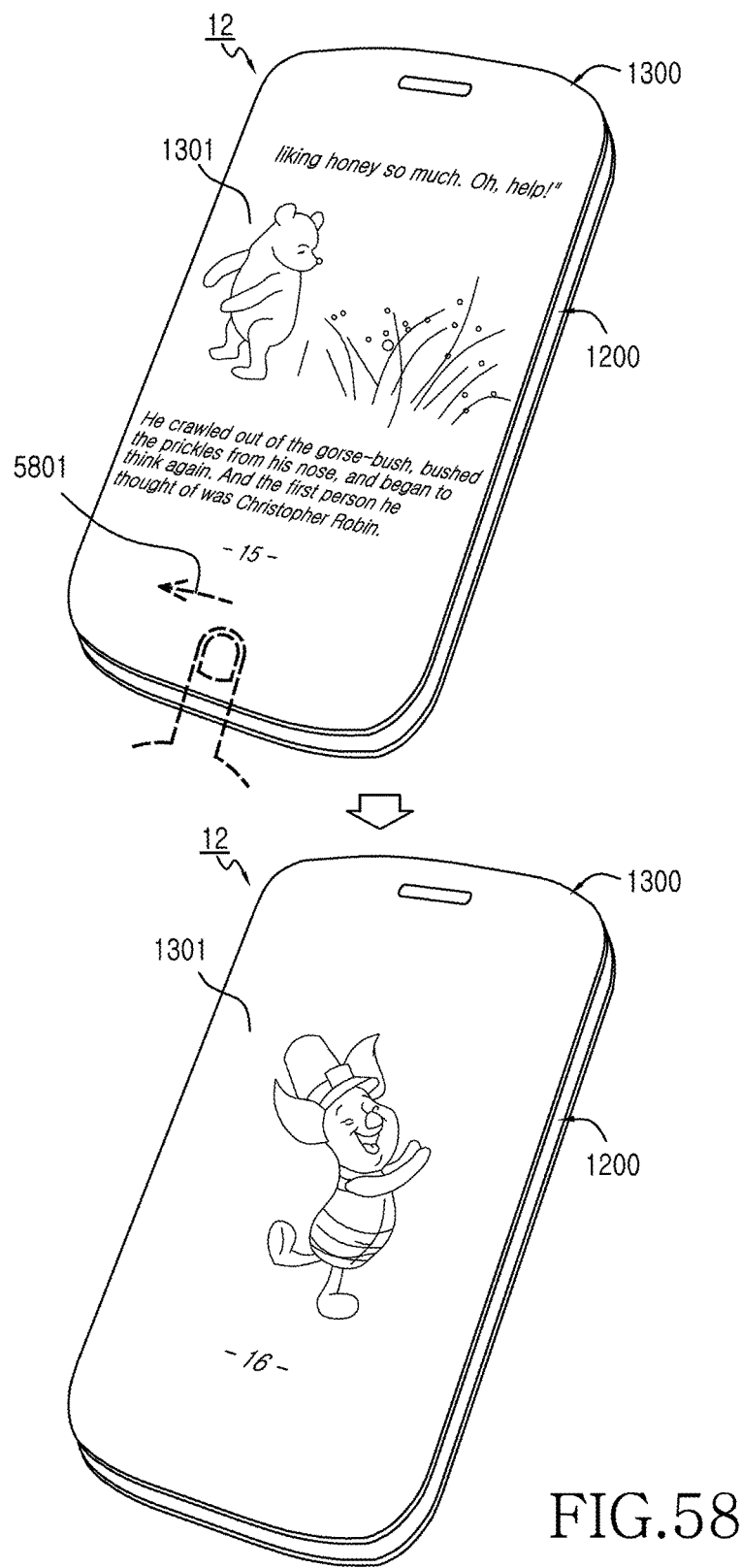

FIG. 58 is a view illustrating a screen of an electronic device according to an embodiment of the present disclosure.

Referring to FIG. 58, for example, in the case where the electronic cover 1300 is in a closed position, the electronic device 12 may display contents (e.g., an electronic book) via the screen 1301 disposed on the exterior of the electronic cover 1300. In the case where a touch 5801 (e.g., a flicking touch) by a user exists on the screen 1301, the electronic device 12 may switch (e.g., scroll) displaying of contents.

Figure 59A:
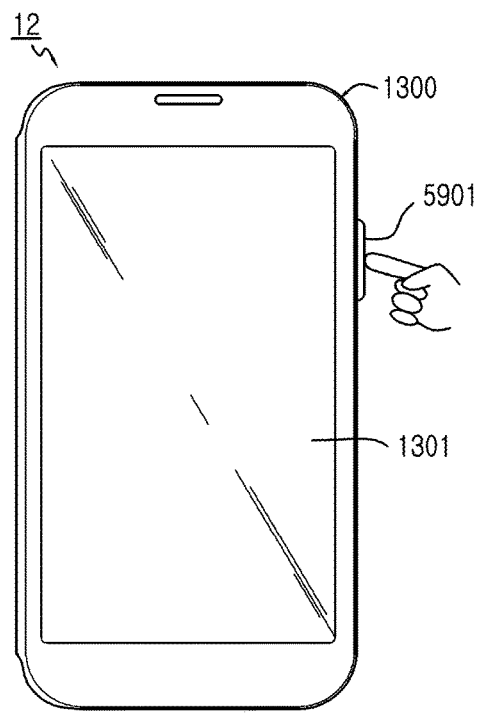
Figure 59B:
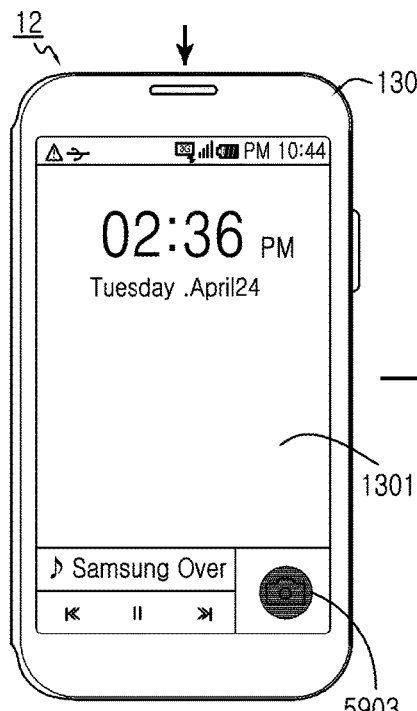
Figure 59C:
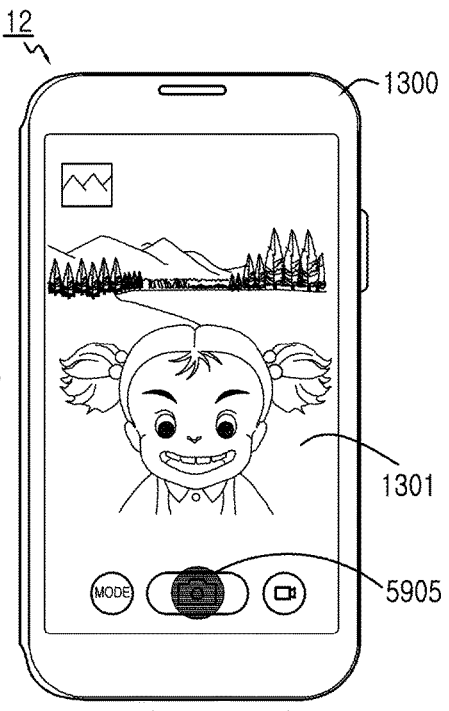

FIGS. 59A to 59C are views illustrating a screen of an electronic device according to an embodiment of the present disclosure. In the case where the electronic cover 1300 is in a closed position, the electronic device 12 may activate the screen 1301 disposed on the exterior of the electronic cover 1310, and inactivate the screen 1201 of the primary device 1200 (not shown). The electronic device 12 may perform a relevant function in response to your touch on the screen 1301 of the electronic cover 1300, and display the same on the screen 1301 of the electronic cover 1300.

Referring to FIG. 59A, the user may press a button 5901 disposed on the lateral side of the primary device 1200. Referring to FIGS. 59B and 59C, the electronic device 12 may display a default interface image via the screen 1301 disposed on the exterior of the electronic cover 1300 in response to the pressing of the button 5901. The user may touch an object of the default interface image, and the electronic device 12 may perform a relevant function (operation) in response to the user touch. For example, in the case where the user touches a camera button 5903 on the default interface image, the electronic device 12 may execute a camera application, and switch displaying of the screen 1301 of the electronic cover 1300 to a shooting interface image. The shooting interface image may include an image obtained via a rear camera (not shown) or a front camera. When the user presses a shooting button 5905 in the shooting interface image, the electronic device 12 may capture an image.

Figure 60:
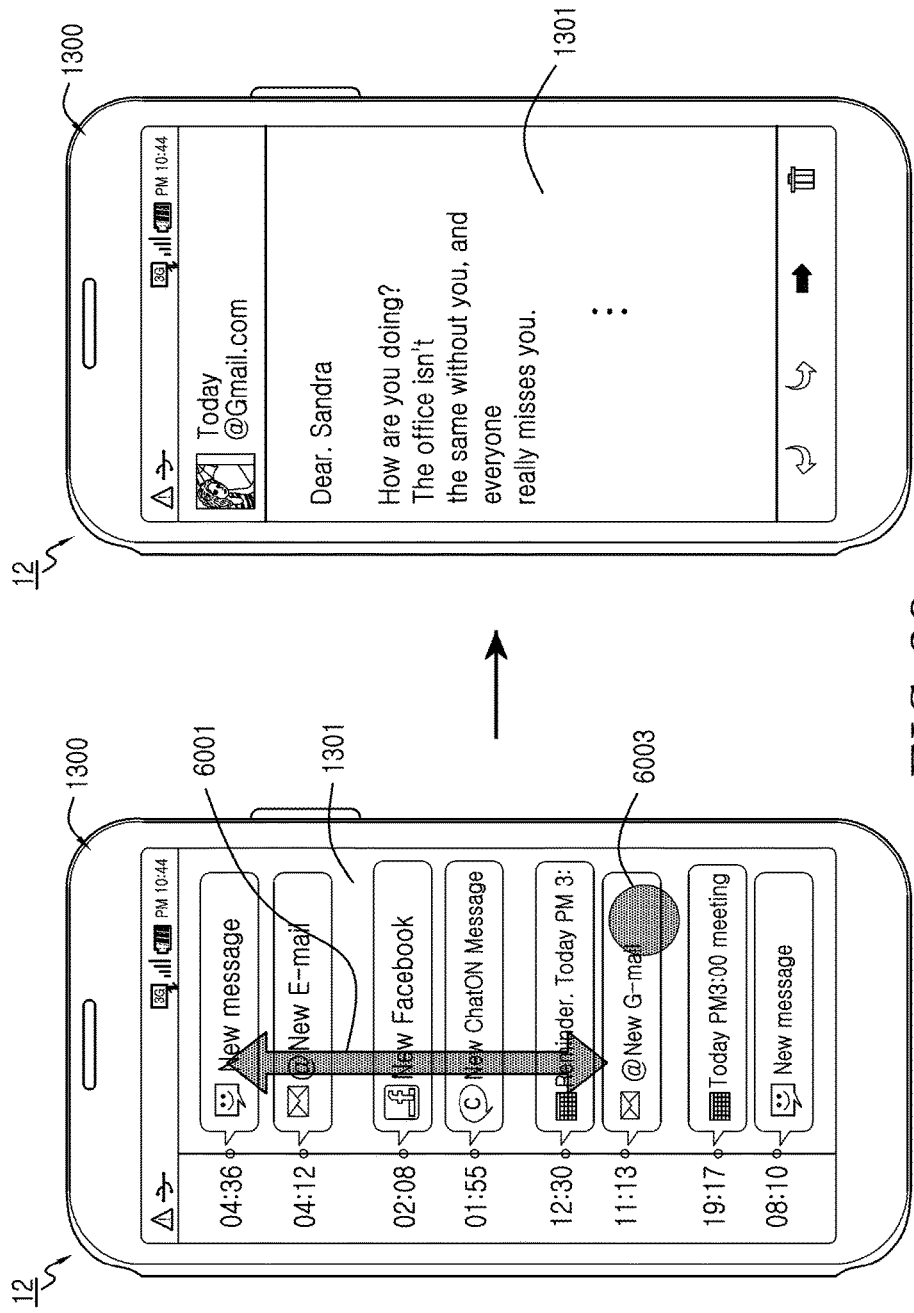

FIG. 60 is a view illustrating a screen of an electronic device according to an embodiment of the present disclosure.

Referring to FIG. 60, in the case where the electronic cover 1300 is in a closed position, the electronic device 12 may display contents (e.g., a notice application related interface image) via the screen 1301 disposed on the exterior of the electronic cover 1300. In response to a user touch 6001 (e.g., a touch and drag or flicking, etc.) on the screen 1301, the electronic device 12 may scroll a plurality of notice items of the interface image. In the case where the user touches a specific notice item (6003), the electronic device 12 may switch displaying of the screen 1301 of the electronic cover 1300 to contents of the touched notice item.

Figure 61:
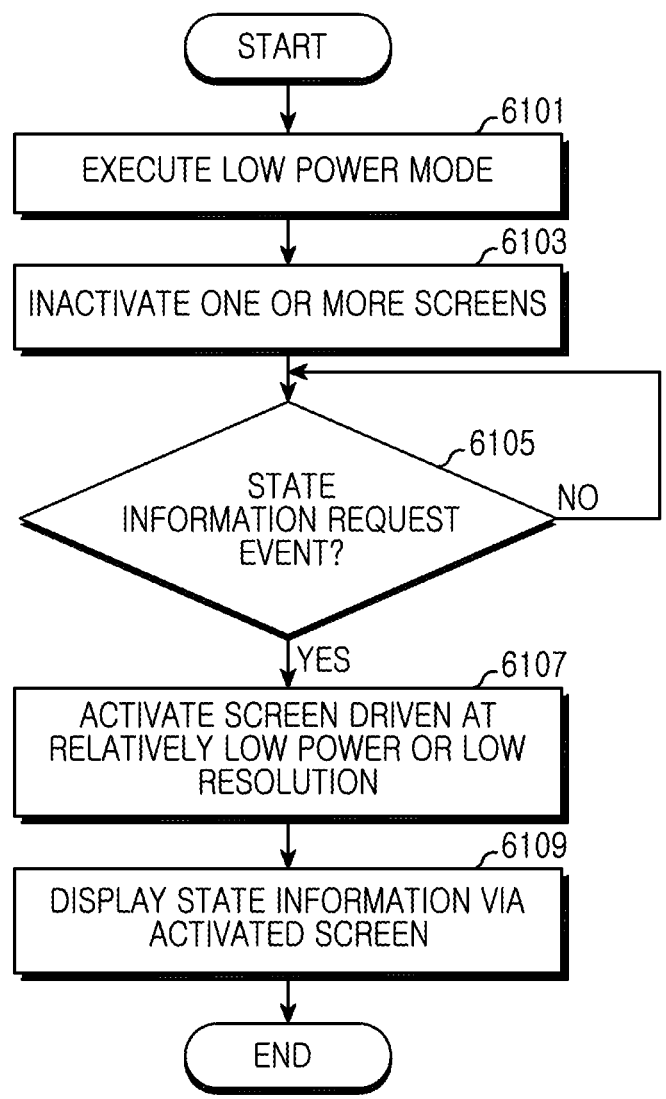
FIG. 61 is a flowchart regarding a UI operation according to an embodiment of the present disclosure.

FIG. 61 is a flowchart regarding a UI operation according to an embodiment of the present disclosure.

Referring to FIG. 61, in operation 6101, the UI module 180 (e.g., the processor 120) may perform a low power mode. In operation 6103, the UI module 180 may inactivate one or more screens (e.g., the screen of the primary device 1200 or the screen of the electronic cover 1300). In operation 6105, the UI module 180 may determine whether a state information request event occurs. In the case where the state information request event occurs, in operation 6107, the UI module 180 may activate a screen driven at relatively low power or low resolution. In operation 6109, the UI module 180 may display state information (e.g., a battery remnant, reception sensitivity, a current time, etc.) via the activated screen.

Figure 62:
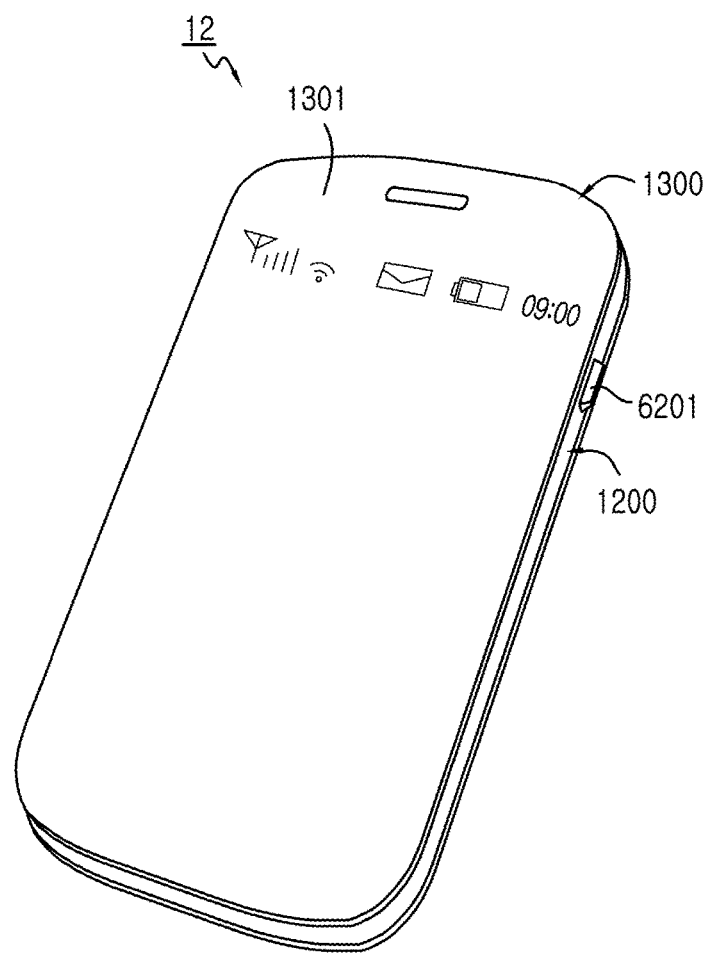
FIG. 62 is a view illustrating a screen of an electronic device according to an embodiment of the present disclosure.

FIG. 62 is a view illustrating a screen of an electronic device according to an embodiment of the present disclosure.

Referring to FIG. 62, in the case where the electronic cover 1300 is in a closed position, and a state information request event occurs (e.g., in the case where a button 6201 is pressed), the electronic device 12 may display state information (e.g., a battery remnant, reception sensitivity, a current time, etc.) via the screen 1301 disposed on the exterior of the electronic cover 1300. Here, the screen 1201 of the primary device 1200 (not shown) may maintain an inactive state, and the screen 1301 of the electronic cover 1300 may be driven at lower power or lower resolution than that of the screen 1201 of the primary device 1200 (not shown). For example, in the case where the screen 1201 of the primary device 1200 is a type that consumes or is consuming a relatively higher current, and the screen 1301 of the electronic cover 1300 is a type of that consumes a lower current (e.g., an electronic ink display), the electronic device 12 may select one screen to execute a program or display contents depending on a power mode. For example, in the case where a battery remnant of the electronic device 12 is equal to or less than a threshold value, the electronic device 12 may display related information using the electronic ink display in response to a request for execution of a program or contents displaying.

Figure 63:
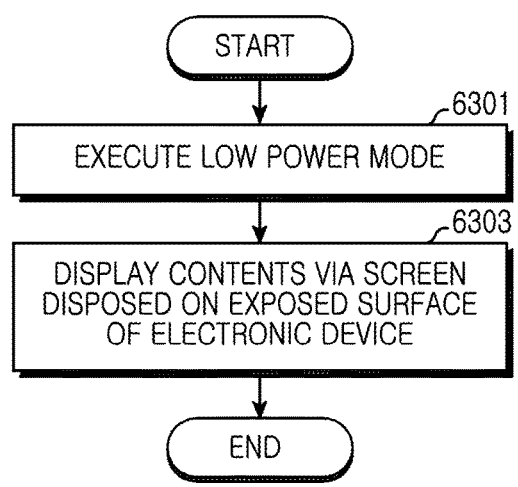
FIG. 63 is a flowchart regarding a UI operation according to an embodiment of the present disclosure.

FIG. 63 is a flowchart regarding a UI operation according to an embodiment of the present disclosure.

Referring to FIG. 63, in operation 6301, the UI module 180 (e.g., the processor 120) may execute a low power mode. In operation 6303, the UI module 180 may display contents (e.g., an image) via a screen disposed on the exposed surface of the electronic device 12.

Figure 64:
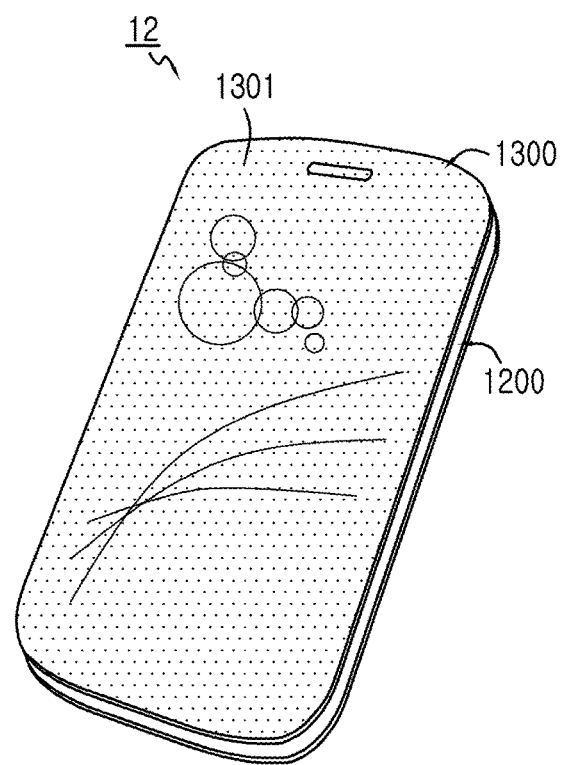
FIG. 64 is a view illustrating a screen of an electronic device according to an embodiment of the present disclosure.

FIG. 64 is a view illustrating a screen of an electronic device according to an embodiment of the present disclosure.

Referring to FIG. 64, the electronic cover 1300 is in a closed position, and the electronic device 12 may display an image via the screen 1301 disposed on the exterior of the electronic cover 1300. An image displayed via the screen 1301 of the electronic cover 1300 may make an appearance of the electronic device 12 elegant. For example, the screen 1201 of the primary device 1200 (not shown) may maintain an inactive state, and the screen 1301 of the electronic cover 1300 may be driven at low resolution. For example, using a fact that a relatively small amount of a current is consumed in the case where the screen 1301 of the electronic cover 1300 is an electronic ink display, an appearance of the electronic device 12 may be made elegant by displaying a selected image on the screen 1310 of the electronic cover 1300.

Figure 65:
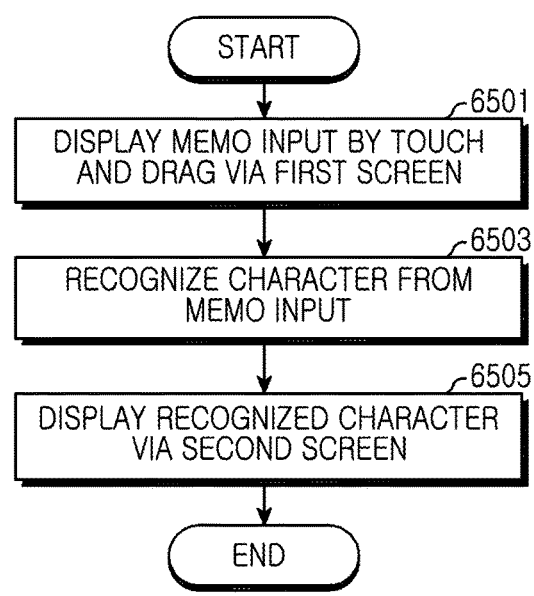
FIG. 65 is a flowchart regarding a UI operation according to an embodiment of the present disclosure.

FIG. 65 is a flowchart regarding a UI operation according to an embodiment of the present disclosure.

Referring to FIG. 65, in operation 6501, the UI module 180 (e.g., the processor 120) may display a memo input by a touch and drag via a first screen (e.g., the screen of the electronic cover 1310). In operation 6503, the UI module 180 may recognize a character from a memo input. For example, the UI module 180 may read a font, a font size, etc. from a memo input corresponding to a user writing. In operation 6505, the UI module 180 may display the recognized character via a second screen (e.g., the screen of the primary device 1200).

Figure 66:
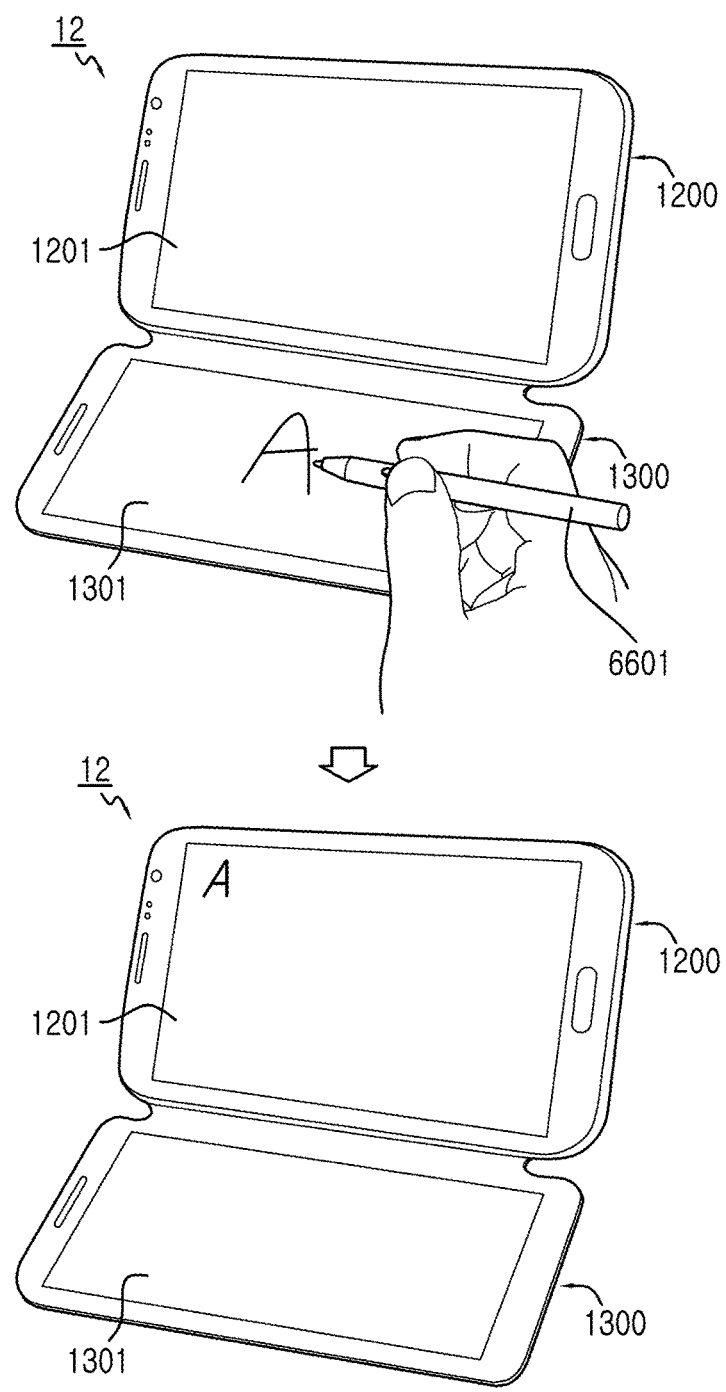
FIG. 66 is a view illustrating a screen of an electronic device according to an embodiment of the present disclosure.

FIG. 66 is a view illustrating a screen of an electronic device according to an embodiment of the present disclosure.

Referring to FIG. 66, the electronic cover 1300 is in an open position, and the electronic device 12 may provide a memo input function by a touch and drag via a first screen (e.g., the screen 1301 of the electronic cover 1300). A user performs a touch and drag on the first screen 1301 using his finger or a stylus 6601, and the electronic device 12 may display a memo input corresponding to the touch and drag on the first screen 1301. The electronic device 12 may read a character from the memo input, and display the read character on a second screen (e.g., the screen 1201 of the primary device 1200).

Figure 67:
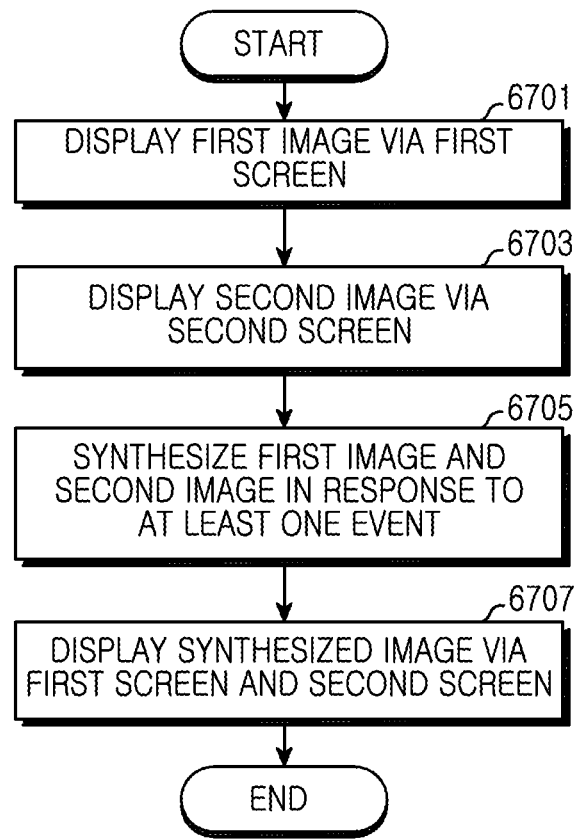
FIG. 67 is a flowchart regarding a UI operation according to an embodiment of the present disclosure.

FIG. 67 is a flowchart regarding a UI operation according to an embodiment of the present disclosure.

Referring to FIG. 67, in operation 6701, the UI module 180 (e.g., the processor 120) may display a first image via a first screen (e.g., the screen of the primary device 1200). In operation 6703, the UI module 180 may display a second image via a second screen (e.g., the screen of the electronic cover 1300). In operation 6705, the UI module 180 may synthesize a first image and a second image in response to at least one event (e.g., opening/closing of the electronic cover 1300 or button pressing). In operation 6707, the UI module 180 may display the synthesized image via the first screen or the second image.

Figure 68:
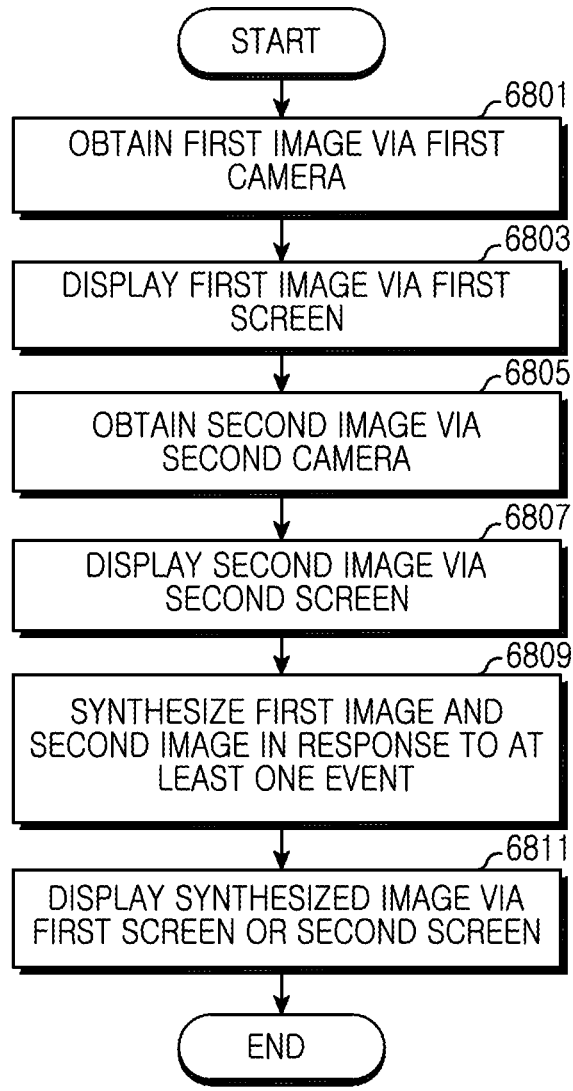
FIG. 68 is a flowchart regarding a UI operation according to an embodiment of the present disclosure.

FIG. 68 is a flowchart regarding a UI operation according to an embodiment of the present disclosure.

Referring to FIG. 68, in operation 6801, the UI module 180 (e.g., the processor 120) may obtain a first image via a first camera (e.g., the camera of the primary device 1200). In operation 6803, the UI module 180 may display the first image via a first screen (e.g., the screen of the primary device 1200). In operation 6805, the UI module 180 may obtain a second image via a second camera (e.g., the camera of the primary device 1200 or the camera of the electronic cover 1300). In operation 6807, the UI module 180 may display the second image via the second screen (e.g., the screen of the electronic cover 1300). In operation 6809, the UI module 180 may synthesize the first image and the second image in response to at least one event (e.g., opening/ closing of the electronic cover 1300 or button pressing, etc.). In operation 6811, the UI module 180 may display the synthesized image via the first screen or the second screen. According to an embodiment, synthesizing of an image may be performed on an image stored in advance in the electronic device 12 or a server.

Figure 69:
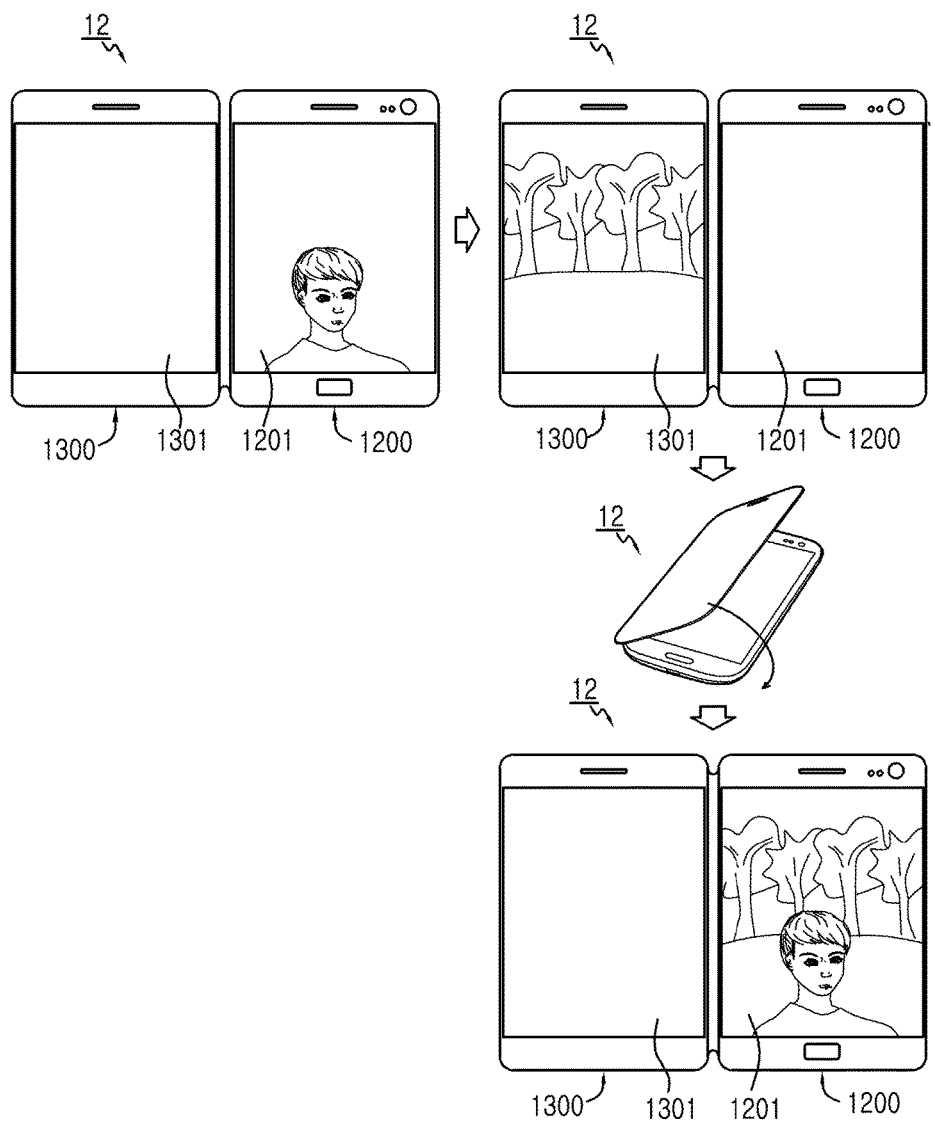
FIG. 69 is a view illustrating a screen of an electronic device according to an embodiment of the present disclosure.

FIG. 69 is a view illustrating a screen of an electronic device according to an embodiment of the present disclosure.

Referring to FIG. 69, the electronic cover 1300 is in an open position, and the electronic device 12 may obtain a first image and a second image via at least one camera, display the first image via the screen 1201 of the primary device 1200, and display the second image via the screen 1301 of the electronic cover 1300. For example, in the case where the electronic cover 1300 is closed, the electronic device 12 may synthesize the first image and the second image. For example, in the case where the electronic cover 1300 is opened with the image synthesis performed, the electronic device may display the synthesized image via the screen (e.g., the screen 1201 of the primary device 1200).

Figure 70:
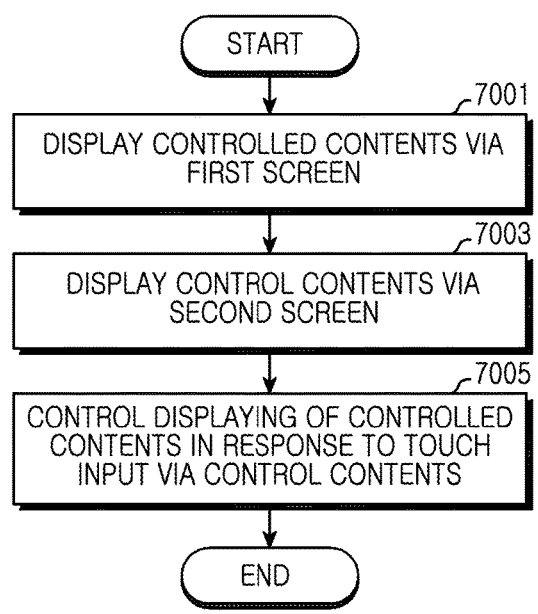
FIG. 70 is a flowchart regarding a UI operation according to an embodiment of the present disclosure.

FIG. 70 is a flowchart regarding a UI operation according to an embodiment of the present disclosure.

Referring to FIG. 70, in operation 7001, the UI module 180 (e.g., the processor 120) may display controlled contents via a first screen (e.g., the screen of the primary device 1200). In operation 7003, the UI module 180 may display controlled contents via a second screen (e.g., the screen 1301 of the electronic cover 1300). In operation 7005, the UI module 180 may control displaying of controlled contents in response to an input via control contents. For example, the above operation may operate depending on the type of the electronic cover 1300. For example, in the case where it is determined that the electronic cover 1300 provides an input unit, the electronic device 12 may display control contents via the electronic cover 1300. For example, in the case where it is determined that the electronic cover 1300 does not provide an input unit, the electronic device 12 may display control contents via the primary device 1200.

Figure 71:
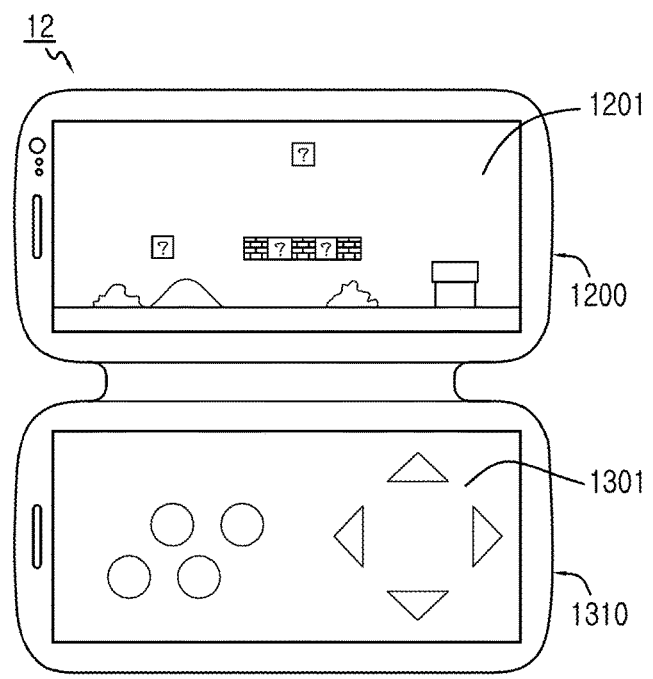
FIG. 71 is a view illustrating a screen of an electronic device according to an embodiment of the present disclosure.

FIG. 71 is a view illustrating a screen of an electronic device according to an embodiment of the present disclosure.

Referring to FIG. 71, for example, the electronic cover (e.g., the first cover portion 1310) is in an open position, and the screen 1201 of the primary device 1200 and the screen 1301 of the electronic cover 1300 may be arranged in two sides (e.g., up and down arrangement). The electronic device 12 may display controlled contents (e.g., animation contents) via the screen 1201 of the primary device 1200, and display control contents (e.g., a keypad) via the screen 1301 of the electronic cover 1300. In the case where a touch input using the keypad exists, the electronic device may switch the animation contents.

Figure 72:
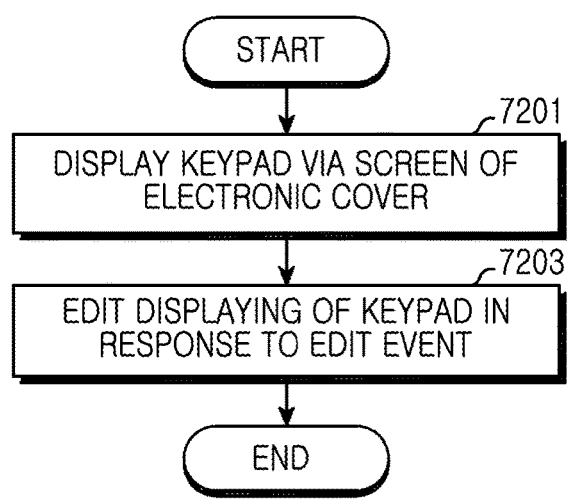
FIG. 72 is a flowchart regarding a UI operation according to an embodiment of the present disclosure.

FIG. 72 is a flowchart regarding a UI operation according to an embodiment of the present disclosure.

Referring to FIG. 72, in operation 7201, the UI module 180 (e.g., the processor 120) may display a keypad via the screen 1301 of the electronic cover 1300. In operation 7203, the UI module 180 may edit display of the keypad in response to an edit event. For example, the electronic device 12 may display the keypad depending on identify information of the electronic cover 1300. For example, the electronic device 12 may display different keypads for a plurality of electronic covers 1300. For example, when the keypad is edited with the first electronic cover 1300 mounted, the electronic device 12 may display the relevant edited keypad when the first electronic cover 1300 is mounted.

Figure 73:
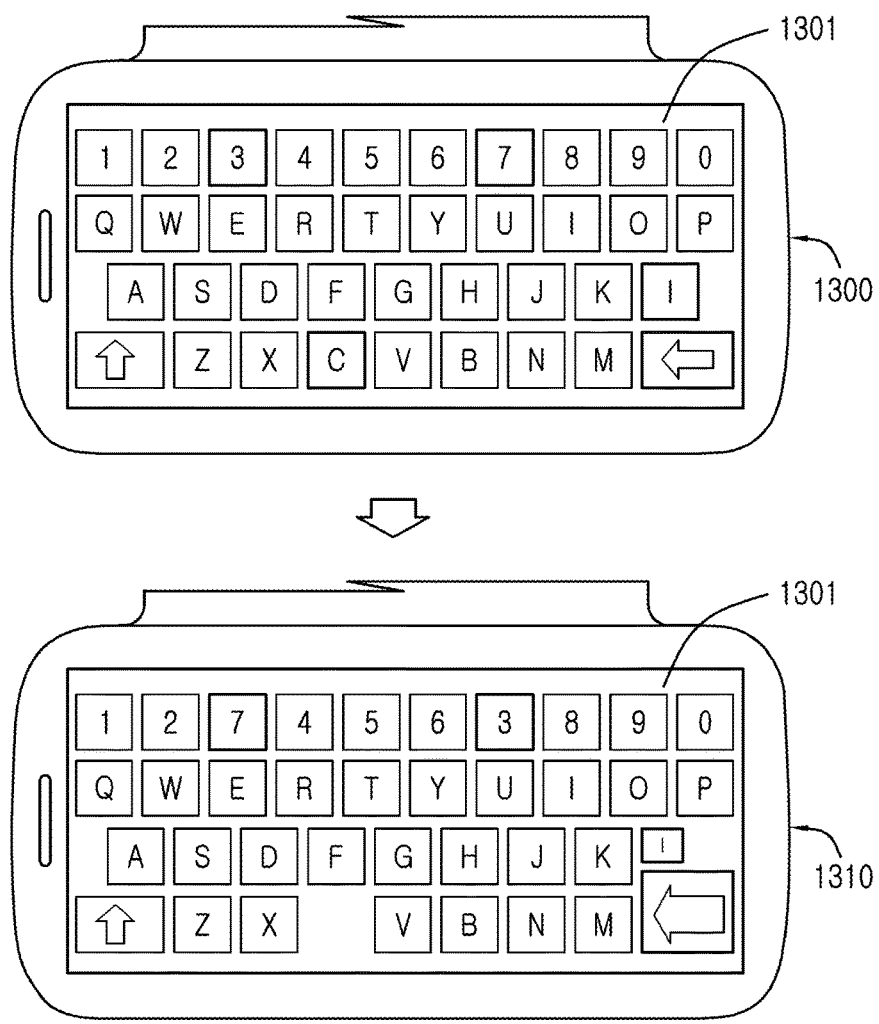
FIG. 73 is a view illustrating a screen of an electronic device according to an embodiment of the present disclosure.

FIG. 73 is a view illustrating a screen of an electronic device according to an embodiment of the present disclosure.

Referring to FIG. 73, the electronic device 12 may edit arrangement of keys of a keypad displayed via the screen 1301 of the electronic cover 1300 in response to a key edit event (e.g., performing a touch and drag on a key using a stylus to move the same).

Figure 74:
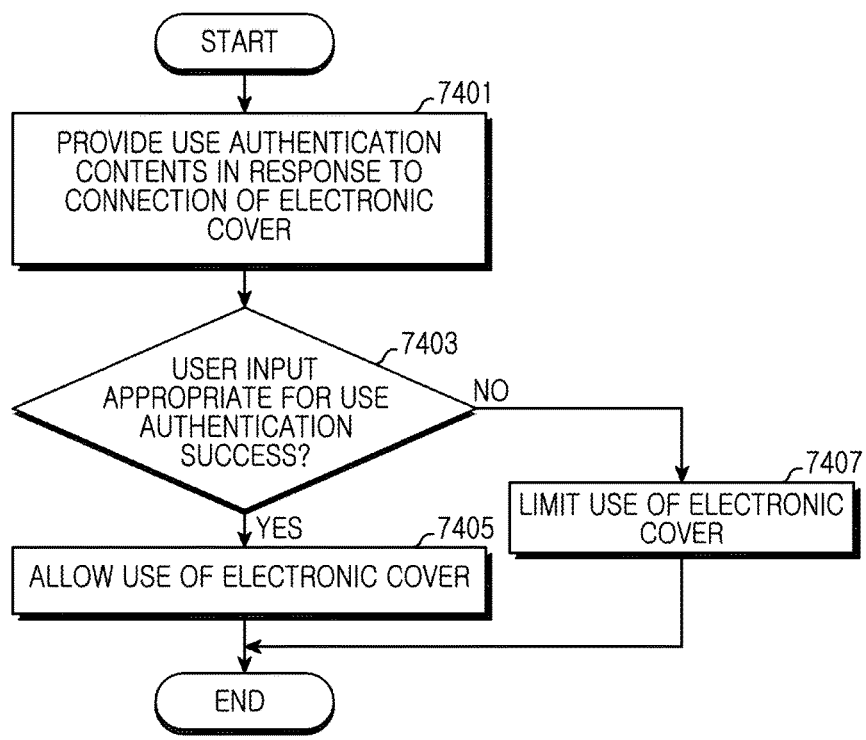
FIG. 74 is a flowchart regarding a UI operation according to an embodiment of the present disclosure.

FIG. 74 is a flowchart regarding a UI operation according to an embodiment of the present disclosure.

Referring to FIG. 74, in operation 7401, the UI module 180 (e.g., the processor 120) may provide use authentication contents (e.g., one of authentication contents such as a password input method, a touch pattern input method, a voice recognition method, or a movement recognition method of the electronic device 12) in response to connection of the electronic cover 1300. In operation 7403, the UI module 180 may determine whether a user input (e.g., appropriate number input, appropriate touch pattern input, appropriate voice input, or appropriate movement of the electronic device 12 (e.g., shaking)) appropriate for a use authentication success exists. In the case where a user input appropriate for use authentication exists, in operation 7405, the UI module 180 may allow (e.g., activate the electronic cover 1300 or release screen lock) use of the electronic cover 1300. Alternatively, in the case where a user input inappropriate for use authentication success exists, in operation 7407, the UI module 180 may limit (e.g., inactivation of the electronic cover 1300 or screen lock) use of the electronic cover 1300.

According to an embodiment, the electronic device 12 may determine an authentication method of the primary device 1200 depending on whether the electronic cover 1200 is connected. For example, when the electronic cover 1300 is connected, the primary device 1200 may identify the type of the electronic cover 1300. When it is identified that the electronic cover 1300 is a type including a fingerprint sensor, the primary device 1200, for example, may be set to change a lock state of the primary device 1200 via the fingerprint sensor of the electronic cover 1300.

Figure 75A:
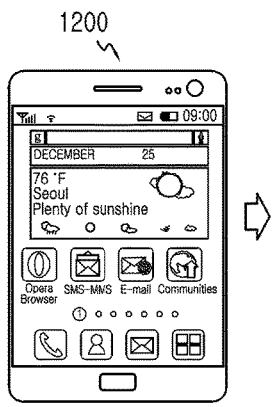
FIGS. 75A, 75B, 75C, and 75D are views illustrating a screen of an electronic device according to an embodiment of the present disclosure.

FIGS. 75A to 75 D are views illustrating a screen of an electronic device according to an embodiment of the present disclosure.

Figure 75B:
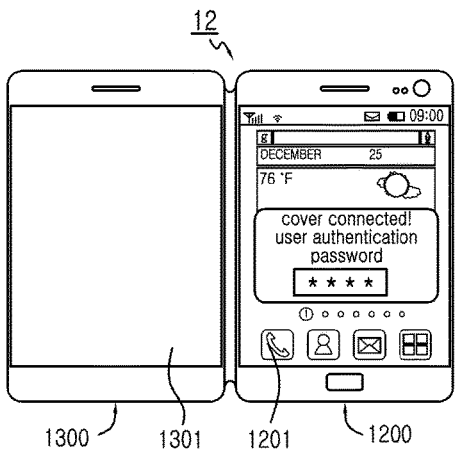
Figure 75C:
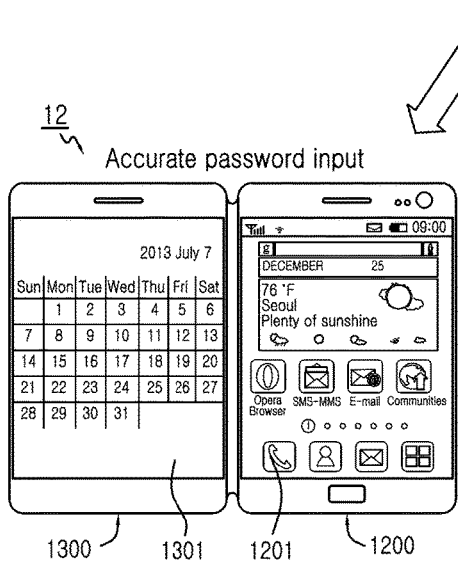
Figure 75D:
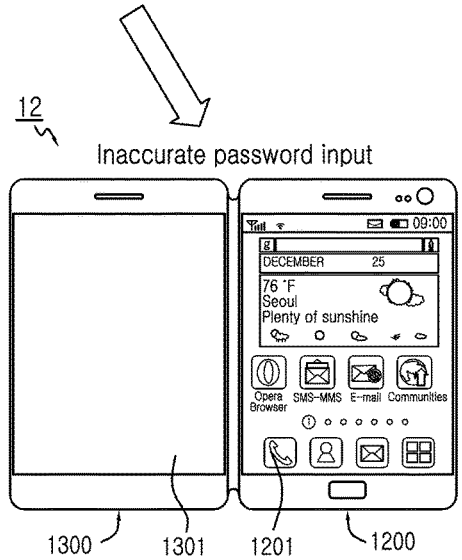

Referring to FIGS. 75A and 75B, in the case where the electronic cover 1300 is electrically connected to the primary device 1200, the primary device 1200 may display use authentication contents (e.g., contents of a password input method) via the screen. Referring to FIG. 75C, in the case where a user inputs a correct password, the primary device 1200 may allow use of the electronic cover 1300. Alternatively, referring to FIG. 75D, in the case where the user inputs an incorrect password, the primary device 1200 may limit use of the electronic cover 1300. According to an embodiment, the electronic cover 1300 may store data in a storage (e.g., a memory) included in the electronic cover 1300. For example, in the case where the electronic cover 1300 is electrically connected to the primary device 1200 and the user inputs a correct password, the user may access data stored in the storage of the electronic cover 1300.

Figure 76:
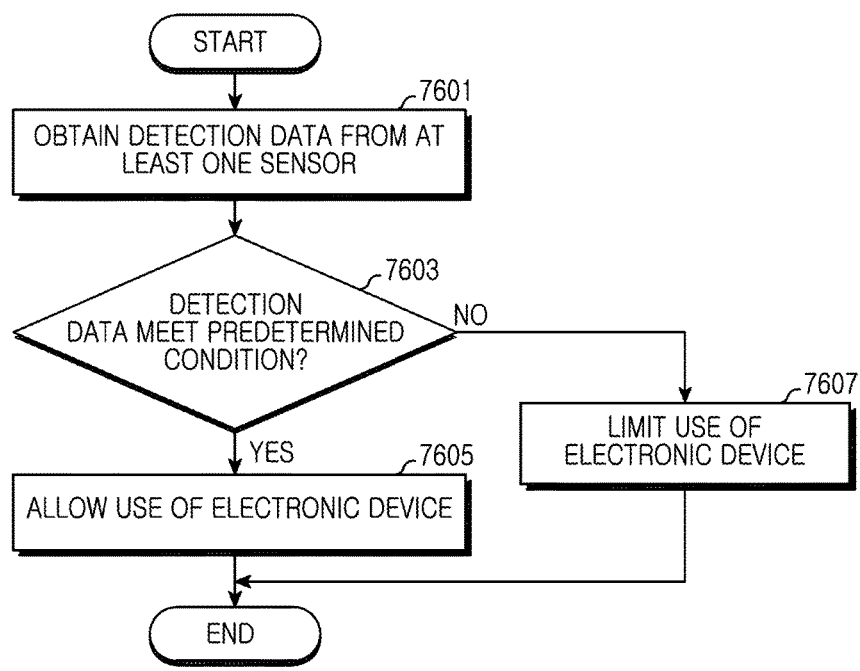
FIG. 76 is a flowchart regarding a UI operation according to an embodiment of the present disclosure.

FIG. 76 is a flowchart regarding a UI operation according to an embodiment of the present disclosure.

Referring to FIG. 76, in operation 7601, the UI module 180 (e.g., the processor 120) may obtain detection data from at least one sensor (e.g., a living body sensor). In operation 7603, the UI module 180 may determine whether the detection data meets a predetermined condition. In the case where the detection data meets the predetermined condition, in operation 7605, the UI module 180 may allow (e.g., activation of the primary device 1200 or the electronic cover 1300 or release of screen lock) use of the electronic device (e.g., the primary device 1200 or the electronic cover 1300). Alternatively, in the case where the detection data does not meet the predetermined condition, in operation 7607, the UI module 180 may limit (e.g., inactivation of the primary device 1200 or the electronic cover 1300 or screen lock) use of the electronic device (e.g., the primary device 1200 or the electronic cover 1300).

According to an embodiment, in the case where the primary device 1200 includes a first sensor (e.g., a living body sensor) and the electronic cover 1300 includes a second sensor (e.g., a living body sensor), the electronic device 12 may control the first sensor or the second sensor according to the order of priority. For example, in the case where a high security level is set, when both the first sensor and the second sensor meet a predetermined authentication condition, the electronic device 12 may control lock of the electronic device 12. For example, in the case where the electronic cover 1300 is open, the electronic device may request a user to perform an authentication input via the primary device 1200. In the case where the electronic cover 1300 is closed, the electronic device may request a user to perform an authentication input via the electronic cover 1300.

Figure 77A:
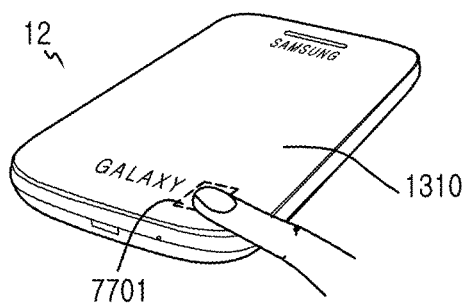
FIGS. 77A, 77B, and 77C are views illustrating a screen of an electronic device according to an embodiment of the present disclosure.
Figure 77B:
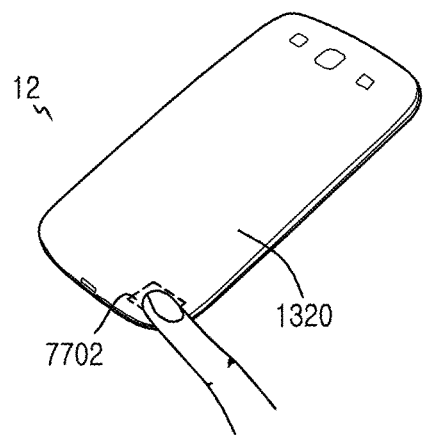
Figure 77C:
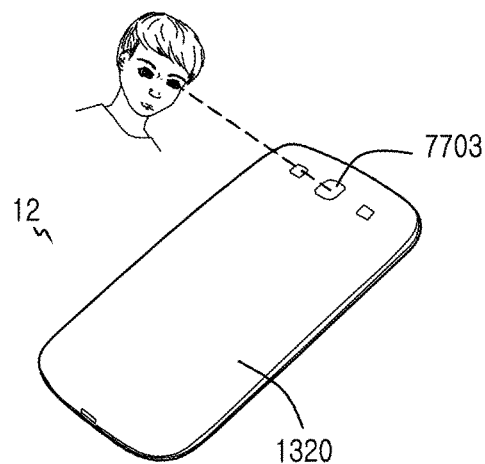

FIGS. 77A to 77C are views illustrating a screen of an electronic device according to an embodiment of the present disclosure.

Referring to FIG. 77A, the electronic cover (e.g., the first cover portion 1310) may include a fingerprint detector 7701 on its front side. Alternatively, referring to FIG. 77B, the electronic cover 1310 (e.g., the second cover portion 1320) may include a fingerprint detector 7702 on its backside. In the case where a user touches the fingerprint detector 7701 or 7702 with his finger, the electronic device 12 may detect the user's fingerprint data. In the case where the fingerprint data corresponds to stored fingerprint data, the electronic device 12 may allow use.

Referring to FIG. 77B, the primary device 1200 or the electronic cover (e.g., the first cover portion 1310 or the second cover portion 1320) may include a camera 7703. The electronic device 12 may detect data regarding the user's face (e.g., iris) via the camera 7703.

Figure 78:
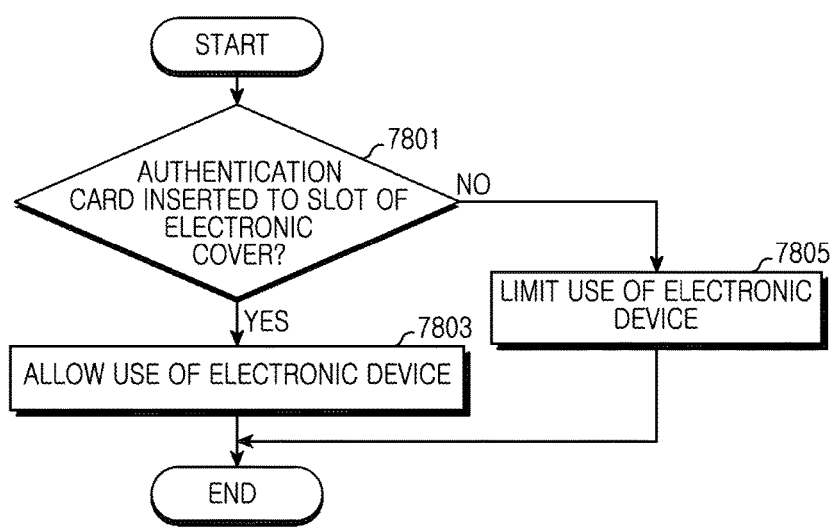
FIGS. 78 and 79 are flowcharts regarding a UI operation according to an embodiment of the present disclosure.

FIG. 78 is a flowchart regarding a UI operation according to an embodiment of the present disclosure.

Referring to FIG. 78, in operation 7801, the UI module 180 (e.g., the processor 120) may determine whether an authentication card has been inserted to a slot of the electronic cover 1300. Though not shown, the electronic cover 1300 may include a slot for receiving the authentication card in one of the first cover portion 1310, the second cover portion 1320, or the connection portion 1330. The slot may mount at least one terminal electrically connectable with at least one terminal disposed on the surface of the authentication card. The terminal of the slot may be electrically connected to the primary device 1200 by the medium of at least one terminal (e.g., 1329 of FIG. 14). In the case where the authentication card is inserted to the slot of the electronic cover 1300, in operation 7803, the UI module 180 may allow (e.g., activation of the primary device 1200 or the electronic cover 1300 or release of screen lock) use of the electronic device (e.g., the primary device 1200 or the electronic cover 1300). Alternatively, in the case where the authentication card is not inserted to the slot of the electronic cover 1300, in operation 7805, the UI module 180 may limit (e.g., in activation of the primary device 1200 or the electronic cover 1300 or screen lock) use of the electronic device (e.g., the primary device 1200 or the electronic cover 1300).

According to an embodiment, the electronic cover 1300 may include a slot for receiving a financial information related card (e.g., a credit card). For example, in case of receiving a payment request, the electronic device 12 may perform payment using the financial information related card. For example, when the electronic device 12 is tagged to an NFC tag, the electronic device 12 may perform payment using financial information included in the slot of the electronic cover 1300 or a storage.

Figure 79:
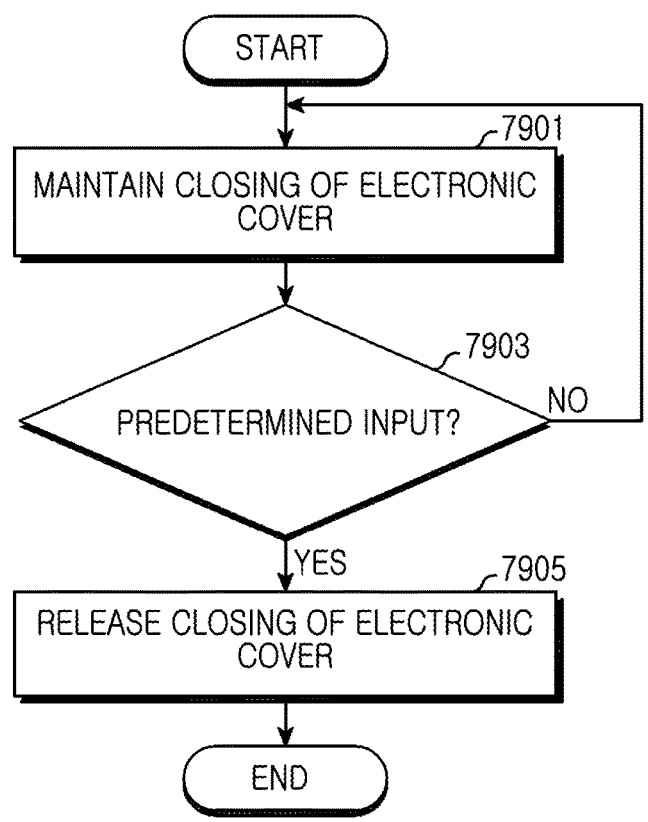

FIG. 79 is a flowchart regarding a UI operation according to an embodiment of the present disclosure.

Referring to FIG. 79, in operation 7901, the UI module 180 (e.g., the processor 120) may maintain closing of the electronic cover (e.g., the first cover portion 1310). For example, the electronic device 12 may include an electronic and mechanical device (e.g., an opening/closing device using a motor) that may open/close the electronic cover 1310 under control of the UI module 180. In operation 7903, the UI module 180 may determine whether a predetermined input exists. In the case where the predetermined input exists, in operation 7905, the UI module 180 may release closing of the electronic cover 1310. In the case where closing of the electronic cover 1310 is released, a user may open the electronic cover 1310. For example, the electronic cover 1310 may provide authentication contents of a password input method via a screen disposed on the exterior, and in the case where the user inputs a correct password, the electronic device 12 may release closing of the electronic cover 1310. Alternatively, in the case where the user inputs a correct voice, the electronic device 12 may release closing of the electronic cover 1310. Alternatively, in the case where the user moves (e.g., shakes) the electronic device 12 in a predetermined manner, the electronic device 12 may release closing of the electronic cover 1310.

Figure 80:
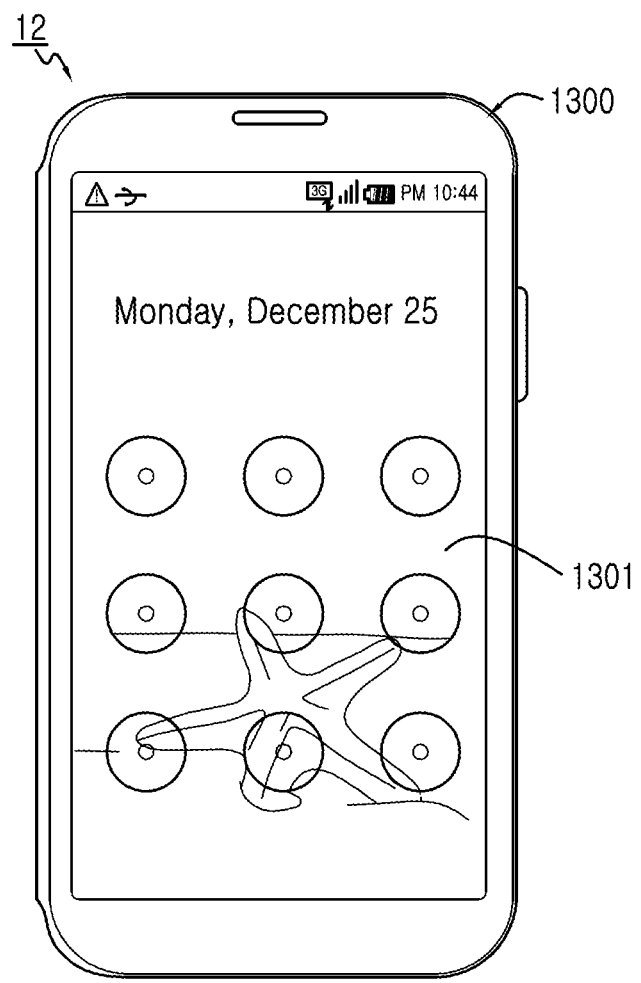
FIG. 80 is a view illustrating a screen of an electronic device according to an embodiment of the present disclosure.

FIG. 80 is a view illustrating a screen of an electronic device according to an embodiment of the present disclosure.

Referring to FIG. 80, the electronic device 12 may include a locking unit that may maintain closing of the electronic cover 1300. The electronic cover 1300 is in a closed position, and the electronic device 1200 may display authentication contents of a touch pattern input method via the screen 1301 of the electronic cover 1300. In the case where the user inputs a correct touch pattern via authentication contents, the electronic device 1200 may control the locking unit and release closing of the electronic cover 1300.

Figure 81:
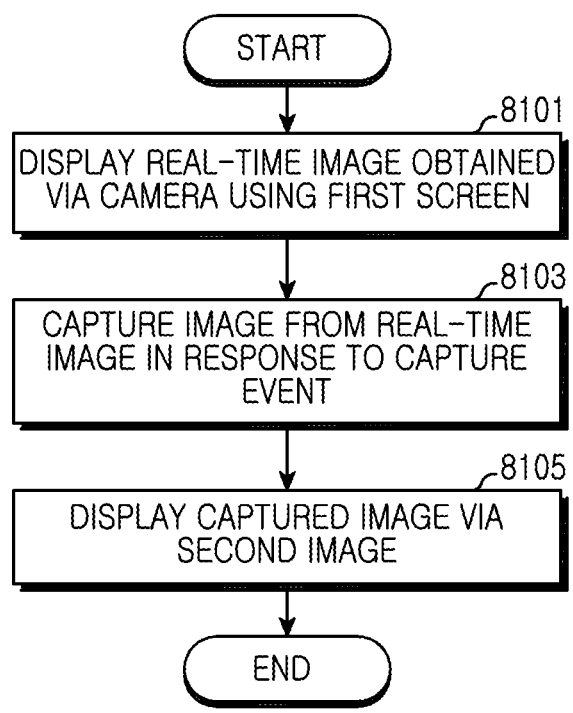
FIG. 81 is a flowchart regarding a UI operation according to an embodiment of the present disclosure.

FIG. 81 is a flowchart regarding a UI operation according to an embodiment of the present disclosure.

Referring to FIG. 81, in operation 8101, the UI module 180 (e.g., the processor 120) may display (e.g., preview display) a real-time image obtained via a camera via a first screen (e.g., the screen of the primary device 1200). In operation 8103, the UI module 180 may capture an image from a real-time image in response to a capture event (e.g., shooting button pressing by a user). In operation 8105, the UI module 180 may display the captured image on a second screen (e.g., the screen of the electronic cover 1300).

Figure 82:
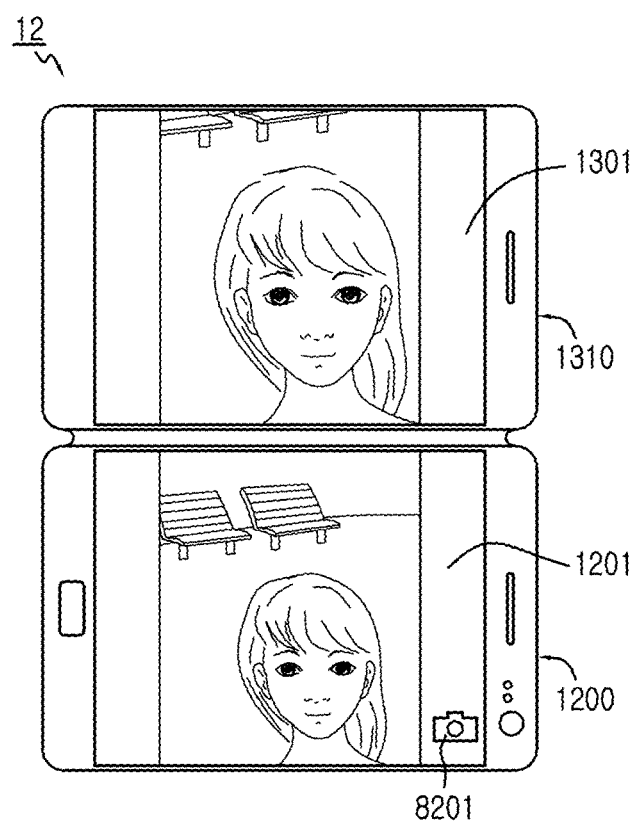
FIG. 82 is a view illustrating a screen of an electronic device according to an embodiment of the present disclosure.

FIG. 82 is a view illustrating a screen of an electronic device according to an embodiment of the present disclosure.

Referring to FIG. 82, the electronic cover (e.g., the first cover portion 1310) is in an open position, and the electronic device 12 may obtain an image via at least one camera, and display an image (e.g., a preview image) via the screen 1201 of the primary device 1200. In the case where a user presses a shooting button 8201 on the screen 1201 of the primary device 1200, the electronic device 12 may capture an image, and display the captured image (e.g., a still image) via the screen 1301 of the electronic cover 1300. For example, while displaying the captured image on the screen 1301 of the electronic cover 1300, the electronic device 12 may display a different image (e.g., a preview image) via the screen 1201 of the primary device 1200.

Figure 83:
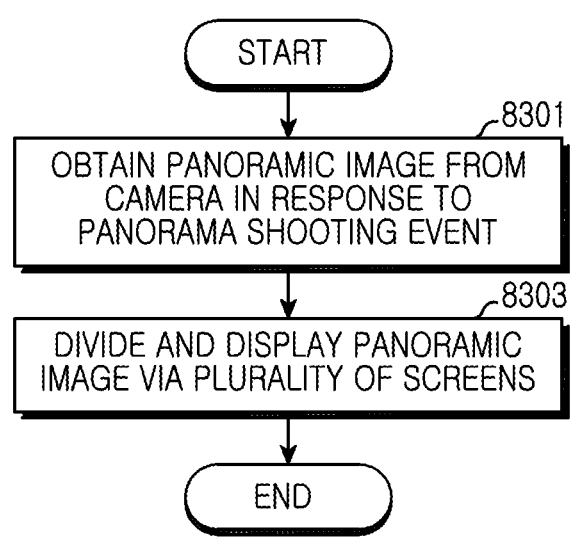
FIG. 83 is a flowchart regarding a UI operation according to an embodiment of the present disclosure.

FIG. 83 is a flowchart regarding a UI operation according to an embodiment of the present disclosure.

Referring to FIG. 83, in operation 8301, the UI module 180 (e.g., the processor 120) may obtain a panoramic image via a camera in response to a panorama shooting event. In operation 8303, the UI module 180 may divide and display a panoramic image via a plurality of screens. According to an embodiment, in the case where a camera is provided to both the primary device 1200 and the electronic device 1300, the electronic device 12 may obtain an image from both the cameras of the primary device 1200 and the electronic device 1300 in response to one user input depending on a shooting mode, an input method, a position of the cover, etc. According to an embodiment, the electronic device 12 may obtain a 3-D image (e.g., a 3-D image, a 3D video) using the cameras provided to the primary device 1200 and the electronic cover 1300. According to an embodiment, the electronic device 12 may process two or more images obtained using the cameras provided to the primary device 1200 and the electronic cover 1300 to obtain a different image. For example, the electronic device 12 may obtain images having different exposure values from the cameras provided to the primary device 1200 and the electronic cover 1300 and process the obtained images to obtain an HDR image (e.g., a high dynamic range image, a high dynamic range video).

Figure 84:
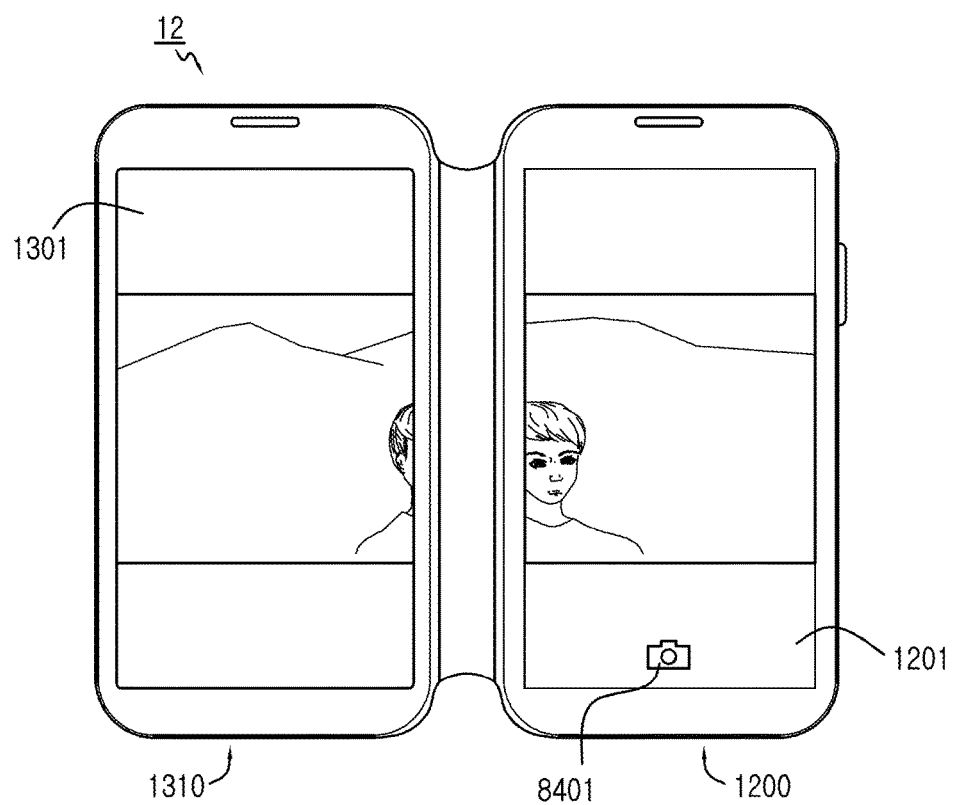
FIG. 84 is a view illustrating a screen of an electronic device according to an embodiment of the present disclosure.

FIG. 84 is a view illustrating a screen of an electronic device according to an embodiment of the present disclosure.

Referring to FIG. 84, the electronic cover (e.g., the first cover portion 1310) is in an open position, and the electronic device 12 may obtain a panoramic image via a camera in response to pressing of a panorama shooting button 8401 by a user, and divide the obtained panoramic image to two sides of the screen 1301 of the electronic cover 1310 and the screen 1201 of the primary device 1200 and display the same.

Figure 85:
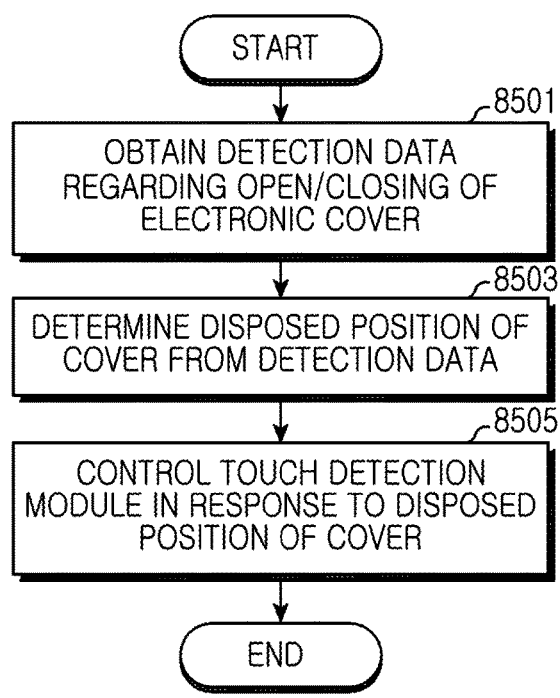
FIGS. 85 and 86 are flowcharts regarding a UI operation according to an embodiment of the present disclosure.

FIG. 85 is a flowchart regarding a UI operation according to an embodiment of the present disclosure.

Referring to FIG. 85, in operation 8501, the UI module 180 (e.g., the processor 120) may obtain detection data regarding opening/closing of the electronic cover (e.g., the first cover portion 1310). In operation 8503, the UI module 180 may determine a disposed position of the electronic cover 1310 from the detection data. In operation 8505, the UI module 180 may control a touch detection module (e.g., a touch panel or a digitizer) in response to the disposed position of the electronic cover 1310. For example, the UI module 180 may activate or inactivate a touch detection module. Alternatively, the UI module 180 may adjust capacitance for touch detection by the touch detection module. Alternatively, the UI module 180 may adjust a touch recognition sensitivity (touch sensitivity) by the touch detection module. For example, in the case where the touch recognition sensitivity is high relatively, the touch detection module may recognize a touch using a small change of capacitance.

Figure 86:
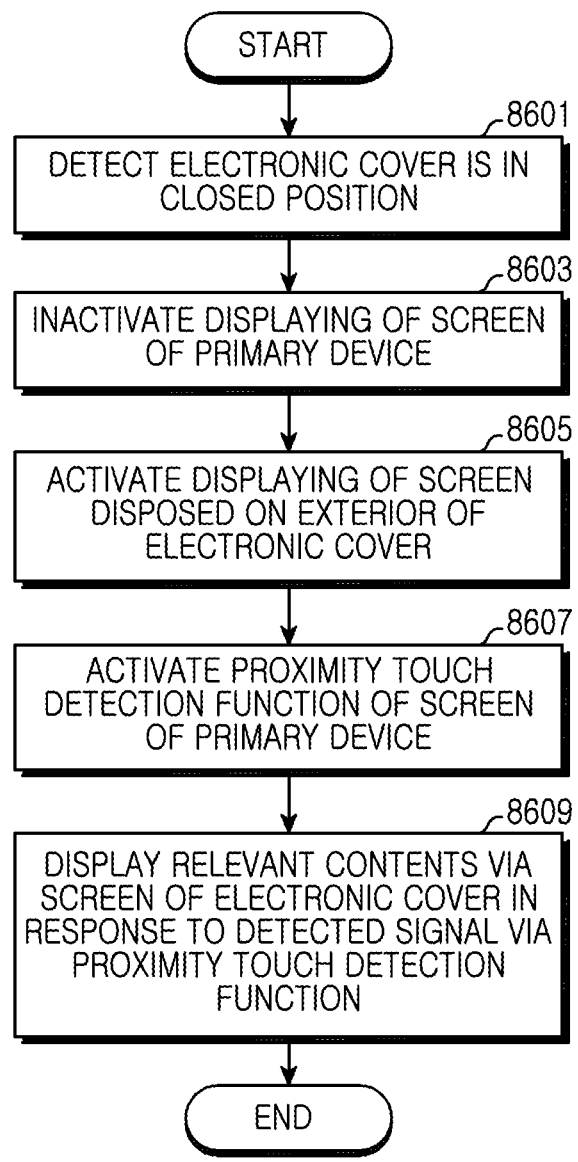

FIG. 86 is a flowchart regarding a UI operation according to an embodiment of the present disclosure.

Referring to FIG. 86, in operation 8601, the UI module 180 (e.g., the processor 120) may detect that the electronic cover (e.g., the first cover portion 1310) is in a closed position. In operation 8603, the UI module 180 may inactivate displaying of the screen of the primary device 1200. In operation 8605, the UI module 180 may activate displaying of a screen disposed on the exterior of the electronic cover 1310. In operation 8607, the UI module 180 may activate a proximity touch detection function (or a non-contact touch detection function) (e.g., hovering) of the screen of the primary device 1200. In operation 8609, the UI module 180 may display relevant contents via the screen of the electronic cover 1310 in response to a touch (input) detected via the proximity touch detection function. Here, operations subsequent to operation 8607 may be performed in response to occurrence of at least one predetermined event. For example, the at least one predetermined event may include a predetermined movement (e.g., shaking) of the electronic device 12, pressing of a predetermined button (e.g., a power button), separation of a stylus, etc.

Figure 87:
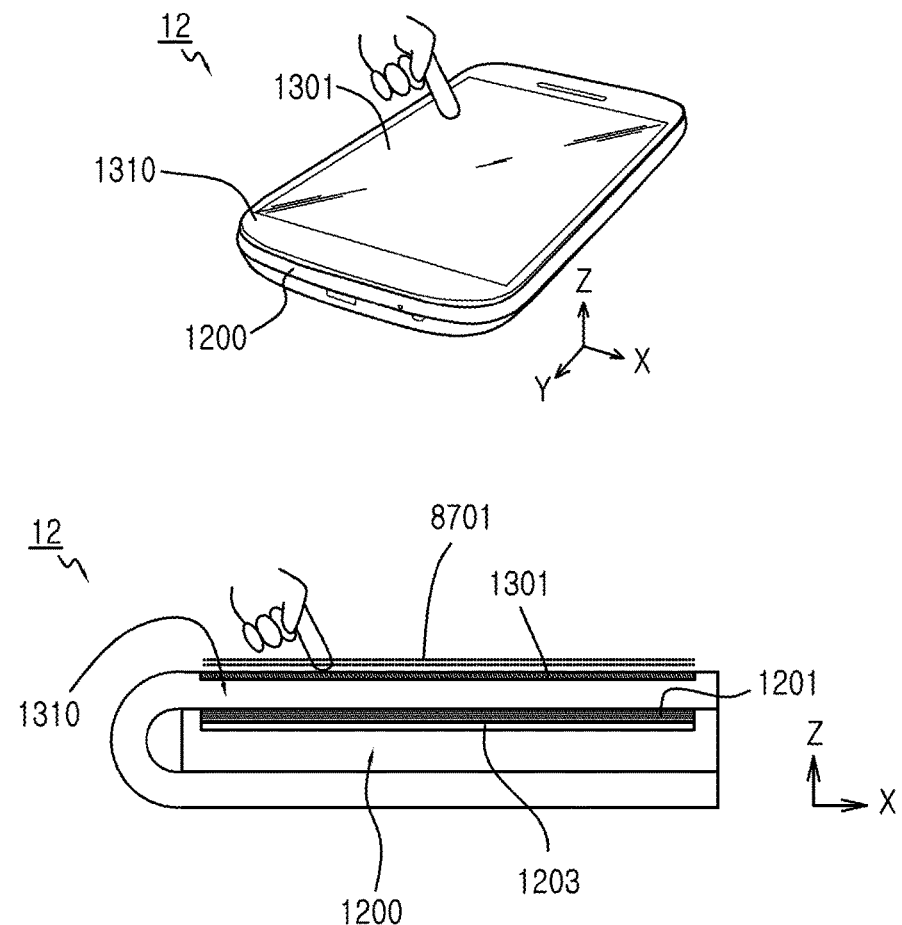
FIG. 87 is a view illustrating an electronic device according to an embodiment of the present disclosure.

FIG. 87 is a view illustrating an electronic device according to an embodiment of the present disclosure.

Referring to FIG. 87, the electronic cover (e.g., the first cover portion 1310) may be in a closed position. Here, the primary device 1200 may inactivate displaying of the screen 1201. Also, the primary device 1200 may activate displaying of the screen 1301 disposed on the exterior of the electronic cover 1310. Also, the primary device 1200 may activate a proximity touch detection function of the touch detection module 1203 (e.g., a touch panel or a digitizer) of the screen 1201 of the primary device 1200. Here, the touch detection module 1203 may generate an electromagnetic field (or capacitance) 8701 up to a surface height of the screen 1301 of the electronic cover 1310 or more. In the case where a finger or a stylus contacts the screen 1301 of the electronic cover 1310, capacitance is variable. In the case where a variable amount of capacitance reaches a threshold set to a proximity touch detection function, the touch detection module or the UI module 180 may recognize a touch. Though not shown, in the case where the electronic cover 1310 is in an open position, the primary device 1200 may inactivate the proximity touch detection function of the touch detection module, and activate a touch detection function using the screen 1201.

According to an embodiment, the electronic cover 1300 may include a transparent display. For example, in the case where the electronic cover 1300 is in a closed position, the electronic device 12 may provide a UI that uses a touch sensor of the electronic cover 1300 or the primary device 1200. For example, contents displayed on the screen 1201 of the primary device 1200 may penetrate a transparent display of the electronic cover 1300 and be shown to a user. For example, the electronic device 12 may control a touch sensor of the electronic cover 1300 to select the contents displayed on the screen 1201 of the primary device 1200. Also, for example, the electronic device 12 may control to select the contents displayed on the screen 1201 of the primary device 1200 via the transparent display by adjusting sensitivity of the touch sensor of the primary device 1200.

Figure 88:
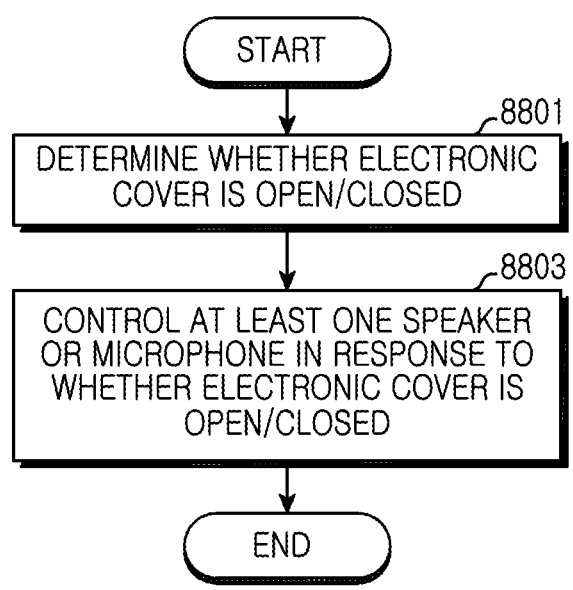
FIG. 88 is a flowchart regarding a UI operation according to an embodiment of the present disclosure.

FIG. 88 is a flowchart regarding a UI operation according to an embodiment of the present disclosure.

Referring to FIG. 88, in operation 8801, the UI module 180 (e.g., the processor 120) may determine whether the electronic cover (e.g., the first cover portion 1310) is opened/closed. In operation 8803, the UI module 180 may control at least one speaker or microphone of the electronic device (e.g., the primary device 1200 or the electronic cover 1300) in response to whether the electronic cover 1310 is opened/closed.

Figure 89A:
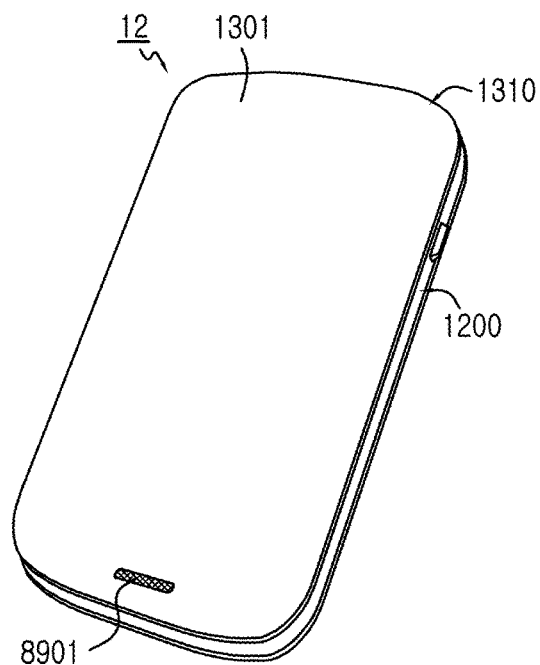
FIGS. 89A, 89B, 90A, and 90B are views illustrating an electronic device according to an embodiment of the present disclosure.
Figure 89B:
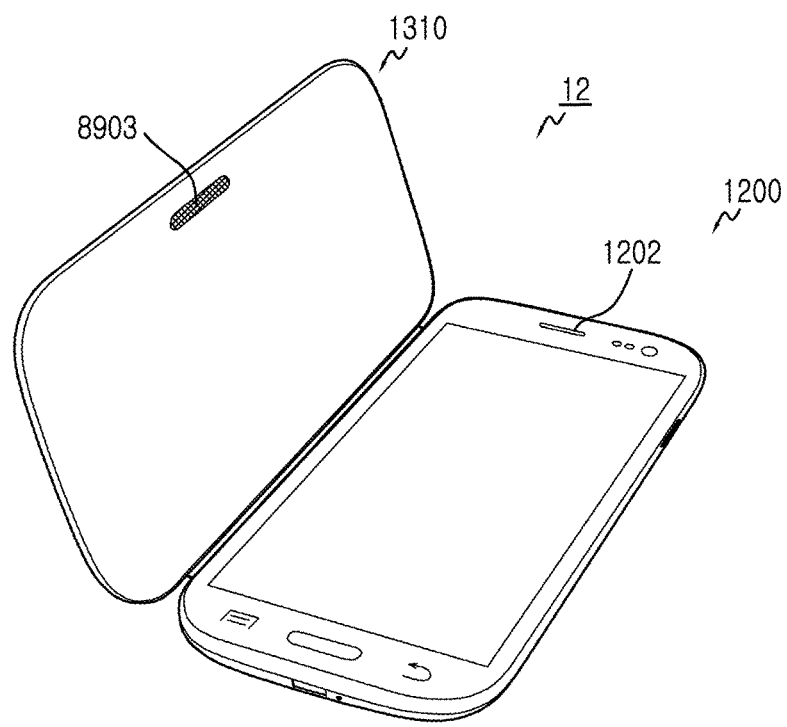

FIGS. 89A and 89B are views illustrating an electronic device according to an embodiment of the present disclosure.

Referring to FIG. 89A, in the case where the electronic cover (e.g., the first cover portion 1310) is in a closed position, the electronic device 12 may activate a speaker 8901 disposed on the exterior of the electronic cover 1310, and inactivate a speaker of the primary device 1200 hidden by the electronic cover 1310.

Referring to FIG. 89B, in the where the electronic cover 1310 is an open position, a speaker 1202 of the primary device 1200 and a speaker 8903 of the electronic cover 1300 may be exposed. Here, the electronic device 12 may activate the speaker 1202 of the primary device 1200 or the speaker 8903 of the electronic cover 1300. Alternatively, the electronic device 12 may activate the speaker 1202 of the primary device 1200 and the speaker 8903 of the electronic cover 1300 in stereo sound reproduction.

Figure 90A:
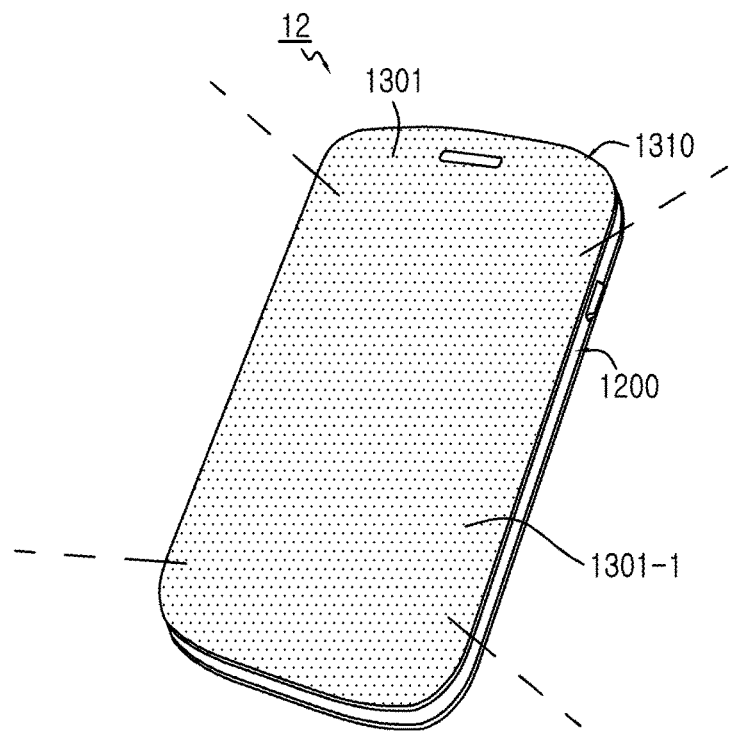
Figure 90B:
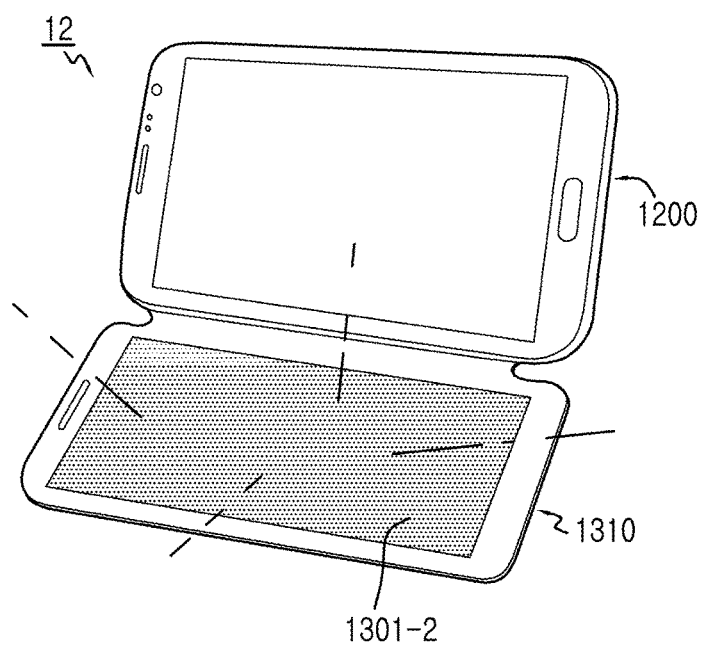

FIGS. 90A and 90B are views illustrating an electronic device according to an embodiment of the present disclosure.

Referring to FIG. 90A, in the case where the electronic cover (e.g., the first cover portion 1310) is in a closed position, the electronic device 12 may display a mirror image via a screen 1301-1 disposed on the exterior of the electronic cover 1310. Referring to FIG. 90B, in the case where the electronic cover 1310 is in an open position, the electronic device 12 may display a mirror image via a screen 1301-2 disposed on an exposed surface of the electronic cover 1310. The mirror image may be used for illuminating an object (e.g., a user's face) using reflection of light.

Figure 91:
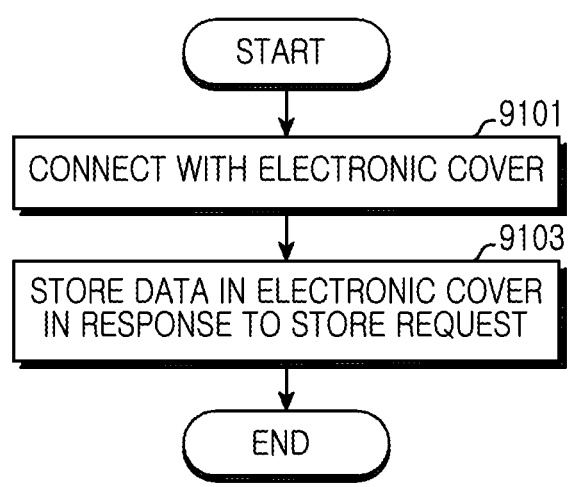
FIGS. 91 and 92 are flowcharts regarding a UI operation according to an embodiment of the present disclosure.

FIG. 91 is a flowchart regarding a UI operation according to an embodiment of the present disclosure.

Referring to FIG. 91, in operation 9101, the UI module 180 (e.g., the processor 120) may be connected with the electronic cover (e.g., 1300) electrically or functionally. In operation 9103, the UI module 180 may store data in a memory of the electronic cover 1300 in response to a store request.

Figure 92:
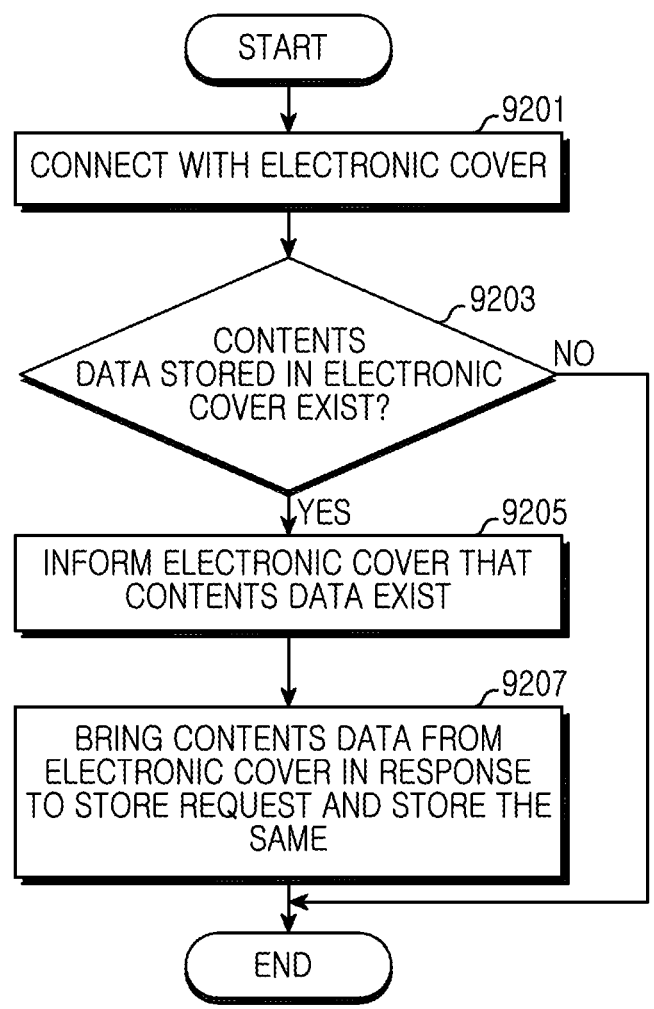

FIG. 92 is a flowchart regarding a UI operation according to an embodiment of the present disclosure.

Referring to FIG. 92, in operation 9201, the UI module 180 (e.g., the processor 120) may be connected with the electronic cover (e.g., 1300) electrically or functionally. In operation 9203, the UI module 180 may determine whether contents data (e.g., video data or voice data) stored in the electronic cover 1300 exists. In the case where contents data stored in the electronic cover 1300 exist, in operation 9205, the UI module 180 may indicate this information using a video or a voice. In operation 9207, the UI module 180 may bring contents data from the electronic cover 1300 and store the same in response to a store request.

According to an embodiment of the present disclosure, a method for operating the electronic device (e.g., the electronic device 12) may include: connecting with the electronic cover 1300, obtaining configuration information of the electronic cover 1300, and setting a UI in response to the obtained configuration information.

According to an embodiment of the present disclosure, connecting with the electronic cover 1300 may include connecting with the electronic cover 1300 using wired communication or wireless communication.

According to an embodiment of the present disclosure, setting the UI in response to the obtained configuration information may include determining a type of the electronic cover 1300 corresponding to the obtained configuration information, and setting a UI corresponding to a type of the electronic cover 1300.

According to an embodiment of the present disclosure, setting the UI in response to the obtained configuration information may include setting a UI corresponding to device identify information included in obtained configuration information.

According to an embodiment of the present disclosure, setting the UI in response to the obtained configuration information may include connecting with the electronic cover 1300 functionally.

According to an embodiment of the present disclosure, setting the UI in response to the obtained configuration information may include activating or inactivating an input unit or an output unit mounted on the electronic cover 1300.

According to an embodiment of the present disclosure, setting the UI in response to the obtained configuration information may include activating or inactivating an input unit or an output unit of the electronic cover 1300 in response to whether contents is suitable.

Figure 99:
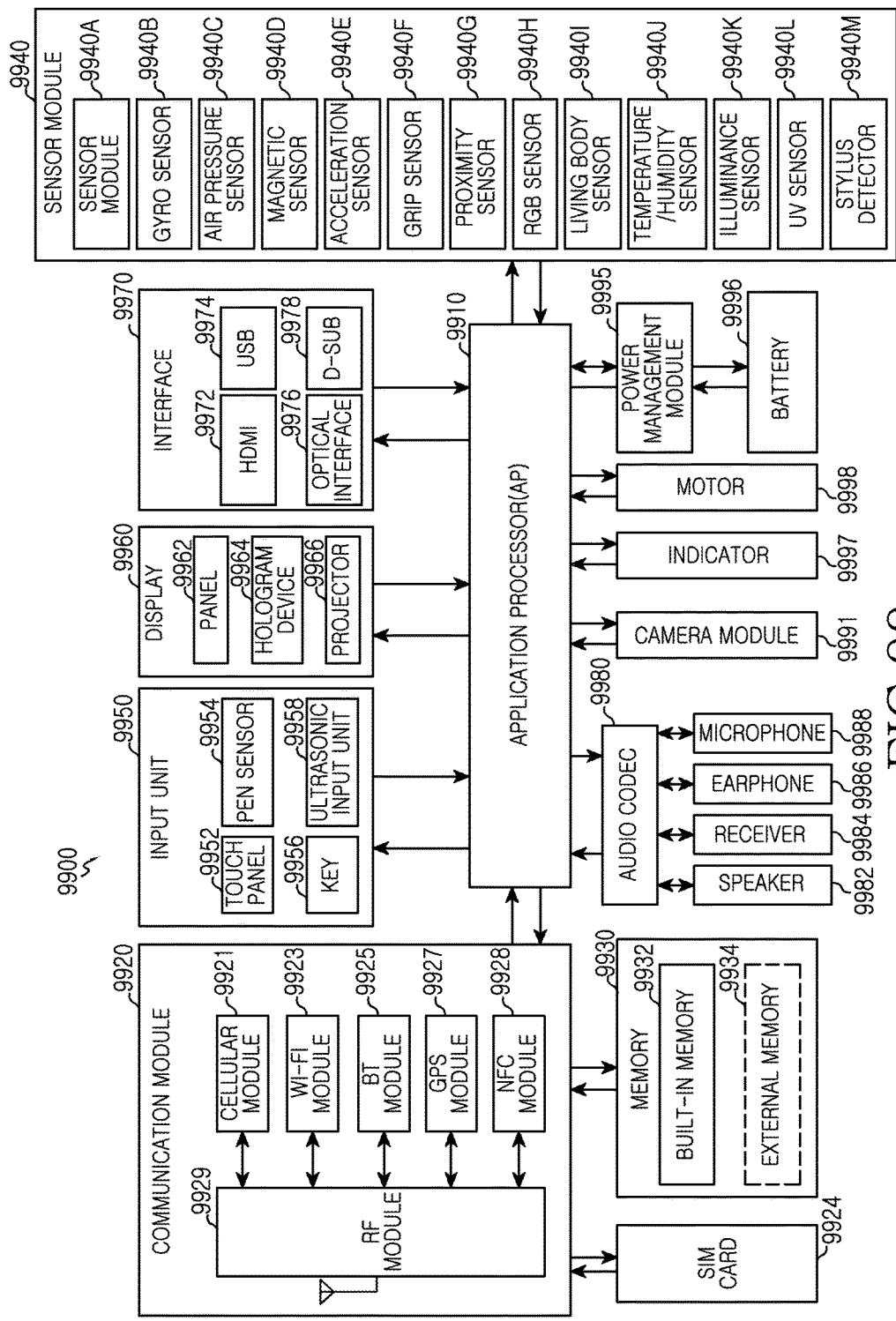
FIG. 99 is a block diagram illustrating an electronic device according to an embodiment of the present disclosure.

According to an embodiment of the present disclosure, setting the UI in response to the obtained configuration information may include activating or inactivating an input unit or an output unit of the electronic cover 1300 in response to data obtained from at least one sensor (e.g., a sensor module 9940 of FIG. 99).

According to an embodiment of the present disclosure, setting the UI in response to the obtained configuration information may include activating or inactivating an input unit or an output unit of the electronic cover 1300 in response to movement of the electronic device (e.g., the primary device 1200) or the electronic cover 1300.

According to an embodiment of the present disclosure, setting the UI in response to the obtained configuration information may include distributing at least one contents to the electronic cover 1300.

According to an embodiment of the present disclosure, setting the UI in response to the obtained configuration information may include distributing at least one program to the electronic cover 1300 during multi-tasking.

According to an embodiment of the present disclosure, setting the UI in response to the obtained configuration information may include storing data in the electronic cover 1300 or bringing data stored in the electronic cover 1300 to store the same.

According to an embodiment of the present disclosure, a method for operating an electronic device 12 including the primary device 1200 mounting a first screen thereon, and an electronic cover 1300 mounting a second screen connected with the primary device 1200 electrically or functionally, may include receiving at least one input (e.g., a touch input generated via a first screen or a second screen, data via at least one sensor, or movement of at least one of the primary device 1200 and the electronic cover 1300, etc.), and controlling the first screen or the second screen.

According to an embodiment of the present disclosure, controlling the first screen of the primary device 1200 or the second screen of the electronic cover 1300 may include activating or inactivating the first screen or the second screen.

According to an embodiment of the present disclosure, controlling the first screen of the primary device 1200 or the second screen of the electronic cover 1300 may include switching contents between the first screen and the second screen and displaying the same.

According to an embodiment of the present disclosure, controlling the first screen of the primary device 1200 or the second screen of the electronic cover 1300 may include dividing contents into two sides of the first screen and the second screen and displaying the same.

According to an embodiment of the present disclosure, controlling the first screen of the primary device 1200 or the second screen of the electronic cover 1300 may include synthesizing a first image of the first screen and a second image of the second screen, and displaying the synthesized image via the first screen and the second screen.

According to an embodiment of the present disclosure, controlling the first screen of the primary device 1200 or the second screen of the electronic cover 1300 may include may include displaying different programs via two sides of the first screen and the second screen during multi-tasking.

According to an embodiment of the present disclosure, controlling the first screen of the primary device 1200 or the second screen of the electronic cover 1300 may include setting a lock or releasing a lock.

According to an embodiment of the present disclosure, controlling the first screen of the primary device 1200 or the second screen of the electronic cover 1300 may include inactivating displaying of the first screen and activating a proximity touch function of the first screen.

Figure 93:
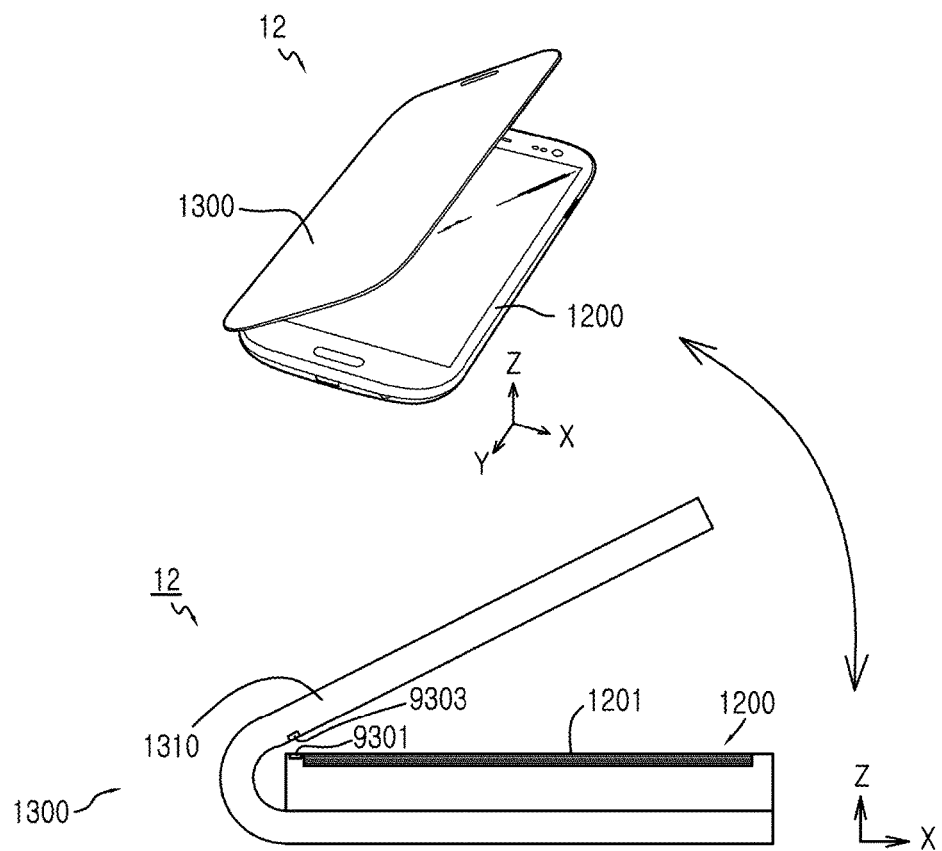
FIG. 93 is a view illustrating an electronic device according to an embodiment of the present disclosure.

FIG. 93 is a view illustrating an electronic device according to an embodiment of the present disclosure.

Referring to FIG. 93, the primary device 1200 may include a Hall sensor 9301 disposed on one side thereof. The first cover portion 1310 of the electronic cover 1300 may include a magnetic material 9303 (e.g., a magnet) disposed on one side thereof. In the case where the Hall sensor 9301 reacts to the magnet 9303, the primary device 1200 may determine that the first cover portion 1310 is in a closed position. Alternatively, in the case where the Hall sensor 9301 does not react to the magnet 9303, the primary device 1200 may determine that the first cover portion 1310 is in an open position. According to an embodiment, the Hall sensor 9301 may be provided to the primary device 1200, and the magnet 9303 may be provided to the electronic cover 1300.

Figure 94:
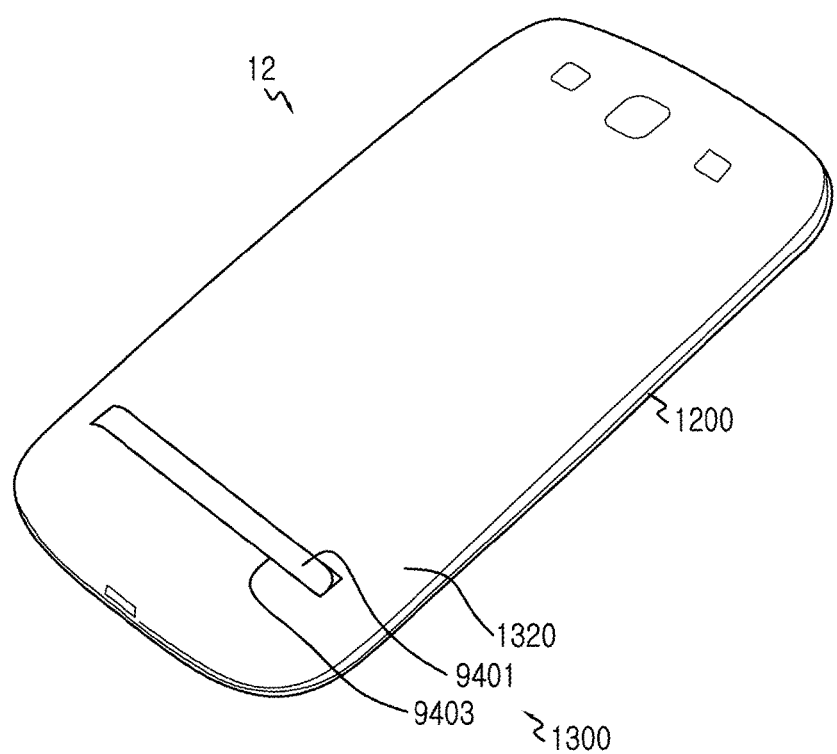
Figure 95:
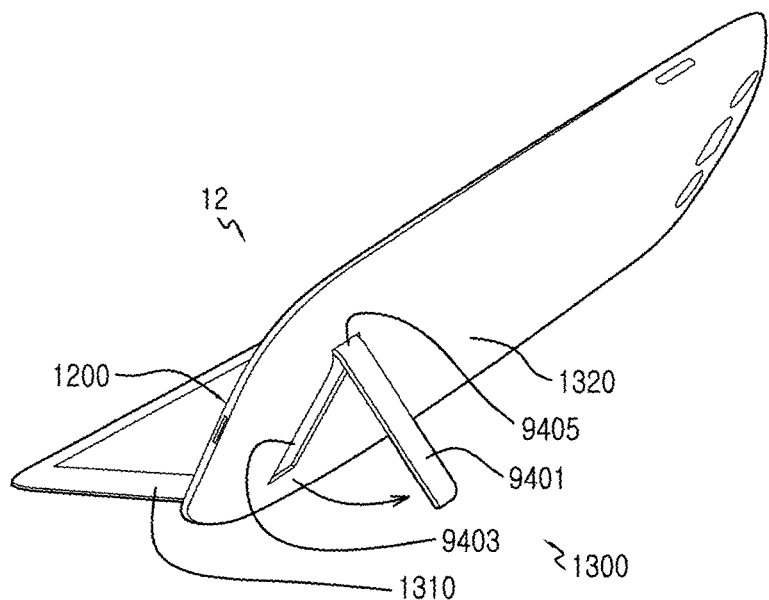
Figure 96:
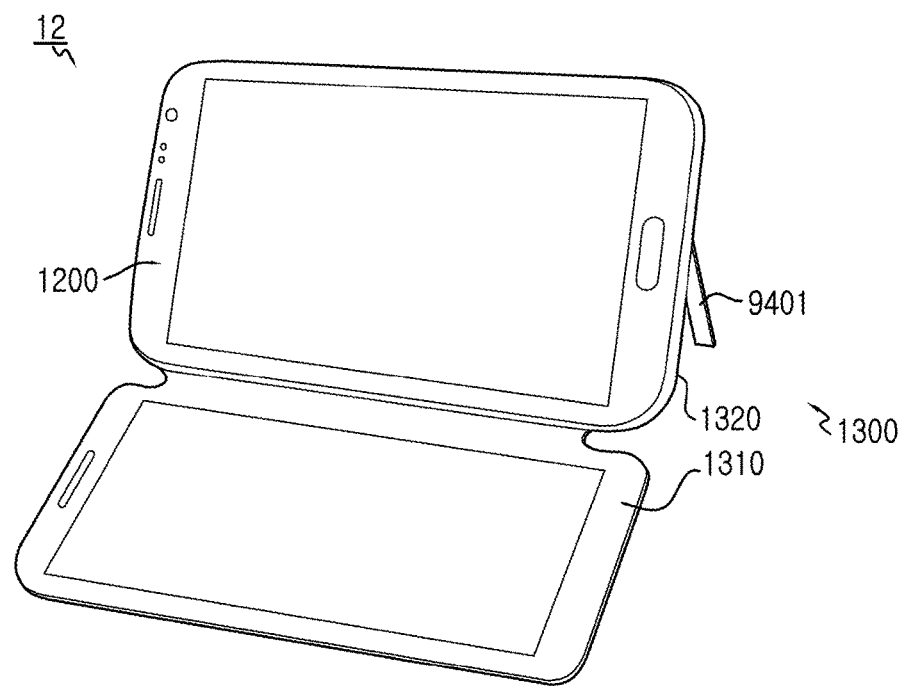

FIGS. 94 to 96 are views illustrating an electronic device according to an embodiment of the present disclosure.

Referring to FIGS. 94 to 96, a second cover portion 1320 of the electronic cover 1300 may include a support 9401, a groove 9403, and a hinge connector 9405. The support 9401 may protrude to the outside of the groove 9403 in such a way of rotating around the hinge connector 9405. The electronic device 12 may be held at an angle using the support 9401 protruding to the outside. According to an embodiment, when the electronic device 12 is stood up, the electronic device 12 may recognize this, and control a screen to display suitable information for a relevant direction.

Referring to FIG. 97, the second cover portion 1320 of the electronic cover 1300 may further include an additional support 9402 rotatably connected to an end of the support 9401. The additional support 9402 may be unfolded from the support 9401 to perform an additional support of standing the electronic device 12.

Figure 98:
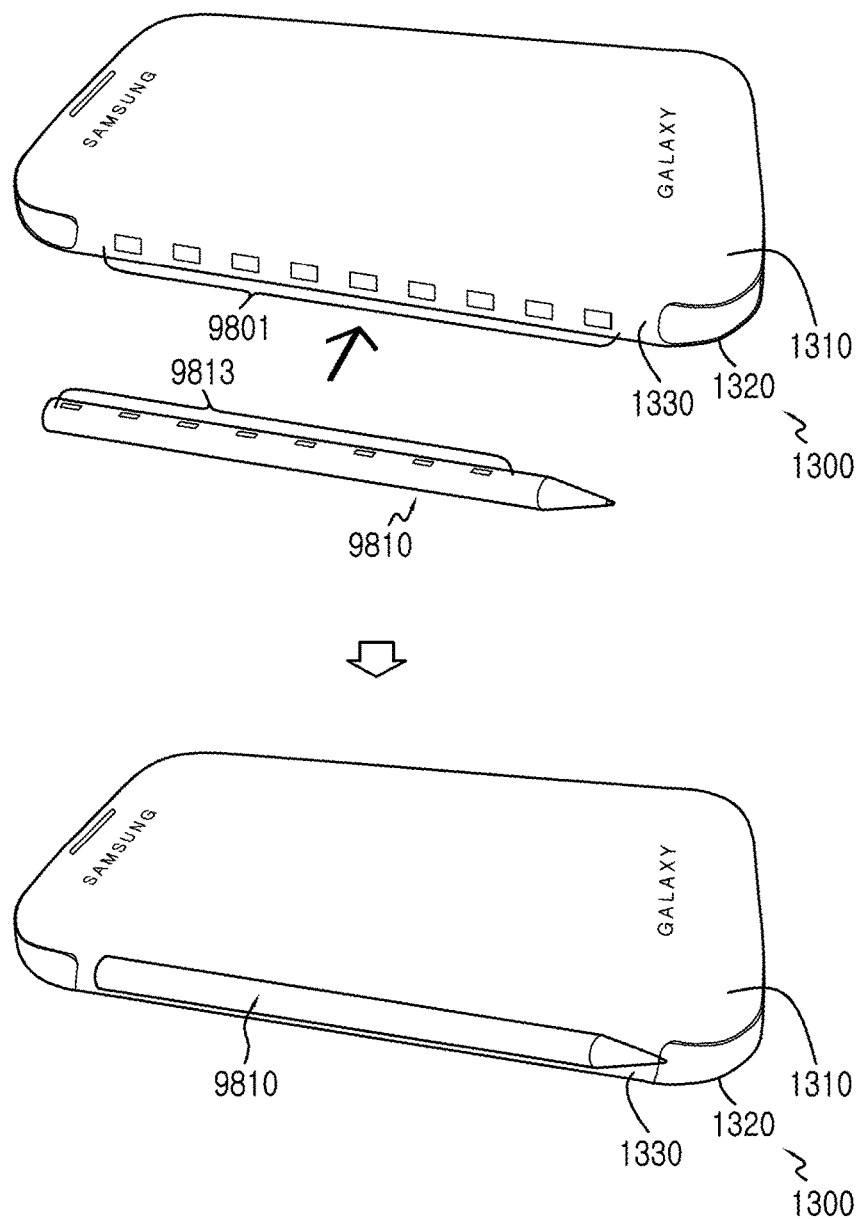

FIG. 98 is a view illustrating an electronic device according to an embodiment of the present disclosure.

Referring to FIG. 98, the electronic device may include an electronic cover 1300 and a stylus 9810. The electronic cover 1300 may include the first cover portion 1310, the second cover portion 1320, and a connector 1330. The connector 1330 may connect the first cover portion 1310 with the second cover portion 1320, and cover a lateral side (e.g., a side connecting up and down sides) of the primary device 1200. The connector 1330 may include at least one magnet 9801. The stylus 9810 may include a magnet material 9813, and may be attached to the connector 1330 of the electronic cover 1300 by attractive force of the magnet 9801.

FIG. 99 is a block diagram illustrating an electronic device according to an embodiment of the present disclosure.

Referring to FIG. 99, the electronic device 9900, for example, may form all or a portion of the electronic device 101 illustrated in FIG. 1. In more detail, the electronic device 9900 may include one or more Application Processors (AP) 9910, a communication module 9920, a SIM card 9924, a memory 9930, a sensor module 9940, an input unit 9950, a display 9960, an interface 9970, an audio module 9980, a camera module 9991, a power management module 9995, a battery 9996, an indicator 9997, and a motor 9998.

The AP 9910 may drive an Operating System (OS) or an application to control a plurality of hardware or software elements connected to the AP 9910, and perform various processes of data including multimedia data and operations. The AP 9910, for example, may be implemented as a System on Chip (SoC). According to an embodiment, the AP 9910 may further include a GPU (not shown).

The communication module 9920 (e.g., the communication interface 170) may perform data transmission/reception in communication between other electronic devices (e.g., the electronic device 104 or the server 106) connected with the electronic device 9900 (e.g., the electronic device 101) via a network. According to an embodiment, the communication module 9920 may include a cellular module 9921, a Wi-Fi module 9923, a BT module 9925, a GPS module 9927, an NFC module 9928, and an RF module 9929.

The cellular module 9921 may provide voice communication, video communication, a character service, or an Internet service, etc. via a communication network (e.g., an LTE, an LTE-A, a CDMA, a WCDMA, a UMTS, a WiBro, or a GSM, etc.). Also, the cellular module 9921, for example, may perform discrimination and authentication of an electronic device within a communication network using a subscriber identification module (e.g., a SIM card 9924). According to an embodiment, the cellular module 9921 may perform at least a portion of functions that may be provided by the AP 9910. For example, the cellular module 9921 may perform at least a portion of a multimedia control function.

According to an embodiment, the cellular module 9921 may include a Communication Processor (CP). Also, the cellular module 9921, for example, may be implemented as an SoC. Though elements such as the cellular module 9921 (e.g., the CP), the memory 9930, or the power management module 9995, etc. have been illustrated as elements separately from the AP 9910 in FIG. 99, the AP 9910 may be implemented to include at least a portion (e.g., the cellular module 9921) of the above elements according to an embodiment.

According to an embodiment, the AP 9910 or the cellular module 9921 (e.g., the CP) may load an instruction or data received from at least one of a non-volatile memory or other elements connected to the AP and the cellular module, to the non-volatile memory to process the same. Also, the AP 9910 or the cellular module 9921 may store data received from at least one of other elements or generated by at least one of other elements in a non-volatile memory.

Each of the Wi-Fi module 9923, the BT module 9925, the GPS module 9927, and the NFC module 9928, for example, may include a processor for processing data transmitted/received via the relevant module. Though the cellular module 9921, the Wi-Fi module 9923, the BT module 9925, the GPS module 9927, and the NFC module 9928 have been illustrated as separate blocks, respectively, in FIG. 99, at least a portion (e.g., two or more elements) of the cellular module 9921, the Wi-Fi module 9923, the BT module 9925, the GPS module 9927, and the NFC module 9928 may be included within one Integrated Circuit (IC) or an IC package according to an embodiment. For example, at least a portion (e.g., a communication processor corresponding to the cellular module 9921 and a Wi-Fi processor corresponding to the Wi-Fi module 9923) of communication processors corresponding to the cellular module 9921, the Wi-Fi module 9923, the BT module 9925, the GPS module 9927, and the NFC module 9928, respectively, may be implemented as one SoC.

The RF module 9929 may perform data transmission/reception, for example, transmission/reception of an RF signal. Though not shown, the RF module 9929, for example, may include a transceiver, a Power Amplifier Module (PAM), a frequency filter, or Low Noise Amplifier (LNA), etc. Also, the RF module 9929 may further include a part for transmitting a radio wave on a free space in wireless communication, for example, a conductor or a conducting wire, etc. Though the cellular module 9921, the Wi-Fi module 9923, the BT module 9925, the GPS module 9927, and the NFC module 9928 have been illustrated to share one RF module 9929 in FIG. 99, at least one of the cellular module 9921, the Wi-Fi module 9923, the BT module 9925, the GPS module 9927, and the NFC module 9928 may perform transmission/reception of an RF signal via a separate RF module according to an embodiment.

The SIM card 9924 may be a card including a subscriber identification module, and may be inserted to a slot formed in a specific position of the electronic device. The SIM card 9924 may include unique identify information (e.g., Integrated Circuit Card Identifier (ICCID) or subscriber information (e.g., Integrated Mobile Subscriber Identify (IMSI)).

The memory 9930 (e.g., the memory 130) may include a built-in memory 9932 or an external memory 9934. The built-in memory 9932, for example, may include at least one of a volatile memory (for example, Dynamic RAM (DRAM), Static RAM (SRAM), Synchronous Dynamic RAM (SDRAM), etc.), and a non-volatile memory (for example, One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory, etc.).

According to an embodiment, the built-in memory 9932 may be a Solid State Drive (SSD). The external memory 9934 may further include a flash drive, for example, a Compact Flash (CF), a Secure Digital (SD), a Micro-Secure Digital (SD), a mini-SD, an extreme Digital (xD), or a memory stick, etc. The external memory 9934 may be functionally connected with the electronic device 9900 via various interfaces. According to an embodiment, the electronic device 9900 may further include a storage (or a storage medium) such as a hard drive.

The sensor module 9940 may measure a physical quantity or detect an operation state of the electronic device 9900 to convert the measured or detected information to an electric signal. The sensor module 9940, for example, may include at least one of a gesture sensor 9940A, a gyro sensor 9940B, a pressure sensor 9940C, a magnetic sensor 9940D, an acceleration sensor 9940E, a grip sensor 9940F, a proximity sensor 9940G, a color sensor 9940H (e.g., an RGB sensor), a living body sensor 9940I, a temperature/humidity sensor 9940J, an illuminance sensor 9940K, an UV sensor 9940L, and a stylus detector 9940M. Additionally or generally, the sensor module 9940, for example, may include an E-nose sensor (not shown), an ElectroMyoGraphy sensor (EMG) sensor (not shown), an ElectroEncephaloGram (EEG) sensor (not shown), an ElectroCardioGram (ECG) sensor (not shown), an InfraRed (IR) sensor, an iris sensor (not shown), and a fingerprint sensor (not shown), etc. The sensor module 9940 may further include a control circuit for controlling at least one sensor belonging thereto.

The input unit 9950 may include a touch panel 9952, a (digital) pen sensor 9954, a key 9956, and an ultrasonic input unit 9958. The touch panel 9952, for example, may recognize a touch input using at least one of a capacitive overlay, a resistance overlay, an infrared beam, and an ultrasonic wave. Also, the touch panel 9952 may further include a control circuit. In case of a capacitive overlay, a physical contact or proximity recognition is possible. The touch panel 9952 may further include a tactile layer. In this case, the touch panel 9952 may provide a tactile reaction to a user.

The (digital) pen sensor 9954, for example, may be implemented using a method which is the same as or similar to receiving a user touch input, or a separate sheet for recognition. The key 9956, for example, may include a physical button, an optical key, or a keypad. The ultrasonic input unit 9958 is a device allowing the electronic device 9900 to detect a sound wave using a microphone 9988 to determine data via an input tool generating an ultrasonic signal, and enables wireless recognition. According to an embodiment, the electronic device 9900 may receive a user input from an external unit (e.g., a computer or a server) connected thereto using the communication module 9920.

The display 9960 (e.g., the output unit 150) may include a panel 9962, a hologram device 9964, or a projector 9966. The panel 9962, for example, may be a LCD or an AMO-LED, etc. The panel 9962, for example, may be implemented such that it is flexible, transparent, or wearable. The panel 9962 may include the touch panel 9952 and another module. The hologram device 9964 may show a 3-D image in a vacant space using interference of light. The projector 9966 may project light onto a screen to display an image. The screen, for example, may be positioned in the inside or outside of the electronic device 9900. According to an embodiment, the display 9960 may further include a control circuit for controlling the panel 9962, the hologram device 9964, or the projector 9966.

The interface 9970, for example, may include an HDMI 9972, a USB 9974, an Optical Interface 9976, or a D-sub 9978. The interface 9970, for example, may be included in the communication interface 170 illustrated in FIG. 1. Additionally or generally, the interface 9970, for example, may include a Mobile High Definition Link (MHL) interface, a SD card/Multi-media cared (MMC) interface, or an Infrared Data Association (IrDA) standard interface.

The audio module 9980 may convert a sound and an electric signal in dual directions. At least a portion of elements of the audio module 9980, for example, may be included in the I/O interface illustrated in FIG. 1. The audio module 9980, for example, may process sound information input or output via the speaker 9982, the receiver 9984, the earphone 9986, or the microphone 9988, etc.

The camera module 9991 is a unit that may shoot a still picture and a moving picture. According to an embodiment, the camera module 9991 may include one or more image sensors (e.g., a front sensor or a rear sensor), a lens (not shown), an ISP (not shown), or a flash (not shown) (e.g., an LED or an xenon lamp).

The power management module 9995 may manage power of the electronic device 9900. Though not shown, the power management module 9995, for example, may include a Power Management Integrated Circuit (PMIC) a charger IC, or a battery or fuel gauge.

The PMIC, for example, may be mounted inside an IC or an SoC semiconductor. A charging method may be divided into a wired method and a wireless method. The charger IC may charge a battery, and prevent an overvoltage or an overcurrent introduction from a charger. According to an embodiment, the charger IC may include a charger IC for at least one of a wired charging method and a wireless charging method. For the wireless charging method, for example, there are a magnetic resonance method, a magnetic induction method, or an electromagnetic method, etc. An additional circuit for wireless charging, for example, circuits such as a coil loop, a resonance circuit, or a rectifier, etc. may be added.

A battery gauge, for example, may measure a remnant of the battery 9996, a voltage, a current, or a temperature during charging. The battery 9996 may store or generate electricity, and supply power to the electronic device 9900 using the stored or generated electricity. The battery 9996, for example, may include a rechargeable battery or a solar battery.

The indicator 9997 may display a specific state, for example, a booting state, a message state, or a charging state, etc. of the electronic device 9900 or a portion (e.g., the AP 9810) thereof. The motor 9998 may convert an electric signal to mechanical vibration. Though not shown, the electronic device 9900 may include a processing unit (e.g., a GPU) for supporting a mobile TV. The processing unit for supporting the mobile TV, for example, may process media data according to standards of DMB, Digital Video Broadcasting (DVB), or media flow, etc.

Each of the above elements of the electronic device according to an embodiment of the present disclosure may be configured using one or more components, and a name of a relevant element may change depending on the kind of the electronic device. The electronic device according to an embodiment of the present disclosure may include at least one of the above elements, and a portion of the elements may be omitted or additional other elements may be further included. Also, some of the elements of the electronic device according to the present disclosure may combine to form one entity, thereby equally performing the functions of the relevant elements before the combination.

Figure 100:
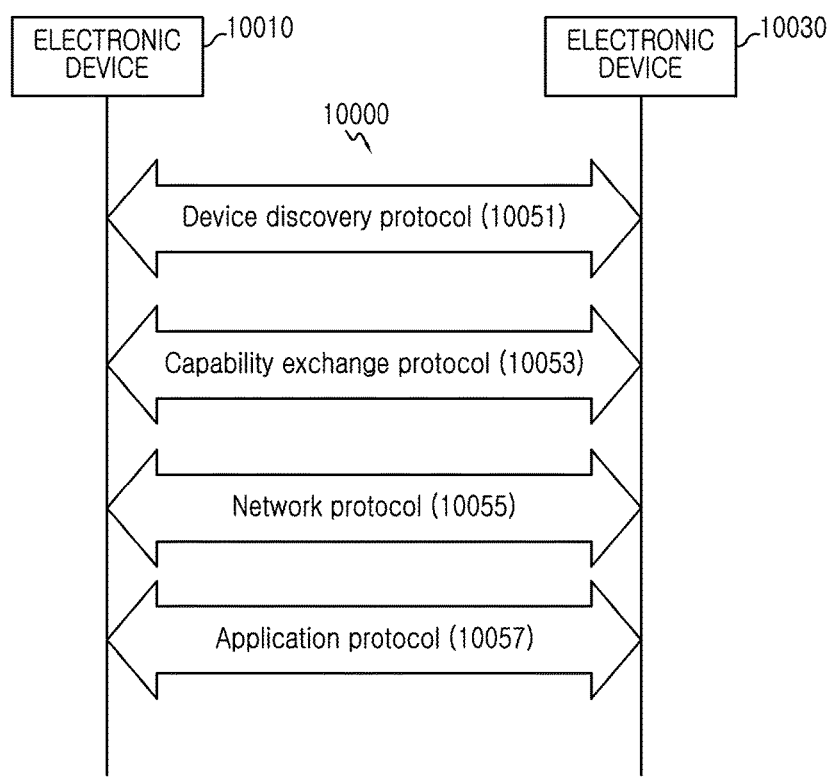
FIG. 100 is a view illustrating a communication protocol between a plurality of electronic devices according to an embodiment of the present disclosure.

FIG. 100 is a view illustrating a communication protocol between a plurality of electronic devices according to an embodiment of the present disclosure.

Referring to FIG. 100, for example, a communication protocol 10000 may include a device discovery protocol 10051, a capability exchange protocol 10053, a network protocol 10055, and an application protocol 10057, etc.

According to an embodiment, the device discovery protocol 10051 may include a protocol for allowing electronic devices (e.g., the electronic device 10010 or the electronic device 10030) to detect an external electronic device that may communicate with themselves, or for connecting with the detected external electronic device. For example, the electronic device 10010 (e.g., the electronic device 101) may detect the electronic device 10030 (e.g., the electronic device 104) as a device that may communicate with the electronic device 10010 via a communication method (e.g., Wi-Fi, BT, or USB, etc.) available at the electronic device 10010. For communication connection with the electronic device 10030, the electronic device 10010 may obtain and store identity or other identifying information for the detected electronic device 10030 using the device discovery protocol 10051. The electronic device 10010, for example, may establish communication connection with the electronic device 10030 based on at least identify information.

According to an embodiment, the device discovery protocol 10051 may be a protocol for mutual authentication between a plurality of electronic devices. For example, the electronic device 10010 may perform authentication between the electronic device 10010 and the electronic device 10030 based on communication information (e.g., a Media Access Control (MAC) address, a Universally Unique Identifier (UUID), a Subsystem Identification (SSID), an Information Provider (IP) address) for connection with at least the electronic device 10030.

According to an embodiment, a function exchange protocol 10053 may be a protocol for exchanging information related to a function of a service supportable by at least one of the electronic device 10010 and the electronic device 10030. For example, the electronic device 10010 and the electronic device 10030 may exchange information related to a function of a service currently provided by the respective devices with each other via the capability exchange protocol 10053. Exchangeable information may include identify information indicating a specific service among a plurality of services supportable by the electronic device 10010 and the electronic device 10030. For example, the electronic device 10010 may receive identity information of a specific service provided by the electronic device 10030 from the electronic device 10030 via the capability exchange protocol 10053. In this case, the first electronic device 10010 may determine whether the electronic device 10010 may support a specific service based on the received identify information.

According to an embodiment, the network protocol 10055 may be a protocol for controlling a data flow between the electronic devices (e.g., the electronic device 10010 and the electronic device 10030) connected for enabling communication, for example, transmitted/received for providing a service in cooperation with electronic devices. For example, at least one of the electronic device 10010 and the electronic device 10030 may perform an error control or a data quality control, etc. using the network protocol 10055. Additionally or generally, the network protocol 10055 may determine a transmission format of data transmitted/received between the electronic device 10010 and the electronic device 10030. Also, the electronic device 10010 or the electronic device 10030 may manage (e.g., session connection or session termination) at least a session for mutual data exchange using the network protocol 10055.

According to an embodiment, the application protocol 10057 may be a protocol for providing a procedure or information for exchanging data related to a service provided to an external electronic device. For example, the electronic device 10010 (e.g., the electronic device 101) may provide a service to the electronic device 10030 (e.g., the electronic device 104 or the server 106) via the application protocol 10057.

According to an embodiment, the communication protocol 10000 may include a standard communication protocol, a communication protocol (e.g., a communication protocol designated by a communication device manufacturer or a network supplier itself) designated by an individual or an organization, or a combination thereof.

The terminology of a "module" used for the present disclosure, for example, may mean a unit including a combination of one or more of hardware, software, and firmware. A "module", for example, may be interchangeably used with terminologies such as a unit, logic, a logical block, a component, a circuit, etc. The "module" may be a minimum unit of a component integrally configured, or a portion thereof. The "module" may be a minimum unit performing one or more functions or a portion thereof. The "module" may be implemented mechanically or electronically. For example, the "module" according to the present disclosure may include at least one of an Application-Specific Integrated Circuit (ASIC) chip performing certain operations, a Field-Programmable Gate Arrays (FPGAs), or a programmable-logic device, known or to be developed in the future.

The terminologies "connect, coupled to, coupled with, etc." used for the present disclosure may be construed as customary and ordinary meaning, not terminologies used for a specific technical field. Also, these terminologies are not limited to direct connection between two elements but may include indirect connections.

According to an embodiment, at least a portion of an apparatus (e.g., modules or functions thereof) or a method (e.g., operations) according to the present disclosure, for example, may be implemented as instructions stored in a computer-readable storage media in the form of a programmable module. The instruction, when executed by one or more processors (e.g., the processor 120), may perform a function corresponding to the instruction. The computer-readable storage media, for example, may be a memory 130. At least a portion of the programming module, for example, may be implemented (e.g., executed) by the processor 120. At least a portion of the programming module may include, for example, a module, a program, a routine, a set of instructions, or a process, etc. for performing one or more functions.

A computer-readable recording medium may include a hard disk, a magnetic media such as a floppy disk and a magnetic tape, an optical media such as Compact Disc Read Only Memory (CD-ROM) and a Digital Versatile Disc (DVD), a magneto-optical media such as a floptical disk, and a hardware device specifically configured for storing and performing a program instruction (e.g., a programming module) such as Read Only Memory (ROM), Random Access Memory (RAM), a flash memory, etc. Also, a program instruction may include not only a mechanical code such as things generated by a compiler but also a high-level language code executable on a computer using an interpreter, etc. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

According to an embodiment of the present disclosure, in a storage medium storing instructions, the instructions, when executed by at least one processor, are set to allow the at least one processor to perform at least one operation, and the at least one operation, in a method for operating an electronic device, may include connecting with an electronic cover, obtaining configuration information of an electronic cover, and setting a user interface in response to the configuration information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    detecting that an electronic cover device is connected to the electronic device,
    wherein the electronic cover device includes a first cover and a second cover, the first cover rotatably coupled to the second cover and electronically connected to the second cover,
    wherein the second cover is coupled to a back side of the electronic device to cover the back side of the electronic device, and wherein the second cover is electronically connected to the electronic device when the second cover is coupled to the back side of the electronic device,
    wherein the first cover is rotatable to cover a first screen on a front side of the electronic device, and wherein the electronic device is disposed between the first cover and the second cover when the first cover is rotated to cover the first screen, and
    wherein the first cover comprises opposite first and second surfaces, and the first surface conceals the first screen when the first cover is rotated to cover the first screen;
    when it is determined that the first cover includes only a second screen disposed on the first surface:
        in response to a detection that the first cover is rotated to cover the first screen, deactivating the first and second screens, and
        in response to a detection that the first cover is rotated to open the first screen, activating at least one of the first screen and the second screen when displaying content;
    when it is determined that the first cover includes only a third screen disposed on the second surface:
        in response to a detection that the first cover is rotated to cover the first screen, activating the third screen when displaying the content, and
        in response to a detection that the first cover is rotated to open the first screen, activating the first screen when displaying the content; and
    when it is determined that the first cover includes the second screen disposed on the first surface and the third screen disposed on the second surface:
        in response to a detection that the first cover is rotated to cover the first screen, activating the third screen when displaying the content, and
        in response to a detection that the first cover is rotated to open the first screen, activating at least one of the first screen and the second screen when displaying the content, and deactivating the third screen.

2. The method of claim 1, further comprising, when it is determined that the first cover includes the second screen disposed on the first surface, and it is detected that the first cover is rotated to open the first screen:
    displaying an image via the first screen, and in response to a touch input on the first screen, enlarging the image, dividing and displaying the enlarged image to two sides of the first screen and the second screen, or
    displaying an image via the second screen, and in response to a touch input on the second screen, enlarging the image, dividing and displaying the enlarged image to two sides of the first screen and the second screen.

3. The method of claim 1, further comprising, when it is determined that the first cover includes the second screen disposed on the first surface, and it is detected that the first cover is rotated to open the first screen:
    displaying a first contents via the first screen and a second contents via the second screen, and in response a touch input on the first screen or the second screen, displaying the first contents via the second screen, and displaying the second contents via the first screen.

4. The method of claim 1, further comprising, when it is determined that the first cover includes the second screen disposed on the first surface, and it is detected that the first cover is rotated to open the first screen:
    displaying scrollable contents via two sides of the first screen and the second screen, and in response a user input, scrolling the contents.

5. The method of claim 4, wherein the user input comprises:
a touch input on the first screen or the second screen, or
a gesture input over the electronic device or the electronic cover device.

6. The method of claim 1, further comprising, when it is determined that the first cover includes the second screen disposed on the first surface, and it is detected that the first cover is rotated to open the first screen:
displaying a list of items via the first screen, and in response to a selection of one among the list of items, displaying, via the second screen, content according to the selected items, or
displaying a list of items via the second screen, and in response to a selection of one among the list of items, displaying, via the first screen, content according to the selected items.

7. The method of claim 1, further comprising, when it is determined that the first cover includes the second screen disposed on the first surface, and it is detected that the first cover is rotated to open the first screen:
displaying a list of phone book entries via the second screen; and
in response to a selection of one among the list of phone book entries, calling a phone number of the selected phone book entry, and displaying a call screen via the first screen.

8. The method of claim 1, further comprising, when it is determined that the first cover includes the second screen disposed on the first surface, and it is detected that the first cover is rotated to open the first screen:
executing a user-selected application; and
displaying, via the first screen, a first content based on the executed application, and displaying, via the second screen, a second content based on the executed application.

9. The method of claim 1, further comprising, when it is determined that the first cover includes the second screen disposed on the first surface, and it is detected that the first cover is rotated to open the first screen:
concurrently executing user-selected first and second applications; and
displaying, via the first screen, a first content based on the executed first application, and displaying, via the second screen, a second content based on the executed second application.

10. The method of claim 1, further comprising, when it is determined that the first cover includes the third screen disposed on the second surface, and it is detected that the first cover is rotated to cover the first screen:
detecting at least one event, wherein the at least one event includes:
user inputs generated in the electronic device or the electronic cover device, or
a wireless signal received from an external electronic device; and
displaying, via the third screen, content according to the at least one event.

11. The method of claim 10, wherein the at least one event is associated with a call reception or a message reception from the external electronic device.

12. The method of claim 10,
wherein the at least one event is generated when a stylus is separated from the electronic device, and
wherein in response to the at least one event, providing, via the third screen, a screen for a handwriting mode.

13. The method of claim 1, further comprising, when it is determined that the first cover includes the third screen disposed on the second surface, and it is detected that the first cover is rotated to cover the first screen:
displaying scrollable contents via the third screen; and
in response to a touch input on the third screen, scrolling the contents.

14. The method of claim 13, further comprising, when it is detected that the first cover is rotated to open the first screen:
inactivating the third screen; and
displaying the content via the first screen.

15. The method of claim 13, further comprising:
detecting a selection of an object among the displayed scrollable contents; and
displaying, via the third screen, a content according to the selected object.

16. The method of claim 1, further comprising, when it is determined that the first cover includes the third screen disposed on the second surface, and it is detected that the first cover is rotated to cover the first screen:
in response to a user input, entering a camera mode;
providing a screen for the camera mode via the third screen, and activating a camera operably coupled to the electronic device; and
displaying, via the third screen image, data obtained from the activated camera.

17. The method of claim 1, further comprising, when it is determined that the first cover includes the third screen disposed on the second surface, and it is detected that the first cover is rotated to cover the first screen:
detecting at least one event while the electronic device is in a low power mode wherein the at least one event includes:
user inputs generated in the electronic device or the electronic cover device, or
a wireless signal received from an external electronic device; and
displaying, via the third screen, contents according to the at least one event while the electronic device is in the low power mode.

18. The method of claim 1, further comprising, when it is determined that the first cover includes the second screen disposed on the first surface, and it is detected that the first cover is rotated to open the first screen:
obtaining first image data from a first camera, and obtaining second image data from a second camera, wherein the first and second cameras are respectively in on the front and back sides;
displaying the first image data via the first screen; and
displaying the second image data via the second screen.

19. The method of claim 18, further comprising, when it is detected that the first cover is rotated to cover the first screen, composing the first image data and the second image data.

20. The method of claim 1, further comprising, when it is determined that the first cover includes the second screen disposed on the first surface, and it is detected that the first cover is rotated to open the first screen:
obtaining image data from a camera operatively coupled to the electronic device;
displaying the image data via the first screen; and
in response to a selection of a capture button on the first screen, capturing the image data displayed on the first screen, and displaying the captured image data via the second screen.

21. The method of claim 1, further comprising, when an appropriate user input for a user authentication is not detected, disabling the electronic cover device.

22. The method of claim 21, further comprising:
when it is detected that the first cover is rotated to open the first screen, providing, via the first screen, a screen for the user authentication, and when it is not determined that the user authentication is succeed via the screen, disabling the electronic cover device; or
when it is detected that the first cover is rotated to cover the first screen, detecting a signal from a fingerprint sensor included in the electronic cover device, and when it is determined that the signal is invalid for the user authentication, disabling the electronic cover device.

23. The method of claim 1, further comprising, when it is detected that the first cover is rotated to cover the first screen, activating a hovering or proximity touch detection function of the first screen instead of inactivating a display function of the first screen.

24. An electronic device comprising:
a memory; and
a processor configured to execute instructions stored in the memory,
wherein upon execution of the instructions, the processor is further configured to detect that an electronic cover device is connected to the electronic device,
wherein the electronic cover device includes a first cover and a second cover, the first cover rotatably coupled to the second cover and electronically connected to the second cover,
wherein the second cover is coupled to a back side of the electronic device to cover the back side of the electronic device, and wherein the second cover is electronically connected to the electronic device when the second cover is coupled to the back side of the electronic device,
wherein the first cover is rotatable to cover a first screen on a front side of the electronic device, and wherein the electronic device is disposed between the first cover and the second cover when the first cover is rotated to cover the first screen,
wherein the first cover comprises opposite first and second surfaces, and the first surface conceals the first screen when the first cover is rotated to cover the first screen,
wherein when it is determined that the first cover includes only a second screen disposed on the first surface, the processor is further configured to:
in response to a detection that the first cover is rotated to cover the first screen, deactivate the first and second screens, and
in response to a detection that the first cover is rotated to open the first screen, activate at least one of the first screen and the second screen when displaying content,
wherein when it is determined that the first cover includes only a third screen disposed on the second surface, the processor is further configured to:
in response to a detection that the first cover is rotated to cover the first screen, activate the third screen when displaying the content, and
in response to a detection that the first cover is rotated to open the first screen, activate the first screen when displaying the content, and
wherein when it is determined that the first cover includes the second screen disposed on the first surface and the third screen disposed on the second surface, the processor is further configured to:
in response to a detection that the first cover is rotated to cover the first screen, activate the third screen when displaying the content, and
in response to a detection that the first cover is rotated to open the first screen, activate at least one of the first screen and the second screen when displaying the content, and deactivating the third screen.

25. The electronic device of claim 24, wherein the processor is further configured to, when it is determined that the first cover includes the second screen disposed on the first surface, and it is detected that the first cover is rotated to open the first screen:
display an image via the first screen, and in response to a touch input on the first screen, enlarging the image, divide and display the enlarged image to two sides of the first screen and the second screen, or
display an image via the second screen, and in response to a touch input on the second screen, enlarge the image, divide and display the enlarged image to two sides of the first screen and the second screen.

26. The electronic device of claim 24, wherein the processor is further configured to, when it is determined that the first cover includes the second screen disposed on the first surface, and it is detected that the first cover is rotated to open the first screen:
display a first contents via the first screen and a second contents via the second screen, and in response a touch input on the first screen or the second screen, display the first contents via the second screen, and display the second contents via the first screen.

27. The electronic device of claim 24, wherein the processor is further configured to, when it is determined that the first cover includes the second screen disposed on the first surface, and it is detected that the first cover is rotated to open the first screen:
display scrollable contents via two sides of the first screen and the second screen, and in response a user input, scroll the contents.

28. The electronic device of claim 27, wherein the user input comprises a touch input on the first screen or the second screen, or a gesture input over the electronic device or the electronic cover device.

29. The electronic device of claim 24, wherein the processor is further configured to, when it is determined that the first cover includes the second screen disposed on the first surface, and it is detected that the first cover is rotated to open the first screen:
display a list of items via the first screen, and in response to a selection of one among the list of items, display, via the second screen, content according to the selected items, or
display a list of items via the second screen, and in response to a selection of one among the list of items, display, via the first screen, content according to the selected items.

30. The electronic device of claim 24, wherein the processor is further configured to, when it is determined that the first cover includes the second screen disposed on the first surface, and it is detected that the first cover is rotated to open the first screen:
display a list of phone book entries via the second screen, and
in response to a selection of one among the list of phone book entries, call a phone number of the selected phone book entry, and display a call screen via the first screen.

31. The electronic device of claim 24, wherein the processor is further configured to, when it is determined that the first cover includes the second screen disposed on the first surface, and it is detected that the first cover is rotated to open the first screen:
  execute a user-selected application, and
  display, via the first screen, a first content based on the executed application, and display, via the second screen, a second content based on the executed application.

32. The electronic device of claim 24, wherein the processor is further configured to, when it is determined that the first cover includes the second screen disposed on the first surface, and it is detected that the first cover is rotated to open the first screen:
  concurrently execute user-selected first and second applications, and
  display, via the first screen, a first content based on the executed first application, and display, via the second screen, a second content based on the executed second application.

33. The electronic device of claim 24, wherein the processor is further configured to, when it is determined that the first cover includes the third screen disposed on the second surface, and it is detected that the first cover is rotated to cover the first screen:
  detect at least one event, wherein the at least one event includes user inputs generated in the electronic device or the electronic cover device, or includes a wireless signal received from an external electronic device, and
  display, via the third screen, content according to the at least one event.

34. The electronic device of claim 33, wherein the at least one event is associated with a call reception or a message reception from the external electronic device.

35. The electronic device of claim 33,
  wherein the at least one event is generated when a stylus is separated from the electronic device, and
  wherein the processor is further configured to, in response to the at least one event, provide a screen for a handwriting mode via the third screen.

36. The electronic device of claim 24, wherein the processor is further configured to, when it is determined that the first cover includes the third screen disposed on the second surface, and it is detected that the first cover is rotated to cover the first screen:
  display scrollable contents via the third screen, and
  in response to a touch input on the third screen, scroll the contents.

37. The electronic device of claim 36, wherein the processor is further configured to, when it is detected that the first cover is rotated to open the first screen, inactivate the third screen, and display the content via the first screen.

38. The electronic device of claim 36, wherein the processor is further configured to:
  detect a selection of an object among the displayed scrollable contents, and
  display, via the third screen, a content according to the selected object.

39. The electronic device of claim 24, wherein the processor is further configured to, when it is determined that the first cover includes the third screen disposed on the second surface, and it is detected that the first cover is rotated to cover the first screen:
  in response to a user input, enter a camera mode,
  provide a screen for the camera mode via the third screen and activate a camera operably coupled to the electronic device, and
  display, via the third screen image, data obtained from the activated camera.

40. The electronic device of claim 24, wherein the processor is further configured to, when it is determined that the first cover includes the third screen disposed on the second surface, and it is detected that the first cover is rotated to cover the first screen:
  detect at least one event while the electronic device is in a low power mode wherein the at least one event includes user inputs generated in the electronic device or the electronic cover device, or includes a wireless signal received from an external electronic device, and
  display, via the third screen, contents according to the at least one event while the electronic device is in the low power mode.

41. The electronic device of claim 24, wherein the processor is further configured to, when it is determined that the first cover includes the second screen disposed on the first surface, and it is detected that the first cover is rotated to open the first screen:
  obtain first image data from a first camera, and second image data from a second camera, wherein the first and second cameras are respectively in on the front and back sides,
  display the first image data via the first screen, and
  display the second image data via the second screen.

42. The electronic device of claim 41, wherein the processor is further configured to, when it is detected that the first cover is rotated to cover the first screen, compose the first image data and the second image data.

43. The electronic device of claim 24, wherein the processor is further configured to, when it is determined that the first cover includes the second screen disposed on the first surface, and it is detected that the first cover is rotated to open the first screen:
  obtain image data from a camera operatively coupled to the electronic device,
  display the image data via the first screen, and
  in response to a selection of a capture button on the first screen, capture the image data displayed on the first screen, and display the captured image data via the second screen.

44. The electronic device of claim 24, wherein the processor is further configured to, when an appropriate user input for a user authentication is not detected, disable the electronic cover device.

45. The electronic device of claim 44, wherein the processor is further configured to:
  when it is detected that the first cover is rotated to open the first screen, providing, via the first screen, a screen for the user authentication, and when it is not determined that the user authentication is succeed via the screen, disable the electronic cover device, or
  when it is detected that the first cover is rotated to cover the first screen, detecting a signal from a fingerprint sensor included in the electronic cover device, and when it is determined that the signal is invalid for the user authentication, disable the electronic cover device.

46. The electronic device of claim 24, wherein the processor is further configured to, when it is detected that the first cover is rotated to cover the first screen, activate a hovering or proximity touch detection function of the first screen instead of inactivating a display function of the first screen.

47. A electronic cover for an electronic device comprising:
  a first cover including at least one screen; and
  a second cover coupled to a back side of the electronic device to cover the back side of the electronic device,
  wherein the second cover is electronically connected to the electronic device when the second cover is coupled to the back side of the electronic device,
  wherein the first cover is rotatably coupled to the second cover, and rotatable to cover a first screen on a front side of the electronic device,
  wherein the electronic device is disposed between the first cover and the second cover when the first cover is rotated to cover the first screen of the electronic device,
  wherein the first cover comprises opposite first and second surfaces, and the first surface covers the first screen when the first cover is rotated to cover the first screen of the electronic device,
  wherein, if the first cover includes only a second screen disposed on the first surface, the second cover is, by the electronic device, configured to:
    when the first cover is rotated to cover the first screen, deactivate the second screen, and
    when the first cover is rotated to open the first screen, activate the second screen for displaying content from the electronic device,
  wherein, if the first cover includes only a third screen disposed on the second surface, the second cover is, by the electronic device, configured to:
    when the first cover is rotated to cover the first screen, activate the third screen for displaying the content from the electronic device, and
    when the first cover is rotated to open the first screen, inactivate the third screen,
  wherein, if the first cover includes the screen disposed on the first surface and the third screen disposed on the second surface, the second cover is, by the electronic device, configured to:
    when the first cover is rotated to cover the first screen, deactivate the second screen and activate the third screen for displaying the content from the electronic device, and
    when the first cover is rotated to open the first screen, activate the second screen for displaying the content from the electronic device and deactivate the third screen.

48. The electronic cover of claim 47, wherein the second cover is further configured to communicate with the electronic device.

49. The electronic cover of claim 47, wherein, in case of coupling with the electronic device, the second cover is configured to transmit a signal informing the coupling to the electronic device.

50. The electronic cover of claim 47, wherein the at least one display comprises at least one of a touch panel or a digitizer.

51. The electronic cover of claim 47, wherein the at least one screen includes one of an electro wetting display (EWD), an e-paper, a plasma display panel, a liquid crystal display (LCD), an organic light emitting diode (OLED), or an active matrix organic light emitting diodes (AMOLED).

52. The electronic cover of claim 47, wherein the at least one screen is transparent, and
  wherein, when the first cover is rotated to cover the first screen of the electronic device, the first screen is viewable through the transparent screen of the first cover.

53. The electronic cover of claim 47, wherein at least one of the first cover or the second cover further comprises a memory, an antenna, or a solar battery.

* * * * *